United States Patent [19]
Kenmochi et al.

[11] Patent Number: 5,966,669
[45] Date of Patent: Oct. 12, 1999

[54] COMMUNICATION APPARATUS HAVING INTER-COMMUNICATING DEVICE FOR EXCHANGING DATA BETWEEN FAX TERMINAL AND RADIO TERMINAL

[75] Inventors: Toshio Kenmochi; Minoru Yokoyama; Yosuke Ezumi, all of Yokohama; Masakatsu Yamada, Kawasaki; Hisashi Toyoda, Yokohama; Hideyuki Terashima, Sagamihara; Takeshi Tsukamoto, Kawasaki, all of Japan

[73] Assignee: Canon Kabushiki Kaisha, Tokyo, Japan

[21] Appl. No.: 08/599,669

[22] Filed: Feb. 12, 1996

Related U.S. Application Data

[63] Continuation of application No. 08/090,911, Jul. 13, 1993, abandoned.

[30] Foreign Application Priority Data

Jul. 14, 1992 [JP] Japan ................................. 4-187026
Nov. 10, 1992 [JP] Japan ................................. 4-299989

[51] Int. Cl.⁶ ............................................. H04Q 7/32
[52] U.S. Cl. ...................... 455/557; 455/575; 358/442; 358/468
[58] Field of Search ................................. 455/33.1, 54.1, 455/56.1, 66, 74, 89, 550, 556, 557, 575; 379/100, 58, 59, 100.01, 100.02; 358/442, 468; 345/1, 2; 340/825.22, 825.69, 825.17

[56] References Cited

U.S. PATENT DOCUMENTS

| | | | |
|---|---|---|---|
| 5,127,047 | 6/1992 | Bell et al. | 379/100 |
| 5,200,991 | 4/1993 | Motoyanagi | 379/100 X |
| 5,282,238 | 1/1994 | Berland | 379/100 X |
| 5,299,024 | 3/1994 | Kafri | 379/100 X |
| 5,412,779 | 5/1995 | Motoyama | 358/442 X |
| 5,450,472 | 9/1995 | Brax | 379/100 X |

FOREIGN PATENT DOCUMENTS

| | | |
|---|---|---|
| 0450497 | 10/1991 | European Pat. Off. |
| 0452864 | 10/1991 | European Pat. Off. |
| 0455987 | 11/1991 | European Pat. Off. |

OTHER PUBLICATIONS

Pat. Abs. Jp. vol. 14, No. 411 (E–973) Sep. 5, 1990 (JP–A–21 54 565).

*Primary Examiner*—Wellington Chin
*Assistant Examiner*—Philip J. Sobutka
*Attorney, Agent, or Firm*—Fitzpatrick, Cella, Harper & Scinto

[57] ABSTRACT

A communication apparatus includes contacts for exchanging various data between a FAX terminal and a radio terminal having a display function to connect the FAX terminal and the radio terminal to cause the FAX terminal and the radio terminal to exchange necessary data therebetween, wherein display data is transferred from the FAX terminal to the radio terminal having the display function and is displayed on the radio terminal.

50 Claims, 50 Drawing Sheets

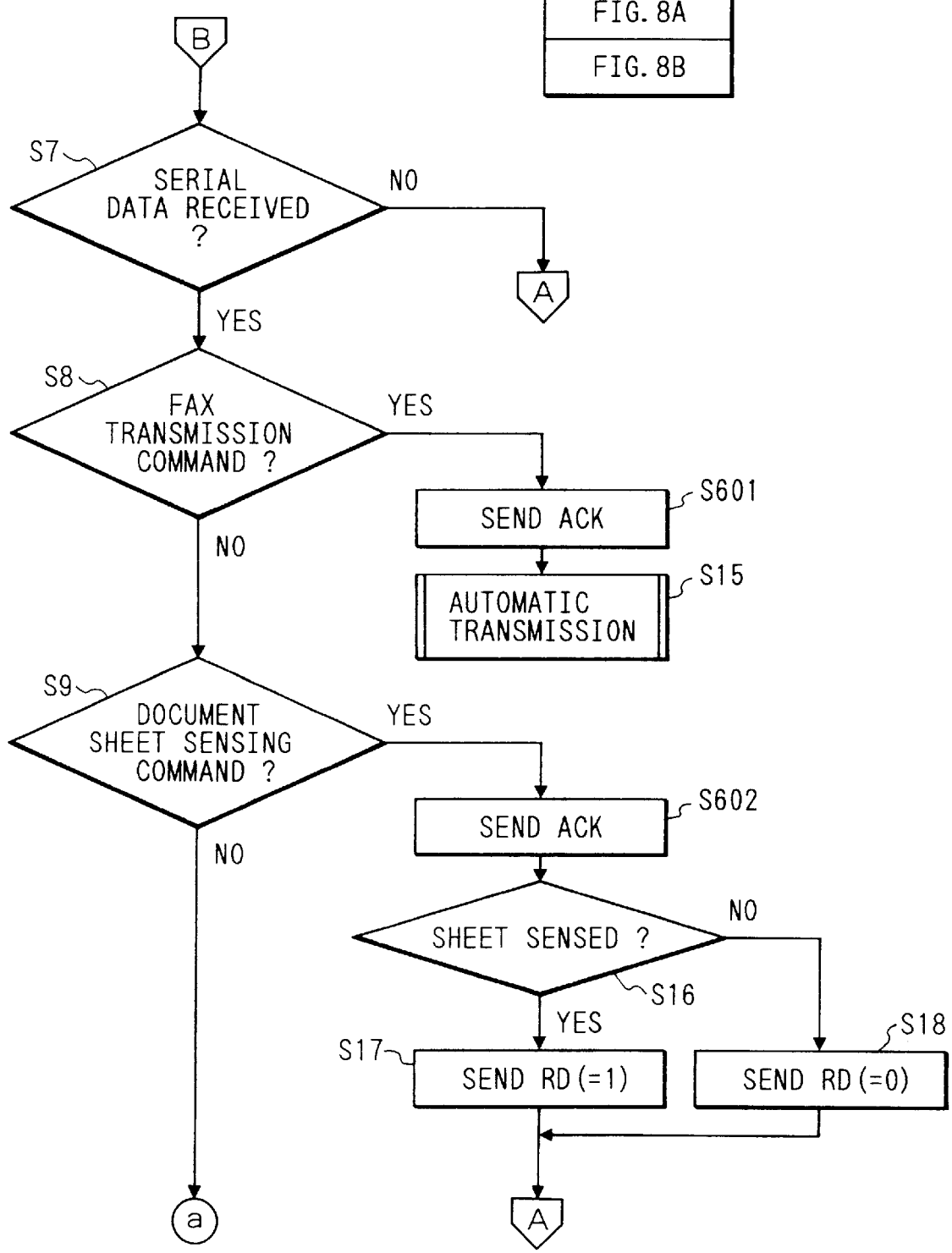

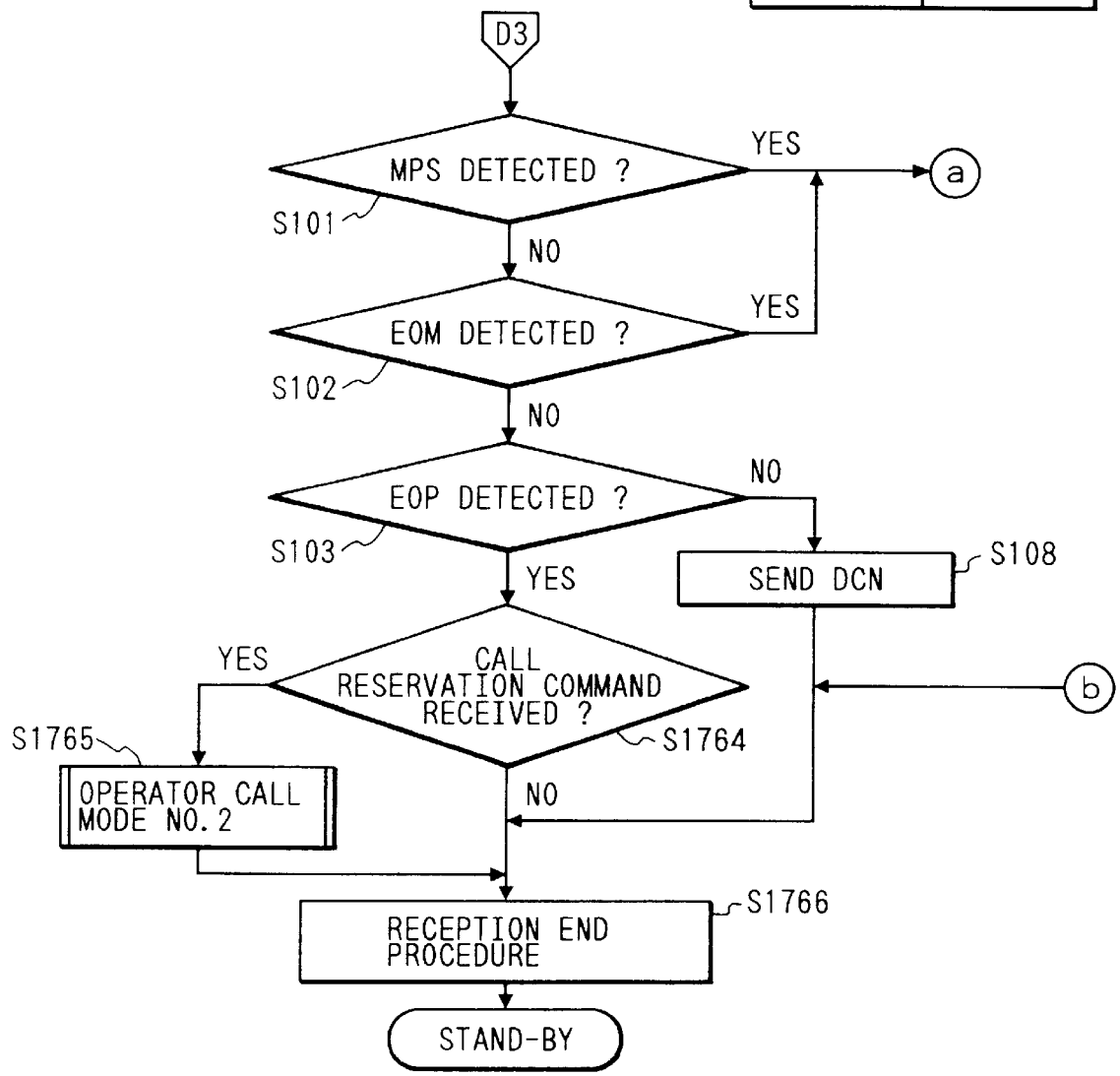

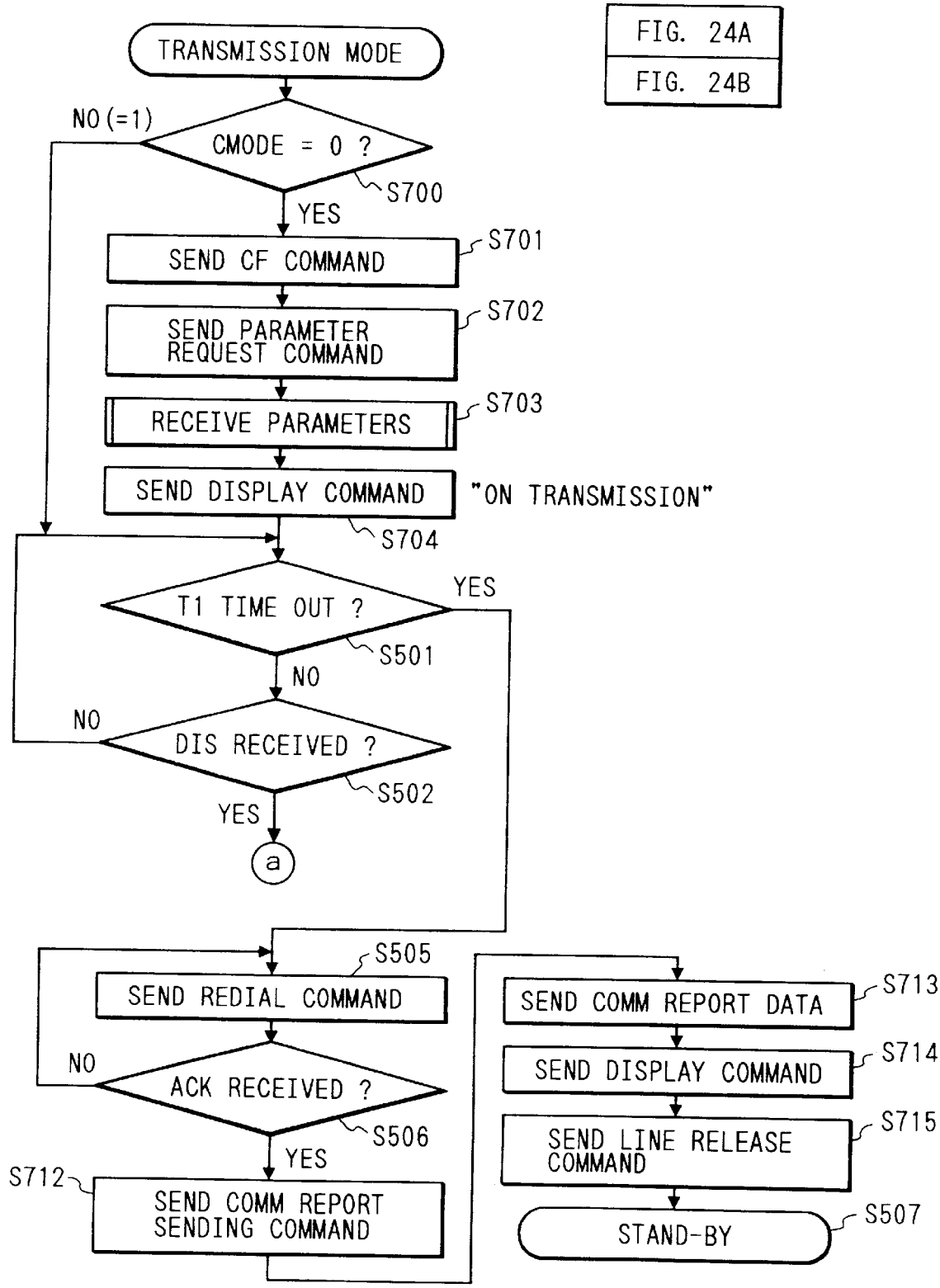

FIG. 26A
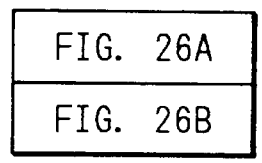
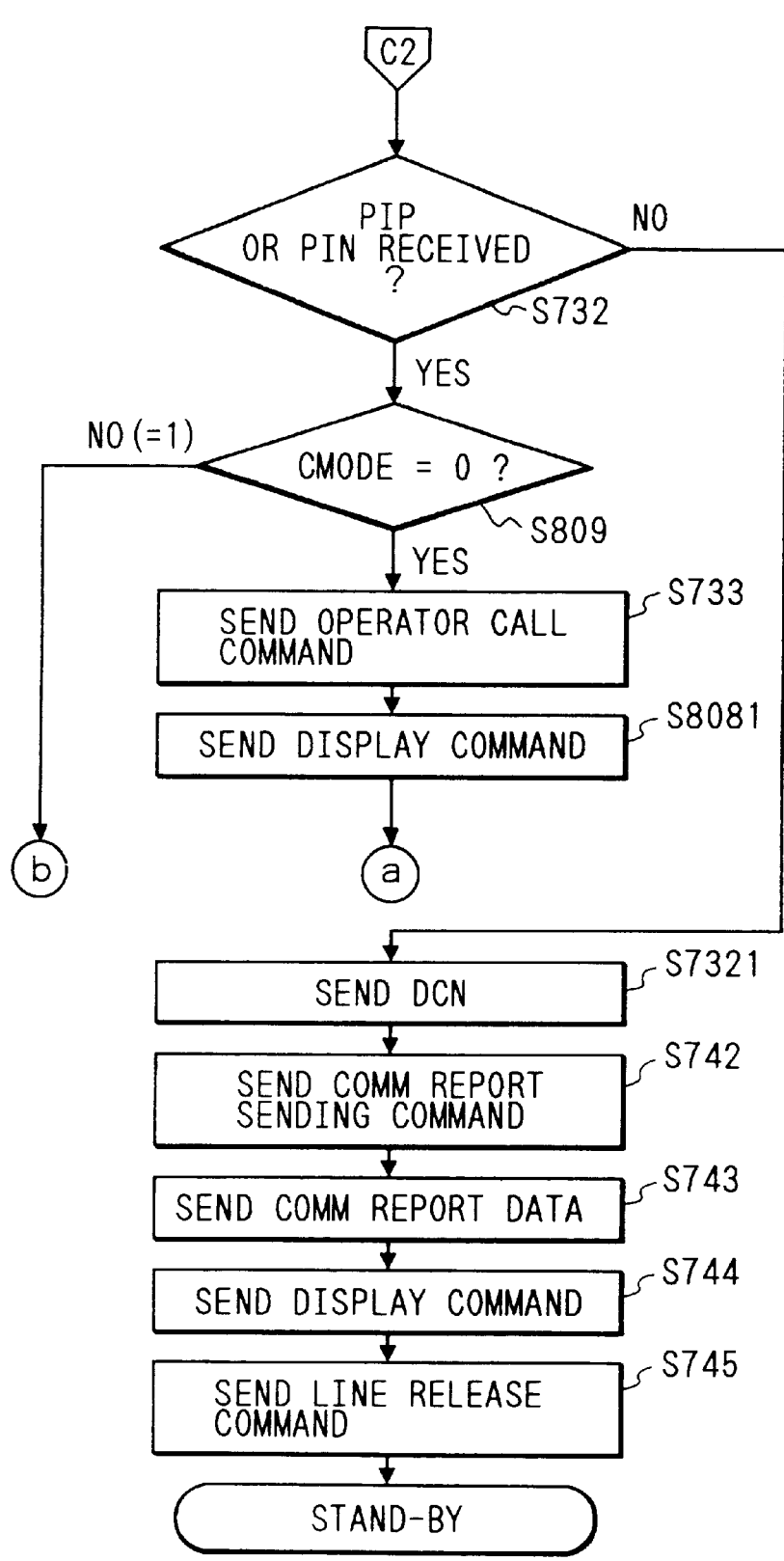

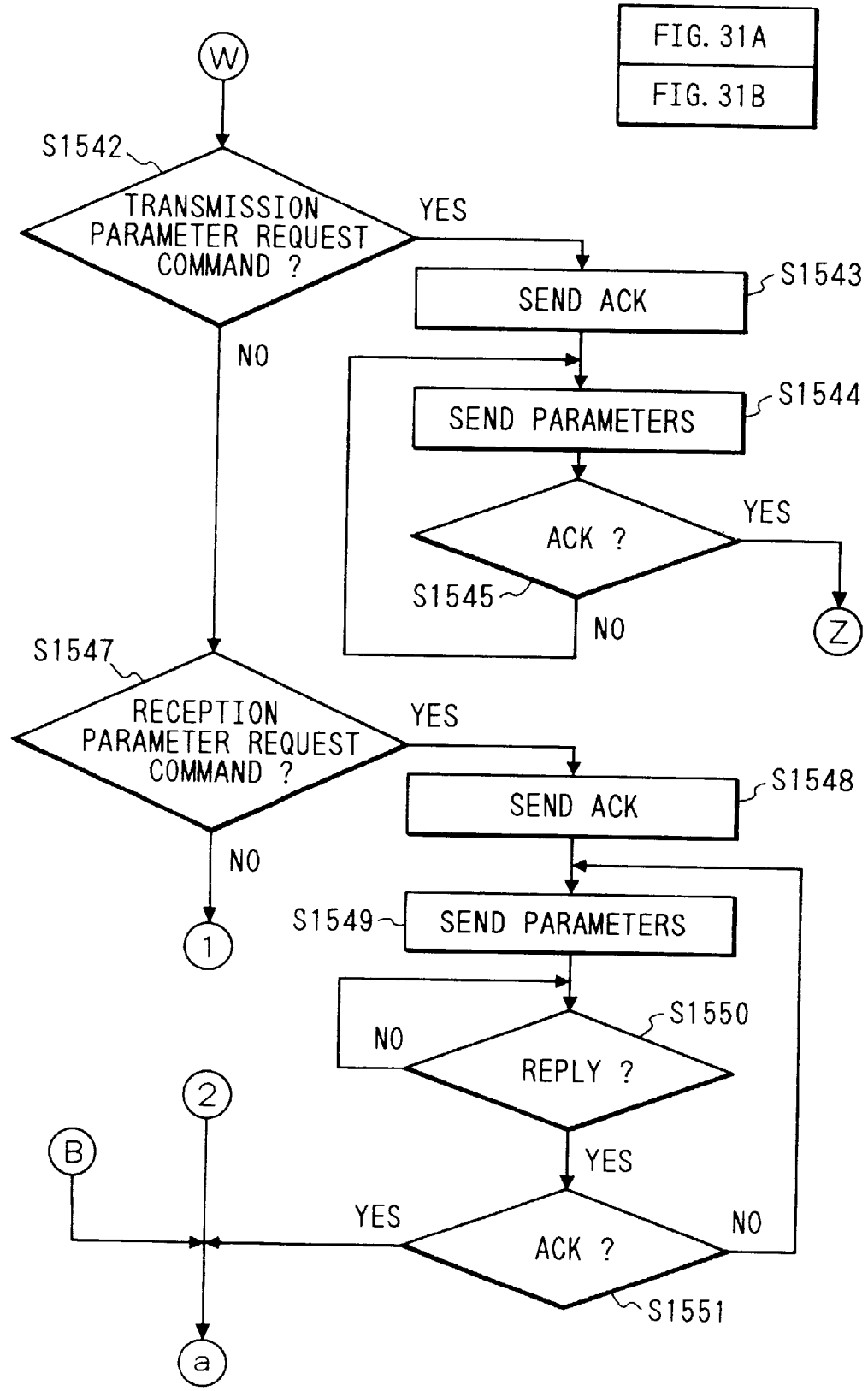

COMMUNICATION APPARATUS HAVING INTER-COMMUNICATING DEVICE FOR EXCHANGING DATA BETWEEN FAX TERMINAL AND RADIO TERMINAL

This application is a continuation of application Ser. No. 08/090,911 filed Jul. 13. 1993, which is now abandoned.

BACKGROUND OF THE INVENTION

1. Field of the Invention

The present invention relates to a communication apparatus for connecting a FAX terminal and a radio terminal to perform communication.

2. Related Background Art

When a facsimile unit is conventionally connected to a portable telephone set having a display function, speech signals are simply connected between ;hem.

That is, a sound signal output of a radio terminal and a sound signal input of a FAX terminal are combined and used as a communication apparatus.

Thus, a transmission document sheet cannot be sensed on the radio terminal side because the radio terminal is connected to the FAX terminal by only acoustic coupling.

Radio terminal information cannot be obtained at the FAX terminal.

The radio terminal simply performs the capture/release of a line and modulation/demodulation between the radio and speech signals. The radio terminal does not identify whether the calling party is a FAX unit or man.

In the above communication apparatus, however, the facsimile unit must have a display unit to display a facsimile operating state (e.g., "on copying", "on transmission", or "on reception"), and the telephone number, abbreviation, and the like of a partner station. The display causes an increase in cost. In addition, the displays are disadvantageously arranged in both the facsimile unit and the portable telephone set.

When a partner station makes a call for FAX communication, the portable telephone set cannot ring directly.

When a call is made from the portable telephone set to perform a facsimile transmission operation, and actual transmission cannot be performed due to a busy state or the like of the partner station, the call operation must be repeated to perform retransmission, resulting in cumbersome operations.

To make a call to a partner FAX station, a call reservation key in the facsimile unit must be depressed. When the facsimile unit is located away from the portable telephone set, the operator must move to the location where the facsimile unit is installed, and must undesirably operate the console unit of the facsimile unit.

If a conventional apparatus does not have a call function in a FAX main unit, a call must be made at a unit other than the FAX main unit, and the operator judges the partner station as a FAX station and performs transmission. For this reason, the unit having a call function cannot determine whether the FAX unit has a transmission document sheet, and a telephone number for a FAX unit and the telephone number for a telephone set cannot be registered for a partner station.

In the above communication apparatus, when the facsimile unit is connected to a plurality of portable telephone sets and a telephone number is used in TSI or CSI for partner facsimile stations, this telephone number cannot be used or the telephone number must be registered in the facsimile unit every time a new portable telephone set is connected thereto.

When a plurality of radio terminals are connected to one FAX unit, communication reports cannot be stored for every terminal, and the operator can know only a FAX communication quantity.

When an incoming call is made to a radio terminal from a partner FAX unit, the operator must answer the phone with the portable telephone set. If the operator judges the call as a FAX call, the operator must depress a start key in the facsimile unit, resulting in cumbersome operations.

Any conventional communication apparatus which can solve all the conventional problems described above is not yet proposed.

SUMMARY OF THE INVENTION

It is an object of the present invention to improve a communication apparatus in consideration of the conventional problems described above.

It is another object of the present invention to provide a communication apparatus wherein contacts such as transmission/reception signal and data intercommunicating means are arranged in both a facsimile unit and a portable telephone set to connect the facsimile unit to the portable telephone set, so that display data is transferred from the FAX unit to the portable telephone set to realize a display function upon displaying the display data on the portable telephone set, and at the same time, a display corresponding to a command from the FAX unit can be performed.

It is still another object of the present invention is to provide a communication apparatus wherein a FAX terminal can communicate with a radio terminal through a serial interface, a ringer activating/deactivating command is transmitted from the FAX terminal to the radio terminal to ON/OFF-control a ringer in the radio terminal, and a redial command is transmitted from the FAX terminal to the radio terminal to cause the portable telephone set to perform redialing.

It is still another object of the present invention to provide a communication apparatus wherein a FAX terminal can communicate with a radio terminal through a serial interface, and a call reservation stand-by state is set upon depressing an OFF-hook key of the radio terminal, so that if the call reservation stand-by state of the radio terminal is confirmed by data exchange and is determined to be set in the call reservation mode, a PRI-EOP signal is sent to the partner FAX station; otherwise, an EOP signal is sent thereto, thereby ON/OFF-controlling the ringer of the radio terminal, and at the same time a redial command is transmitted to allow a portable telephone set to make a facsimile call reservation.

It is still another object of the present invention to provide a communication apparatus wherein data is transmittable/receivable between a FAX terminal and a radio terminal, whereby a radio terminal can request a FAX terminal to sense the presence of a document sheet and receives a document sheet sensing signal from the FAX terminal, so that telephone numbers for a FAX unit and a telephone set can be registered and dialed for a partner station in the call function of the radio terminal.

It is still another object of the present invention to provide a communication apparatus, wherein contacts such as transmission/reception signal and data intercommunicating means are arranged in both a facsimile unit and a portable telephone set to connect the facsimile unit to the portable telephone set, so that various data can be transferred from the FAX unit to the portable telephone set and stored in a storage unit of the portable telephone set, and at the same time various data are transferred from the portable telephone set to the FAX unit and used in the facsimile unit.

It is still another object of the present invention to provide a communication apparatus, wherein a FAX terminal can communicate with a radio terminal through a serial interface, an F/T select function present as a conventional facsimile function is assigned to the radio terminal, and a start command is sent as serial data from the radio terminal to the FAX terminal if the partner station is a FAX station, thereby starting the FAX terminal or station.

DETAILED DESCRIPTION OF THE PREFERRED EMBODIMENTS

Figure 1:
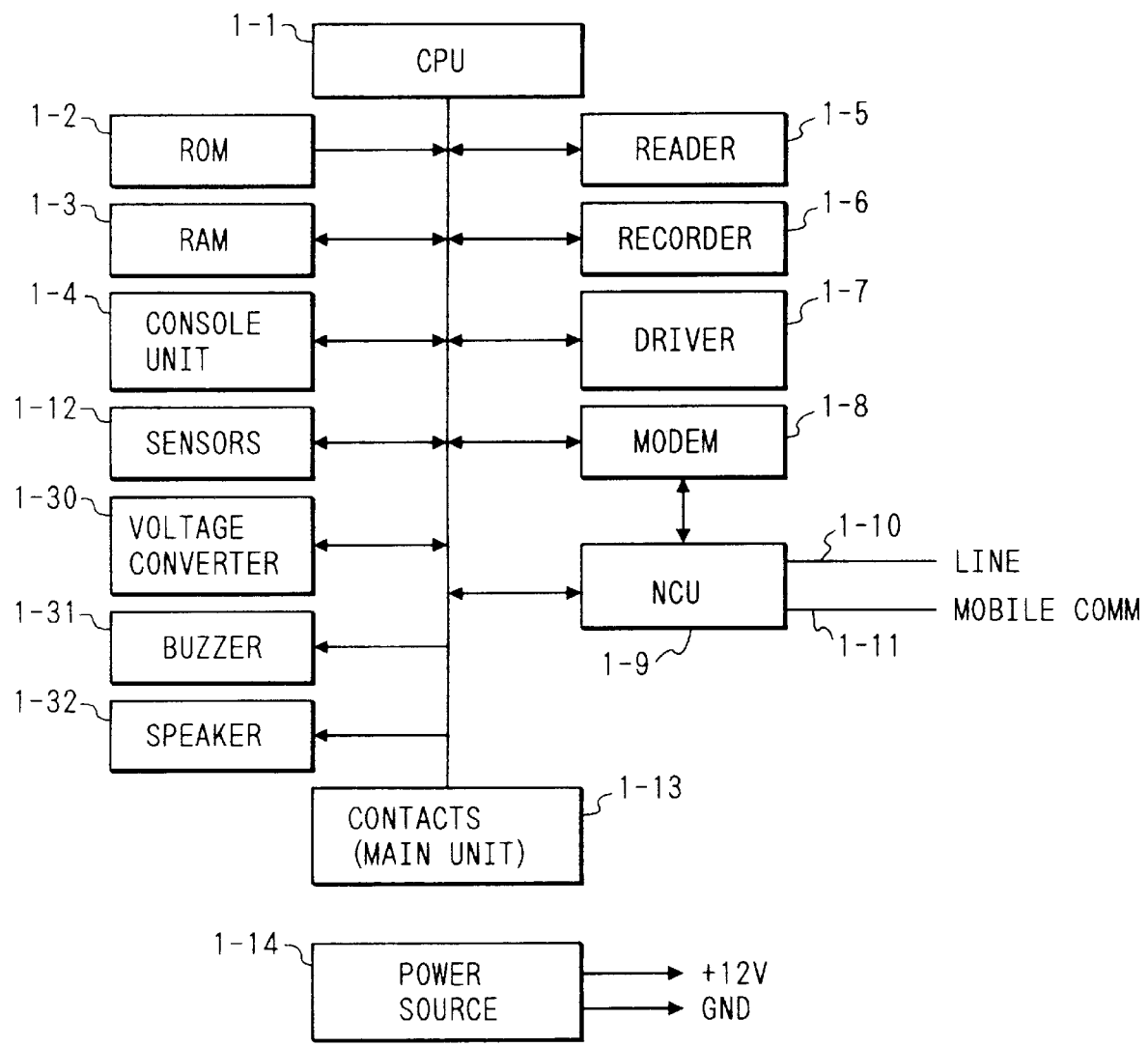
FIG. 1 is a block diagram showing the arrangement of a facsimile main unit in an image communication apparatus which embodies the present invention according to an embodiment.

FIGS. 1, 2, 3, 4, 5A to 5C, 6, 7 to 12, 13, 14, 15, 16, 17 to 21, 22A to 22C, 23, 24A to 26B, 27 to 37, 38 to 40, 41, 42, and 43 best illustrate the characteristic feature of the present invention. FIG. 1 is a block diagram of a main unit of the present invention. A CPU 1-1 has a function of controlling the facsimile apparatus as a whole in accordance with programs stored in a ROM 1-2, i.e., a function of controlling a RAM 1-3, a console unit 1-4 a reader 1-5, a recorder 1-6, a driver 1-7, a modem 1-8, an NCU 1-9, sensors 1-12, contacts 1-13, and a buzzer 1-31, and a function of exchanging various data with another apparatus through a serial interface for serial data communication and the contacts 1-13.

The respective components described above will be described below.

The RAM 1-3 stores binary image data read by the reader 1-5 or binary data recorded by the recorder 1-6, and stores a signal modulated by the modem 1-8 and output as binary data from a subscriber line 1-10 through the NCU 1-9. The RAM 1-3 also stores binary data obtained such that an analog signal input through the subscriber line 1-10 is demodulated through the NCU 1-9 and the modem 1-8.

The console unit 1-4 includes a transmission or reception start key, mode keys for designating resolutions such as fine and standard transmission image resolutions, a copy key used in copying, an economy key for designating an energy-saving mode in recording/printing using a battery, and a stop key for stopping the operation.

The CPU 1-1 detects the depressed states of these keys and controls the respective components in accordance with the detected states.

The reader 1-5 includes a DMA controller, a CCD or contact image sensor (CS), a TTL IC, a binarizing circuit, and the like. The CCD or CS is used to binarize the read data under the control of the CPU 1-1, thereby sequentially sending the binary data to the RAM 1-3.

The recorder 1-6 includes a DMA controller, a B4-/A4-size type thermal head, and a TTL IC. The recorder 1-6 reads out the recorded data from the RAM 1-3 to print out the data as hard copy under the control of the CPU 1-1.

The driver 1-7 includes stepping motors for driving feed and delivery rollers in the reader 1-5 and the recorder 1-6, gears for transmitting the driving forces of the motors, and drivers for controlling the motors.

The modem 1-8 includes G3, G2, G1, and old FM modems, and a clock generator connected to these modems. The modem 1-8 modulates transmission data stored in the RAM 1-3 and outputs the modulated data to the subscriber line 1-10 or a mobile communication line 1-11 through the NCU 1-9 under the control of the CPU 1-1 .

The modem 1-8 receives an analog signal. from the subscriber line 1-10 or the mobile communication line 1-11 through the NCU 1-9 and demodulates the analog signal into binary data. The binary data is stored in the RAM 1-3.

The NCU 1-9 comprises a DC capture circuit and two-/four-wire converter and connects the subscriber line 1-10 to the modem 1-8.

The NCU 1-9 connects the mobile communication line 1-11 to the modem 1-8.

The subscriber line 1-10 is connected to the NCU 1-9.

The mobile communication line 1-11 is connected to the NCU 1-9.

The sensors 1-12 comprise a recording Paper width sensor, a recording paper sensor, a document sheet width sensor, and a document sheet sensor and detects the states of a document sheet and recording paper under the control of the CPU 1-1.

The contacts 1-13 serve as main unit contacts which constitute an interface for receiving and transmitting signals and supplying a power source voltage. The contacts 1-13 will be described in detail later with reference to FIG. 3.

The power source 1-14 applies a power source voltage to the respective components. More specifically, one of the arrangements shown in FIGS. 5A to 5C is used as the power source 1-14, and a DC power source voltage of +12 V is output from the power source 1-14.

Figure 5A:
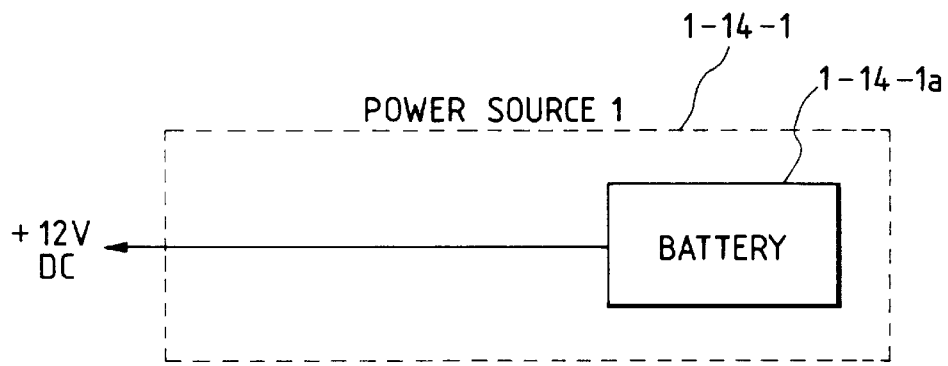
FIGS. 5A to 5C are block diagrams showing the arrangements of contacts.

Referring to FIG. 5A, a power source 1-14-1 comprises a DC +12-V battery 1-14-1a and applies a voltage of DC +12 V to the respective components of the main unit.

Figure 5B:
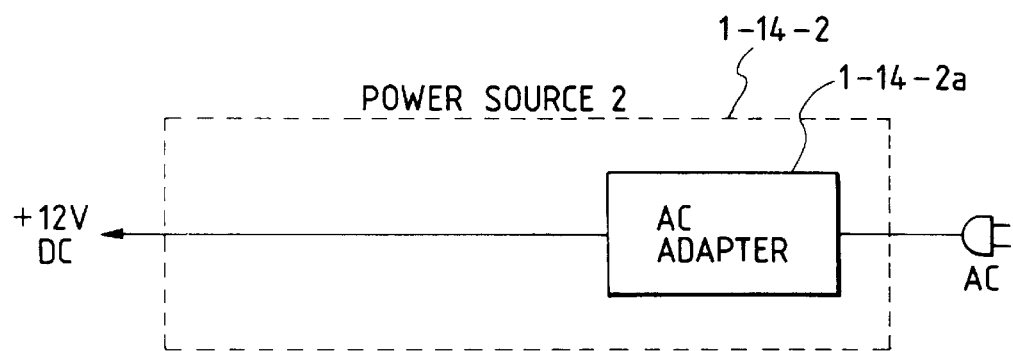

Referring to FIG. 5B, a power source 1-14-2 comprises an AC adapter 1-14-2a for transforming an AC input voltage into a DC voltage of +12 V and applies a DC power source voltage of +12 V to the respective components of the main unit.

Figure 5C:
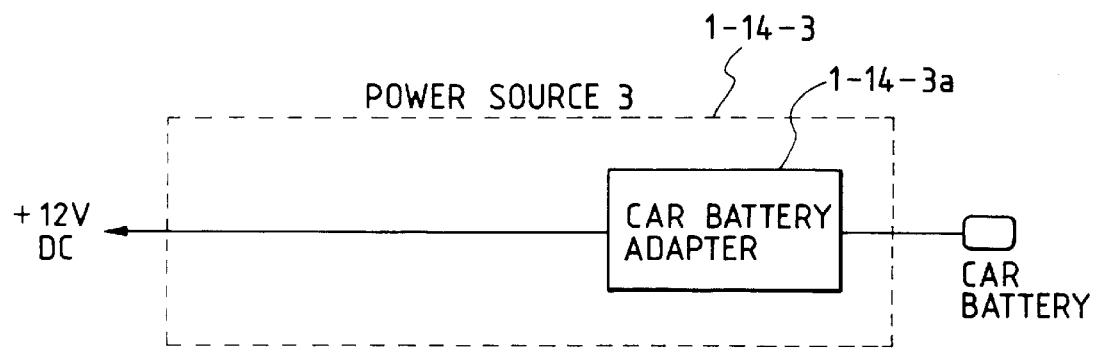

Referring to FIG. 5C, a power source 1-14-3 comprises a car battery adapter 1-14-3a for transforming a DC power source voltage from a car battery into a stable DC voltage of +12 V and applies the DC voltage of +12 V to the respective components of the main unit.

The voltage converter 1-30 (FIG. 1) includes a series regulator, a switching regulator, and a DC/DC converter and converts the DC input voltage of +12 V from the power source 1-14 into a DC voltage of +5 V and outputs the resultant voltage. The voltage converter 1-30 is connected to the power source to constitute one power source shown in FIG. 6.

The buzzer 1-31 in FIG. 1 comprises a buzzer and a buzzer driver and generates an alarm or prompt sound under the control of the CPU.

A speaker 1-32 comprises a speaker and a speaker driver and generates a sound under the control of the CPU.

Figure 2:
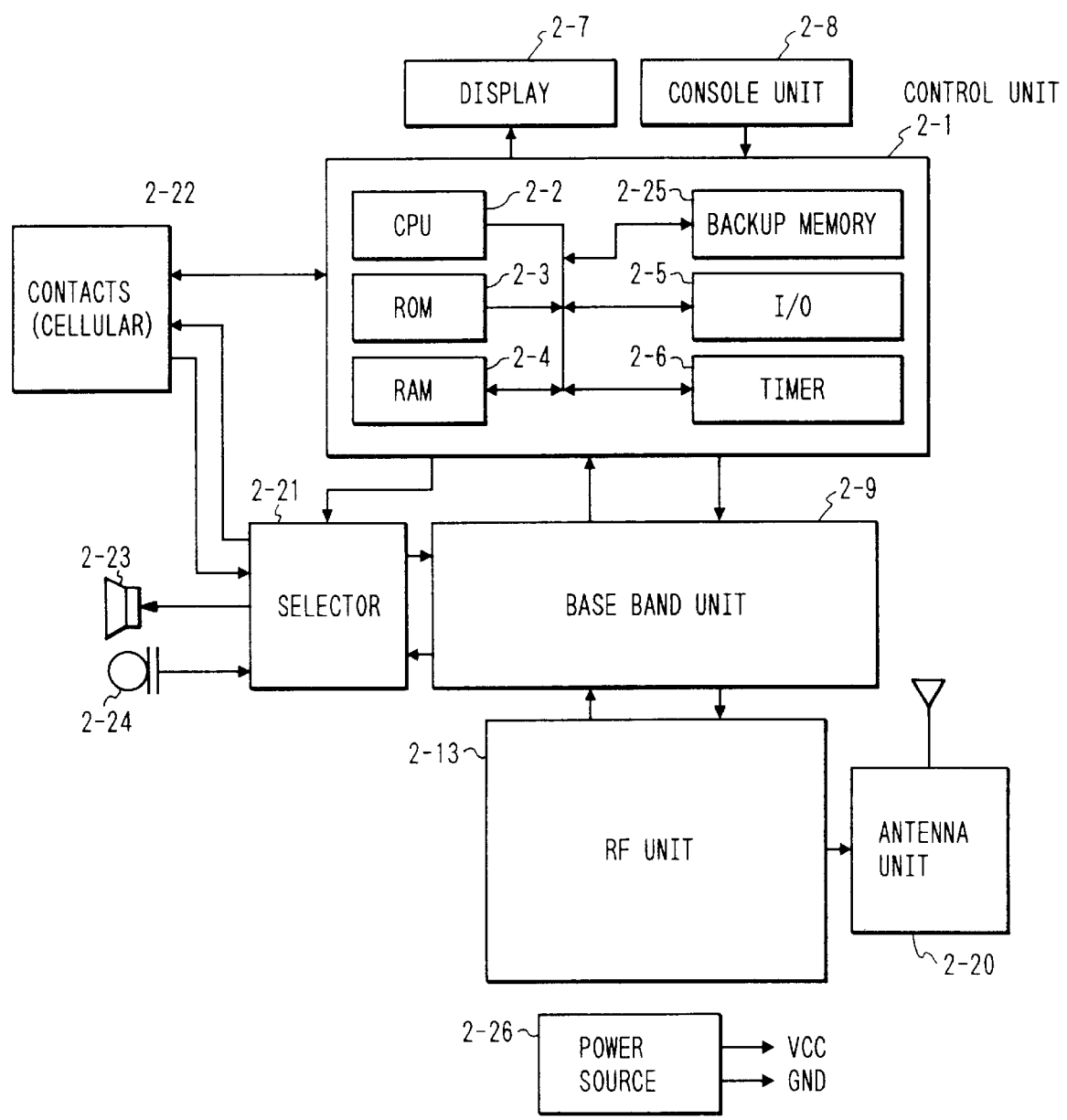
FIG. 2 is a block diagram showing the arrangement of a communication or cellular unit.

FIG. 2 is a block diagram of a cellular unit of the present invention. A CPU 2-2 in a control unit 2-1 controls the facsimile main unit and the cellular unit in accordance with programs stored in a ROM 2-3, i.e., a RAM 2-4, a backup memory 2-25, an I/O 2-5, a timer 2-6, a display 2-7, a console unit 2-8, a baseband unit 2-9, a selector 2-21, an RF unit 2-13, and cellular contacts 2-22.

The respective components will be described below.

The control unit 2-1 comprises the CPU 2-2, the ROM 2-3, the RAM 2-4, the backup memory 2-25, the I/O 2-5, and the timer 2-6.

The RAM 2-4 is used as a work area for the CPU 2-2 and an area for storing commands and data input to and output from the cellular contacts 2-22.

The data input from the cellular contacts, the data output to the cellular contacts, and data from the RAM 2-4 are error-corrected, assembled, and disassembled in channel coding in the baseband unit 2-9. The resultant data is modulated by a modem, and the modulated data is sent to the RF unit 2-13. Filters in the RF unit 2-13 comprise a data LPF and other filters. The data is sent to a PLL unit and a low-noise amplifier in the RF unit through these filters. The low-noise amplifier comprises a mixer amplifier. Power amplification is then performed in the RF unit. A synthesizer in the RF unit includes a voltage-controlled variable frequency oscillator, a phase detector, a frequency divider, and a temperature-compensated quartz oscillator. A signal is sent to an antenna unit 2-20 through a wave multiplexer/demultiplexer in the RF unit. The wave multiplexer/demultiplexer comprises a transmission filter and a reception filter to separate a transmission wave from a reception wave.

Data received at the antenna unit 2-20 is selected by the wave multiplexer/demultiplexer in the RF unit. The data is demodulated in the modem in the baseband unit 2-9 through the mixer and the filters in the RF unit. In channel coding in the baseband unit 2-9, error correction control, and frame assembly and disassembly are performed. The received data is output from the cellular contacts 2-22 or stored in the RAM 2-4.

The backup memory 2-25 stores various data such as its own telephone number, one-touch data, a user abbreviation, a partner dial name, an electronic telephone directory, data (e.g., the telephone number of a line, a user name, facsimile communication mode data for each dial, and communication report data) input to and output from the cellular contacts 2-22, and previous communication records.

The I/O 2-5 is an interface for a capture unit of a radio channel (line), an incoming call detector for F/T selection, a CNG detector, a bell driver, a controller for the selector 2-21 between the cellular contacts 2-22, the speaker 2-23, and a microphone 2-24, the controller of the cellular contacts 2-22, and an outgoing message IC controller.

The timer 2-6 includes a real-time clock and the like.

The display unit 2-7 includes an LCD and an LCD driver and displays a telephone number, a one-touch key, abbreviated data, a facsimile communication state, a speech communication state, and various data.

The console unit 2-8 includes a transmission/reception start key, a mode key for designating an operation mode such as an F/T mode, a stop key for stopping the operation, function keys for executing various functions, a 10-key pad for sending out a telephone number, and one-touch keys with which partner telephone numbers are registered.

The CPU 2-2 detects the depressed states of these keys and controls the respective components in accordance with the states of the keys together with information from the I/O 2-5 and data from the cellular contacts 2-22.

The baseband unit 2-9 comprises a codec, channel coding, and the modem and performs data transmission and reception through the I/O 2-5 under the control of the CPU 2-2.

The codec performs A-D/D-A conversion and control such as speech compression/expansion.

The channel coding performs error correction and frame assembly/disassembly.

The modem performs signal modulation/demodulation, waveform equalization, and the like.

The selector 2-21 selects connection of a speech signal from a radio line to the speaker 2-23 and the microphone 2-24 or connection of the speech signal to the cellular contacts 2-22 in accordance with a signal from the CPU 2-2. If an earphone/microphone jack is arranged, an earphone/microphone set or a communication apparatus such as a facsimile apparatus is connected to the earphone/microphone jack to connect the speech signal from the radio line (channel) thereto.

The speaker 2-23 is used to monitor speech or facsimile communication mode.

The microphone 2-24 is used as a speech input microphone.

The RF unit 2-13 includes high-frequency circuits such as the filters, the PLL unit, the power amplifier, the low-noise amplifier, the synthesizer, the mixer, and the wave multiplexer/demultiplexer, and transmits and receives radio waves.

The antenna unit 2-20 includes a transmission antenna and a reception antenna.

The cellular contacts 2-22 receive or transmit data and commands from or to the FAX main unit through the interface, perform remote control, and receive a power source voltage from the FAX main unit.

A power source 2-26 supplies a power source voltage to the respective components. As shown in FIGS. 5A to 5C, one of the three arrangements is used as the power source 2-26 to output a DC power source voltage of +12 V.

The CPU 2-2 controls the partner station through the cellular contacts 2-22 in accordance with the programs stored in the ROM 2-3 and transmits and receives various data.

Referring to FIG. 5A, the power source 1-14-1 comprises the DC +12-V battery 1-14-1a and applies a voltage of DC +12 V to the respective components of the main unit.

Referring to FIG. 5B, the power source 1-14-2 comprises the AC adapter 1-14-2a for transforming an AC input voltage into a DC voltage of +12 V and applies a DC power source voltage of +12 V to the respective components of the main unit.

Referring to FIG. 5C, the power source 1-14-3 comprises the car battery adapter 1-14-3a for transforming a DC power source voltage from a car battery into a stable DC voltage of +12 V and applies the DC voltage of +12 V to the respective components of the main unit.

A power source voltage may be applied from the FAX main unit connected through the cellular contacts 2-22.

The contacts 2-22 are constituted by twelve contacts for signals and power source voltages, such as +12 V (VCC), GND, TX, RX, serial TX (STX), serial RX (SRX), SCLK, FBUSY, CBUSY, and CMODE.

The above description has been made for the detailed arrangement of the cellular phone of this embodiment.

Figure 3:
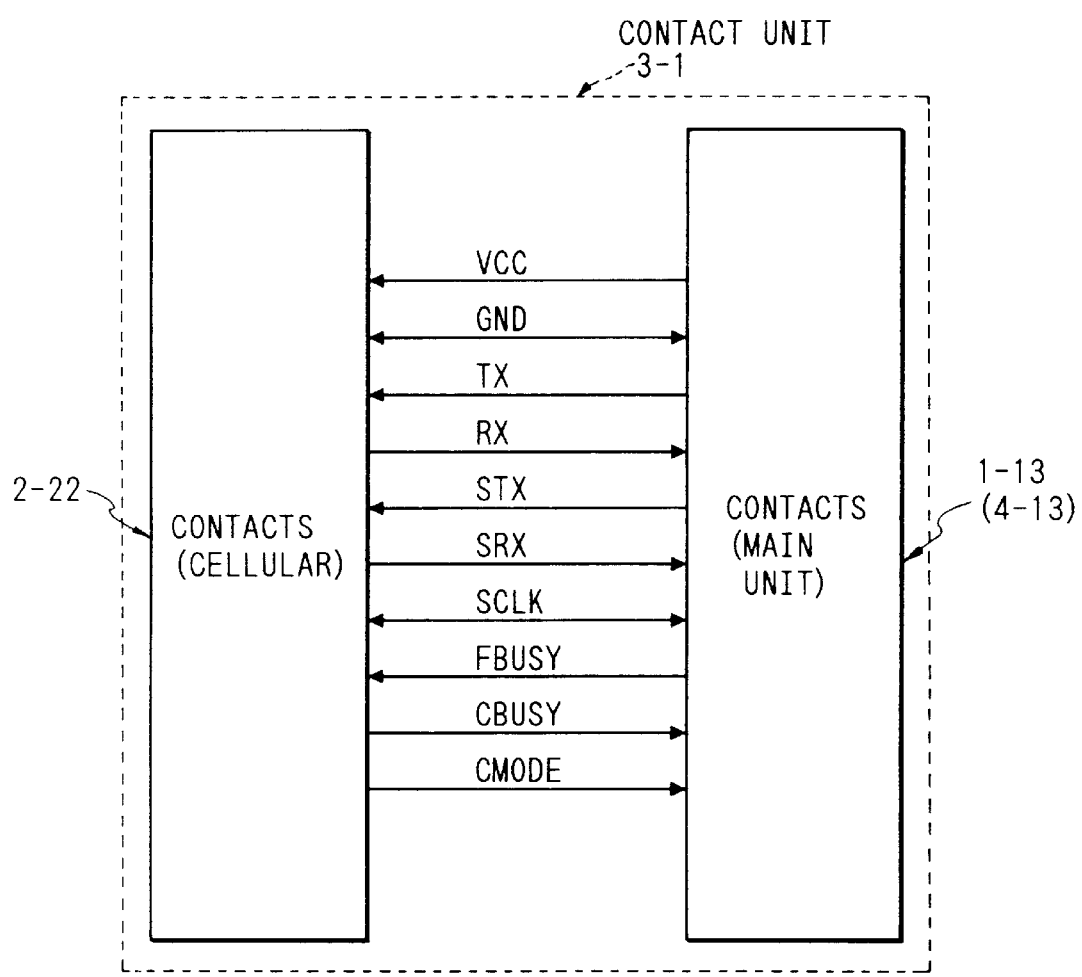
FIG. 3 is a block diagram showing the arrangement of a contact unit.

FIG. 3 is a view showing the arrangement of a contact unit consisting of cellular contacts and main unit contacts. A contact unit 3-1 connects the contacts 1-13 of the main unit in FIG. 1 and the contacts 2-22 of the cellular unit in FIG. 2 to couple the FAX main unit to the cellular unit so as to cause them to exchange signals and power source voltages, thereby constituting a portable facsimile apparatus.

The contact unit 3-1 consisting of the contacts 1-13 of the main unit and the contacts 2-22 of the cellular unit performs the following interfacing.

The power source voltage VCC is applied from the facsimile main unit to the cellular unit.

The ground voltage GND (VCC) is common in the facsimile main unit and the cellular unit.

The signal TX is a transmission signal supplied from a modem of the facsimile main unit to the line input terminal of the cellular unit.

The signal RX is a reception signal supplied from the line output terminal of the cellular unit to the modem of the facsimile main unit.

The signal line STX is of serial data supplied from the facsimile main unit to the cellular unit.

The signal line SRX is of serial data supplied from the cellular unit to the facsimile main unit.

The signal line SCLK is of a synchronization clock supplied from the facsimile main unit to the facsimile main unit.

The signal FBUSY is a signal set at L level when the facsimile main unit can receive serial data.

The signal CBUSY is a signal set at L level when the cellular unit can receive serial data.

The signal CMODE is a control signal for determining whether the facsimile main unit is connected to the cellular unit through a serial interface.

The contacts are interfaced by the above arrangement.

Figure 4:
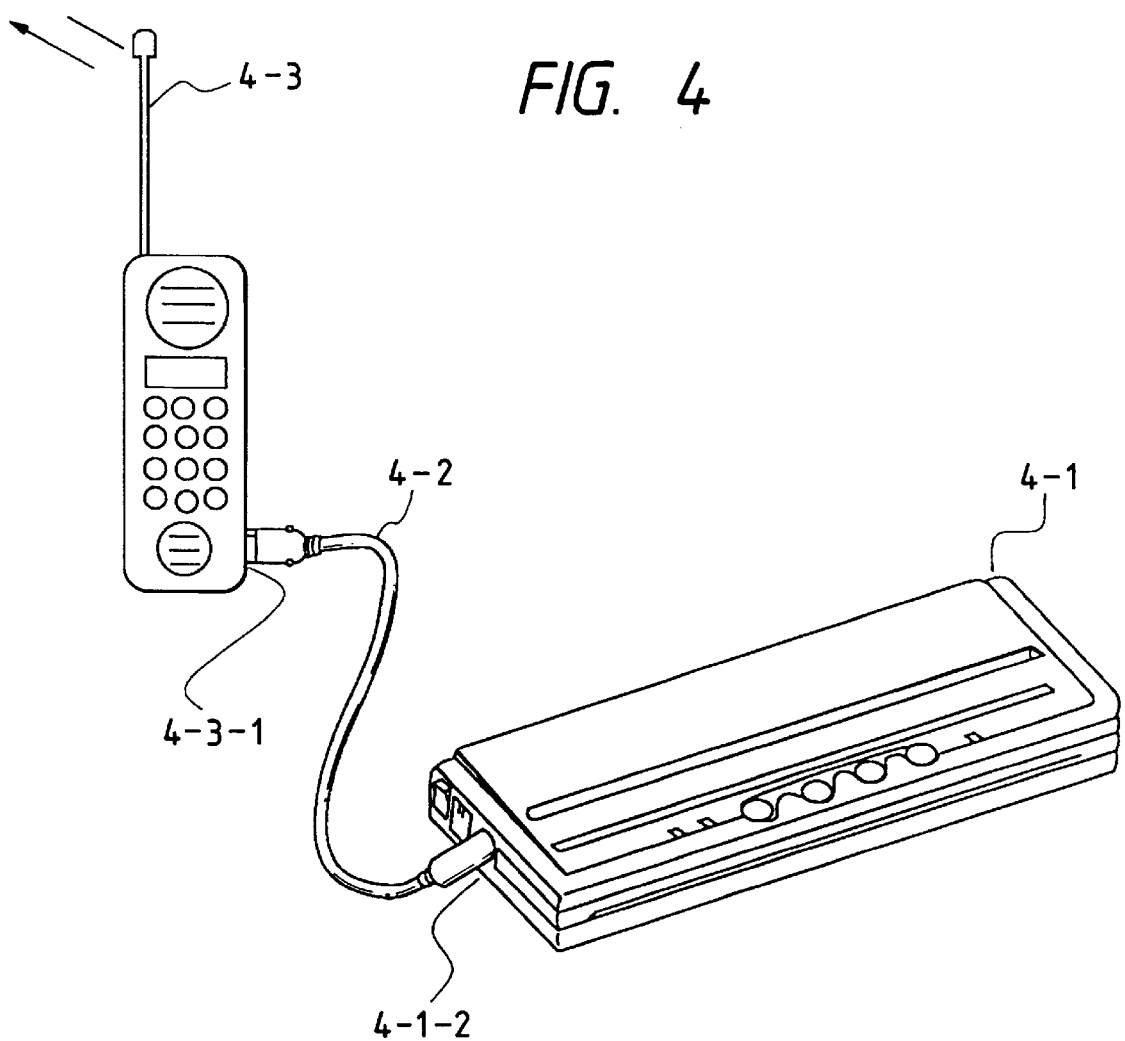
FIG. 4 is a perspective view showing this embodiment.
Figure 6:
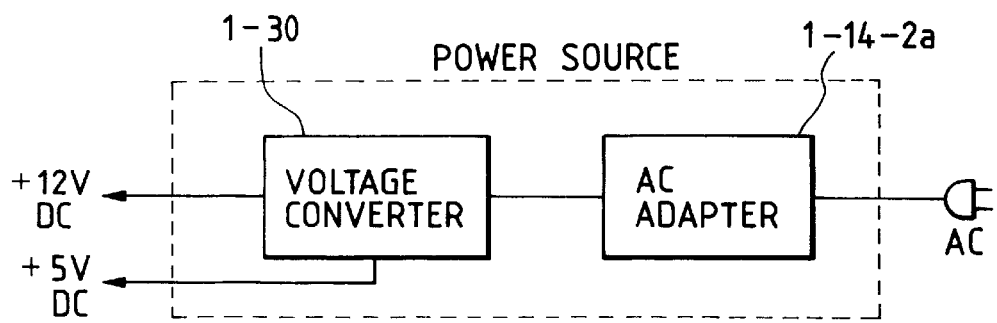
FIG. 6 is a block diagram showing the arrangement of a power source of the main unit.

FIG. 4 shows the outer appearance of the present invention. A facsimile main unit 4-1 in a portable state has an arrangement in the block diagram of FIG. 1.

The facsimile main unit has a contact interface 4-1-2.

A cellular unit 4-3 can be connected to the facsimile main unit 4-1 through a serial interface and has an arrangement in the block diagram of FIG. 2.

A serial interface 4-3-1 connects the cellular unit 4-3 to the facsimile main unit 4-1 through a serial interface.

An interface cable 4-2 connects the facsimile main unit 4-1 to the cellular unit 4-3.

FIG. 4 shows a state in which the portable facsimile main unit is connected to the cellular unit through the serial interface, thereby constituting a facsimile apparatus.

The operations of the above arrangement will be described in detail with reference to flow charts in FIGS. 7 to 12. These sequences are stored as programs in the ROM 1-2 for the CPU 1-1.

When the power switch is turned on, a stand-by mode is set. It is determined in step S1 whether a document sheet is existent. If YES in step S1, the flow advances to step S5 to feed and set the document sheet.

It is determined in step S2 whether recording paper is existent. If NO in step S2, the recording paper is set and checked in step S81. In step S6, the recording paper is fed and set.

If a document sheet is not existent or after the document sheet is set, it is determined in step S600 whether the signal CMODE is set at logic "0", i.e., whether a cellular unit is a cellular unit having an interface with the facsimile main unit or any other cellular unit. The signal CMODE is a signal for determining whether a cellular unit is a cellular unit having an interface with the facsimile main unit or any other cellular unit, and will be described in detail with reference to FIG. 23.

Figure 23:
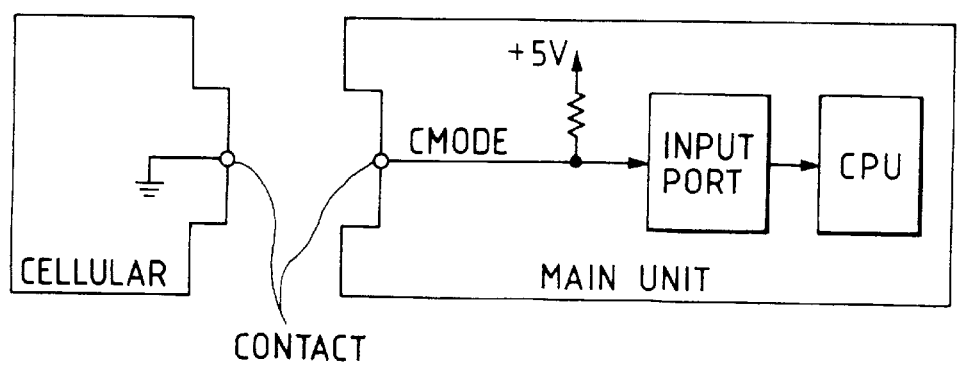
FIG. 23 is a block diagram showing a scheme for determining whether a connection is made through a cellular unit or phone of a serial interface or any other cellular unit.

Referring to FIG. 23, the signal CMODE in the main unit is pulled up to +5 V and is input to an input port of the CPU. When a cellular unit having an interface with the facsimile main unit is connected thereto, the signal CMODE is connected to ground through the contacts and is set at logic "0". When the cellular unit having the interface with the facsimile main unit is disconnected therefrom, the contacts are set open, so that the signal CMODE=1 is set.

If CMODE=1, then a flow D for an operation in which a cellular unit having no interface with the facsimile main unit is connected thereto is initiated.

If CMODE=0, then it is determined that the cellular unit having the serial interface with the facsimile main unit is connected thereto. In step S4 (FIG. 7), it is determined whether any one of the keys in the console unit 1-4 is depressed. If YES in step S4, a flow C for an operation in which the cellular unit having the serial interface with the facsimile main unit is connected thereto is initiates.

If NO in step S4, the flow advances to a flow B. In step S7 of FIG. 8A, when serial data is received from a mobile communication unit, the following operation is performed. If commands received in steps S8, S9, S10, S603, S614, S618, S12, and S13 are a FAX transmission command, a document sheet sensing command, a FAX receive mode start command, a receive check command, a FAX start command, an OCR input start command, a communication report print command, and a registered data print command, respectively, the corresponding operations are performed.

If a received command is not any one of the above commands, an NAK is transmitted to the cellular unit in step S14, and the flow returns to the stand-by mode.

Figure 8B:
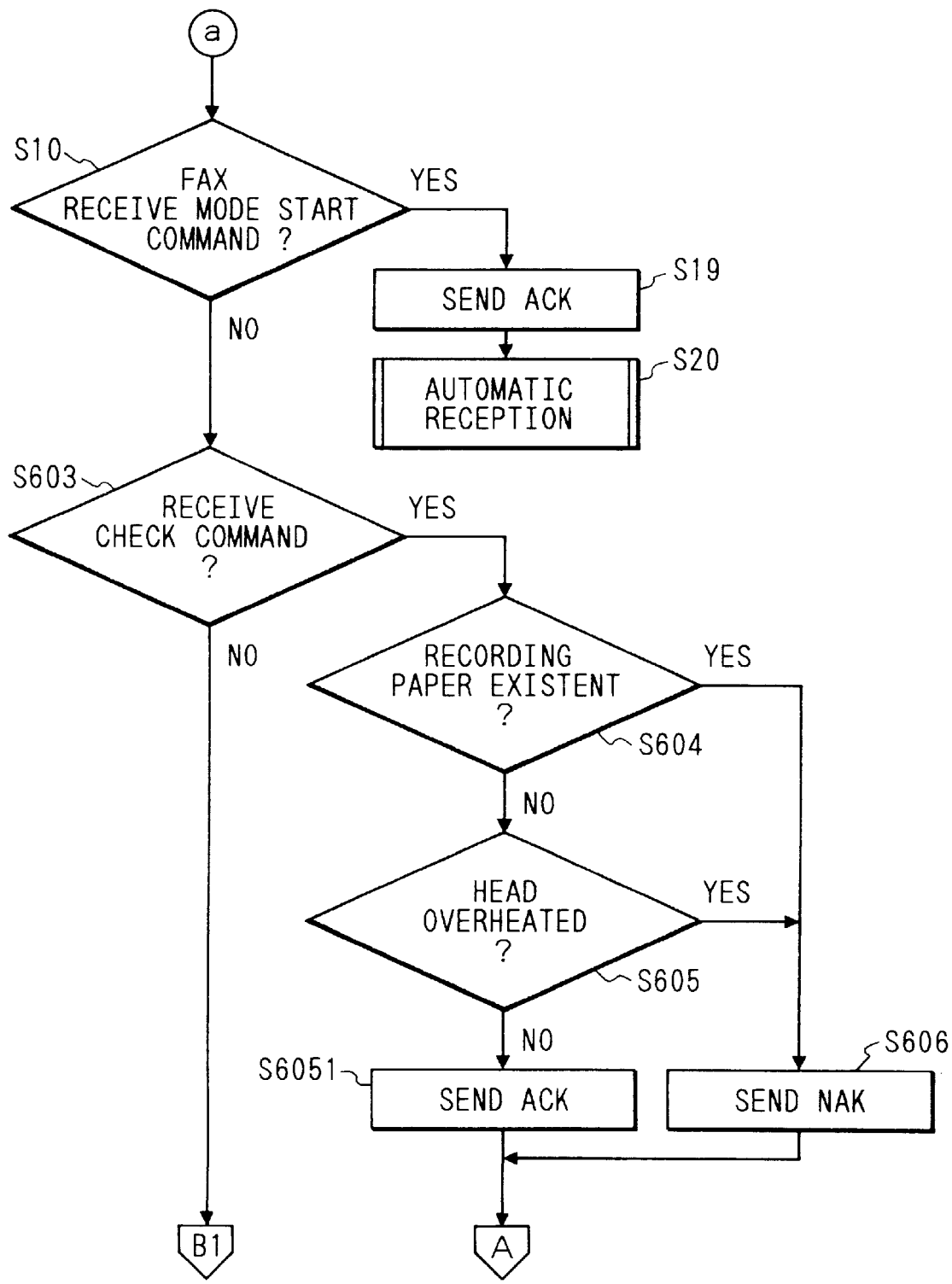
FIG. 8 is comprised of FIG. 8A and FIG. 8B illustrating flow charts showing the facsimile operation of the FAX main unit of this embodiment.

When the FAX transmission command (CC=011001/AUTOTX/CS=XX//) is received in step S8 of FIG. 8A, an ACK is transmitted in step S601, and automatic transmission is performed in step S15.

If the document sheet sensing command (CC=011001/RDS/CS=XX//) is received in step S9, an ACK is transmitted in step S602. If a document sheet is sensed by a DS (Document Sensor) in step S16, RDS=1 is transmitted to the cellular unit in step S17, and the flow returns to the stand-by mode.

If no document sheet is sensed by the DS, RDS=0 is sent as serial data to the cellular unit in step S18, and the flow returns to the stand-by mode.

If the FAX receive mode start command (CC=011001/FAXRX/CS=XX//) is received in step S10, an ACK is sent in step S19, and automatic reception is performed in step S20.

If the receive check command (CC=011001/WDS/CS=XX//) is received in step S603, and the recording paper is not existent in step S604, an NAK is sent to the cellular unit in step S606. The flow then returns to the stand-by mode.

If the recording paper is existent in step S604 and a head is overheated in step S605, an NAK is sent to the cellular unit, and the flow returns to the stand-by mode.

If the recording paper is existent and the head is not overheated, an ACK is sent back to the cellular unit in step S6051, and the flow returns to the stand-by mode.

Figure 9:
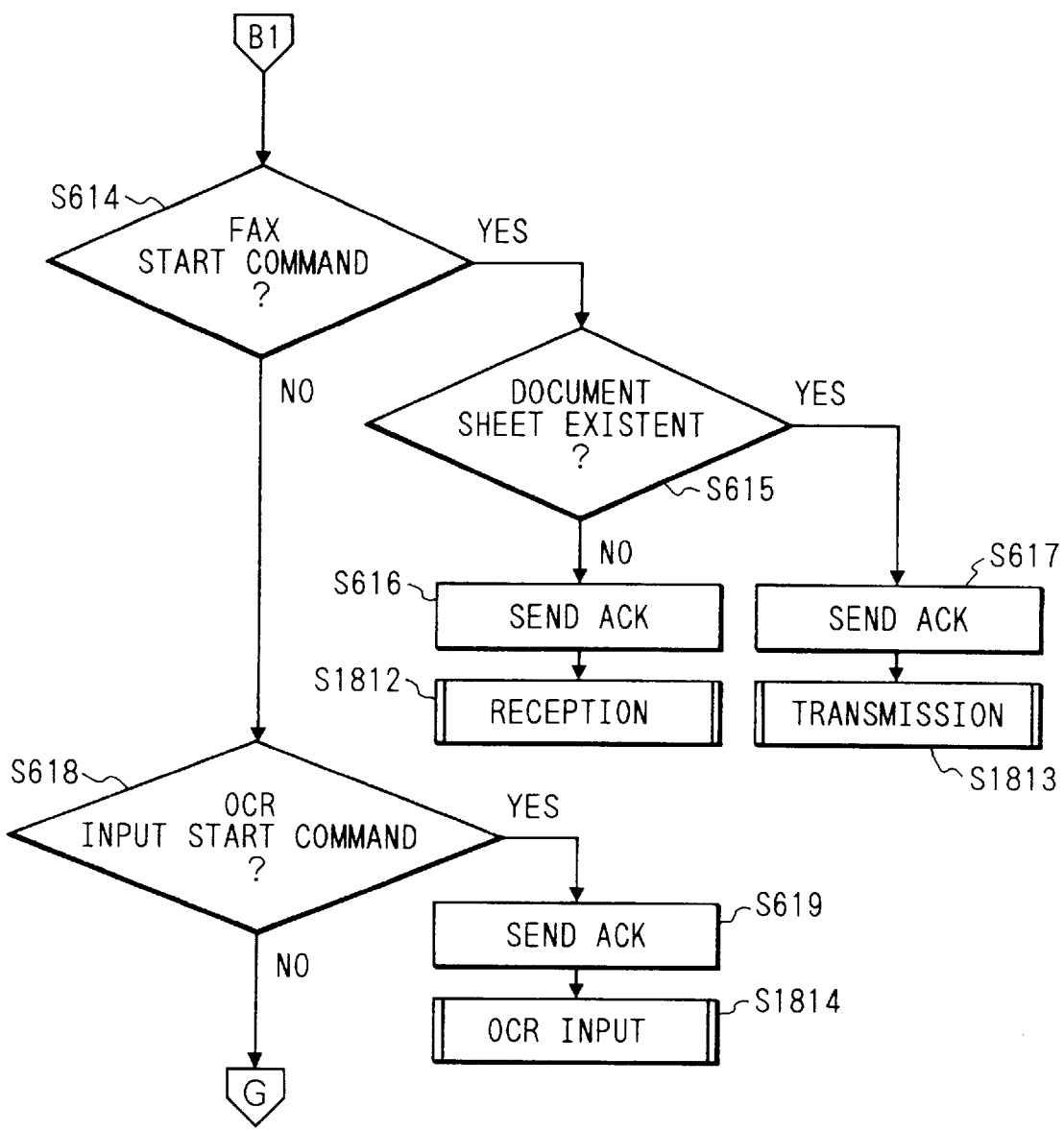
FIG. 9 is a flow chart showing the facsimile operation of the FAX main unit of this embodiment.

If the FAX start command (CC=011001/FAXSTART/CS=XX//) is received in step S614 of FIG. 9, and the document sheet is existent in step S615, an ACK is sent in step S617, and transmission is performed in step S1813. However, if any document sheet is not existent in step S615, an ACK is sent in step S616, and reception is performed in step S1812.

If the OCR input start command (CC=011001/OCRIN/CS=XX//) is received in step S618, an ACK is sent in step S619, and an OCR input operation is performed in step S1814.

Figure 10:
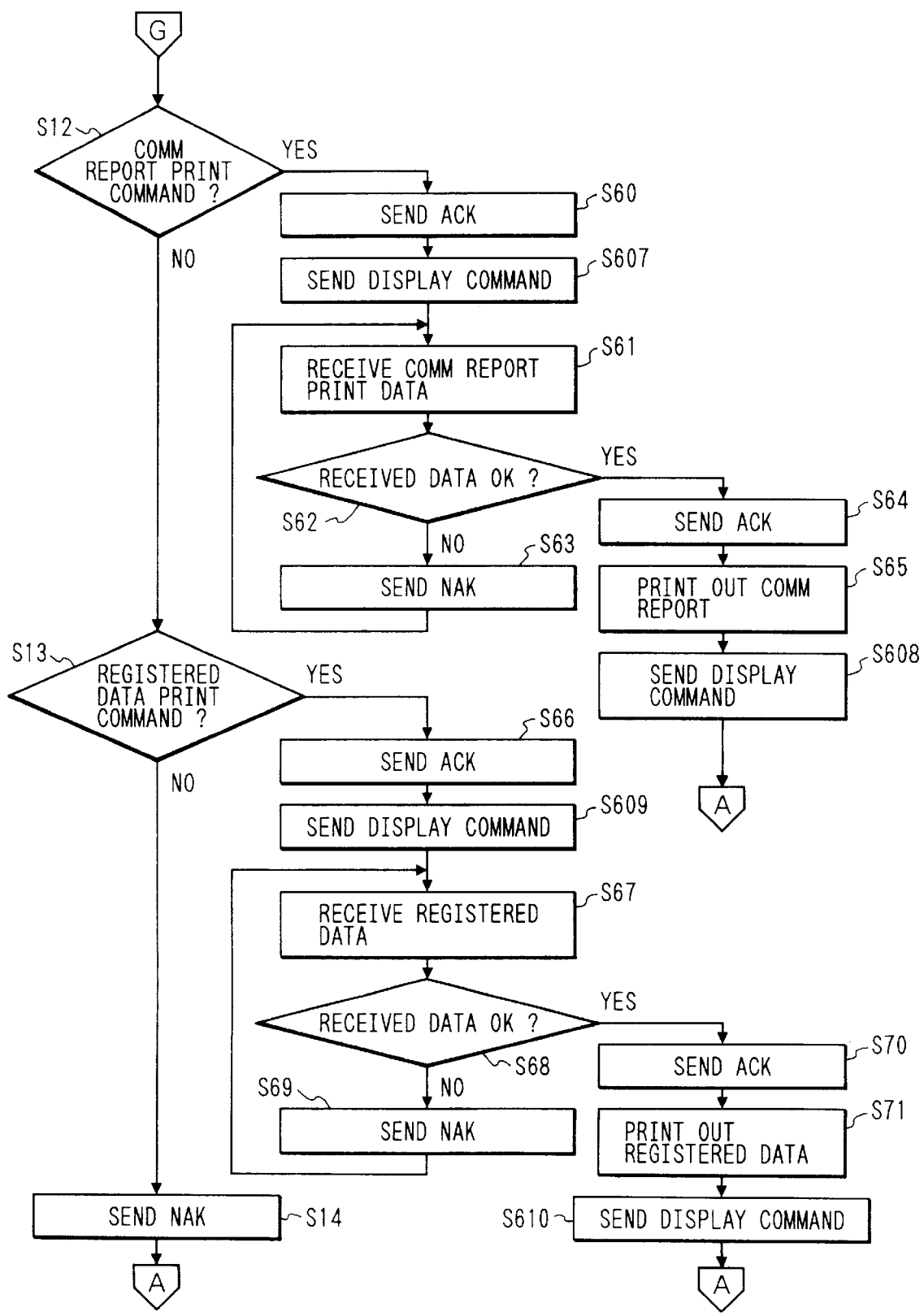
FIG. 10 is a flow chart showing the facsimile operation of the FAX main unit of this embodiment.

If the communication report print command (CC=011001/TRANSMITPRINT/CS=XX//) is received in step S12 of FIG. 10, an ACK is sent in step S60, and a display command is sent to the cellular unit in step S607. A comment saying that the communication report is being printed is displayed on the display of the cellular unit (i.e., "Communication Result Is On Printing" is displayed on the cellular LCD).

When the communication report print format data, the communication report print data, and the like are received from the cellular unit in the form of serial data in step S61, and if the received data are determined in step S62 to be OK, an ACK is sent in step S64. The communication report data is printed out in a predetermined format in step S65.

When printing is terminated, a display command is sent to the cellular unit in step S608, and a comment saying the end of printing of the communication report is displayed on the display of the cellular unit (i.e., "End of Printing of Communication Result" is displayed on the cellular LCD).

When all the operations are terminated, the flow returns to the stand-by mode.

If the received data is determined in step S62 not to be OK (i.e., if the sum of received data cannot be zero or an end mark // cannot be detected), an NAK is sent in step S63, and data is received again.

If the registered data print command (CC=011001/ ENTORYDATPRINT/CS=XX//) is received in step S13, the same operations as in the communication report data printing are performed except for the following items.

In steps S67 and S71, registered data print format and registered data of the cellular unit and the facsimile main unit are used in place of the communication report print format and the communication report print data in steps S61 and S65.

The display contents of the display of the cellular unit in steps S609 and S610 are different from those in steps S607 and S608.

In step S609, a command saying "on printing" of the registered data (i.e., "Registered Data Is On Printing") is displayed. In step S610, a comment saying the end of printing of the registered data ("end of Printing of Registered Data") is displayed.

Figure 7:
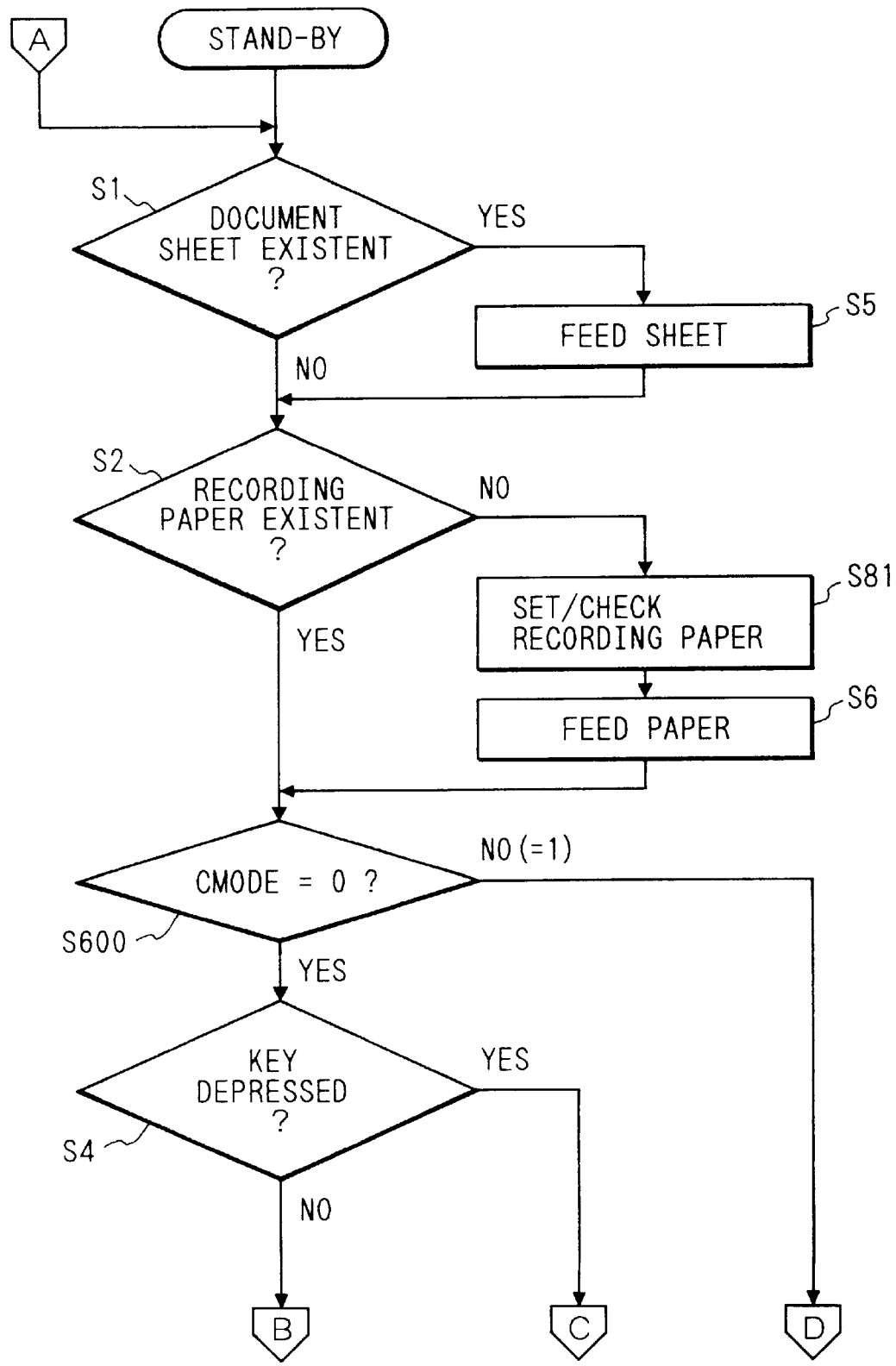
FIG. 7 is a flow chart showing a facsimile operation of the FAX main unit of this embodiment.

The flow C initiated when the connection is made using the serial interface and a key input is detected in step S4 of FIG. 7 (i.e., when CMODE=0 is determined in step S600 of FIG. 7) will be Described below.

Figure 11:
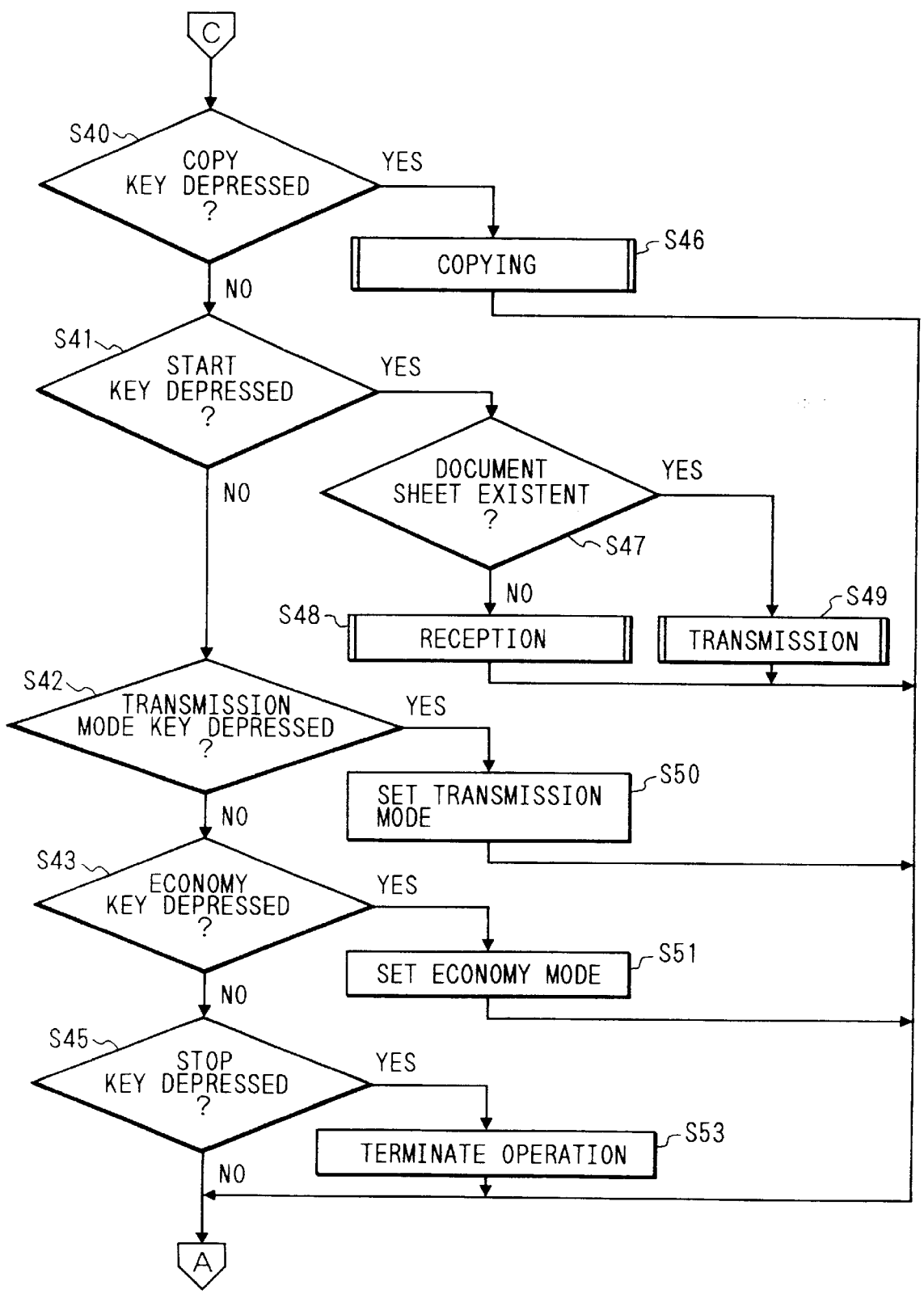
FIG. 11 is a flow chart showing the facsimile operation of the FAX main unit of this embodiment.

It is determined in step S40 of FIG. 11 whether a copy key is depressed. If YES in step S40, a copy mode is set in step S46.

If NO in step S40, it is determined in step S41 whether a start key is depressed.

If YES in step S41, it is determined in step S47 whether the document sheet is existent. If YES in step S47, the same operation as in manual facsimlle transmission is performed in step S49.

If NO in step S47, the receive mode is set in step S48.

If NO in step S41, it is determined in step S42 whether a transmission mode key is depressed. If YES in step S42, a transmission mode as a fine or standard transmission mode is set in step S50.

If the transmission mode key is not depressed, it is determined in step S43 whether an economy key is depressed. If YES in step S43, an economy node for performing thinning printing is set in step S51.

If NO in step S43, it is determined in step S45 whether a stop key is depressed. If YES in step S45, the operation is immediately terminated in step S53, and the flow returns to the stand-by mode.

If NO in step S45, depression of any one of the keys is not detected, and the flow returns to the stand-by mode.

The flow D initiated when a cellular unit having no serial interface with the facsimile main unit is connected thereto (i.e. when CMODE=1 is determined in step S600 in FIG. 7) will be described below.

Figure 12:
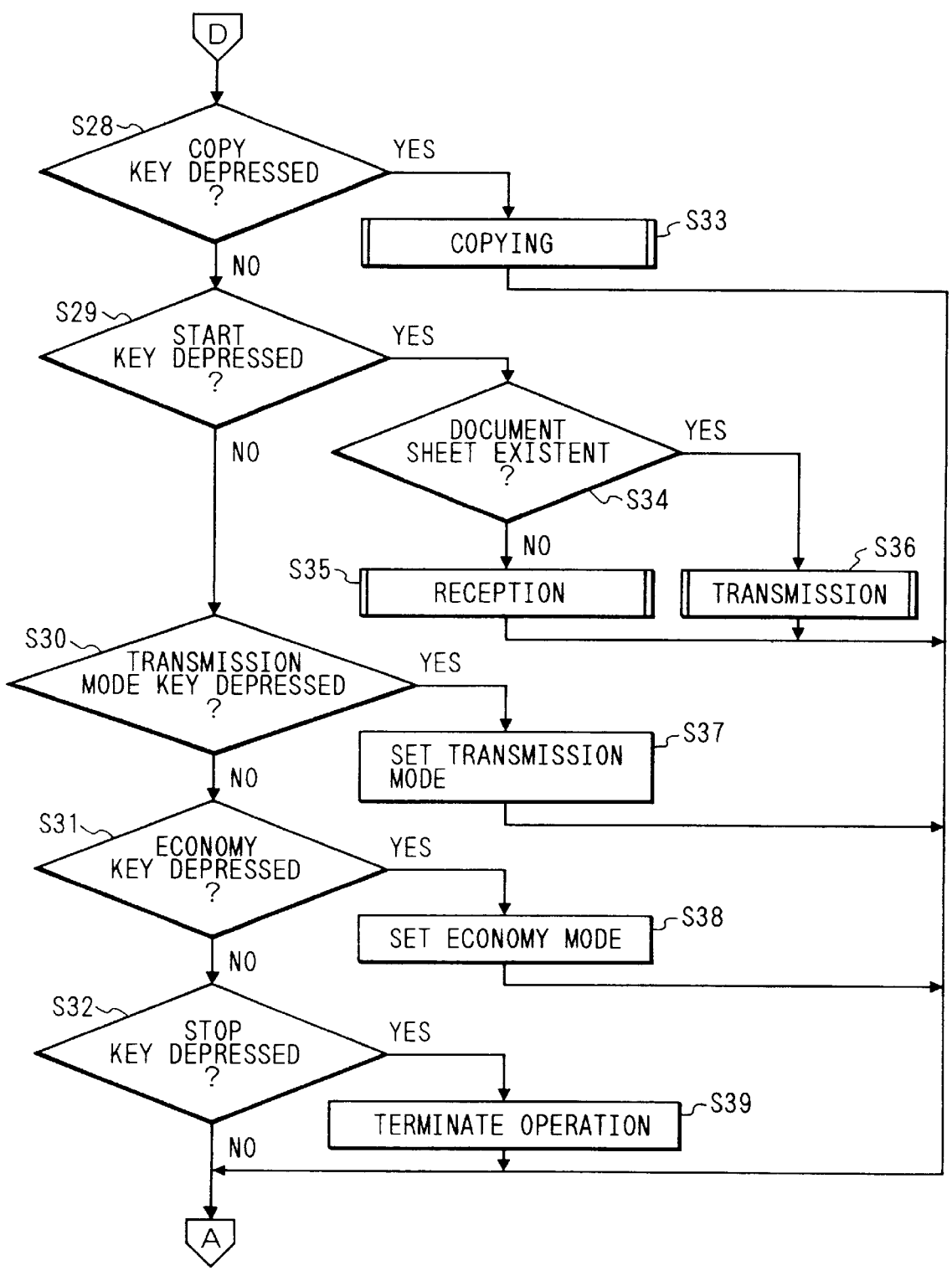
FIG. 12 is a flow chart showing the facsimile operation of the FAX main unit of this embodiment.

It is determined in step S28 of FIG. 12 whether the copy key is depressed. If YES in step S28, a copy mode is set in step S33.

If NO in step S28, it is determined in step S29 whether the start key is depressed.

If YES in step S29, it is determined in step S34 whether a document sheet is existent. If YES in step S34, the same operation as in conventional manual facsimile transmission is performed in step S36. However, if NO in step S34, the receive mode is set in step S35.

If NO in step S29, it is determined in step S30 whether the transmission mode key is depressed. If YES in step S30, the transmission mode as the fine or standard transmission mode is set in step S37.

If NO in step S30, it is determined in step S31 whether the economy key is depressed. If YES in step S31, the economy mode for performing thinning printing is set in step S38.

If NO in step S31, it is determined in step S32 whether the stop key is depressed. If YES in step S32, the operation is immediately terminated in step S39, and the flow returns to the stand-by mode.

If NO in step S32, depression of any one of the keys is not detected, and the flow returns to the stand-by mode.

Figure 13:
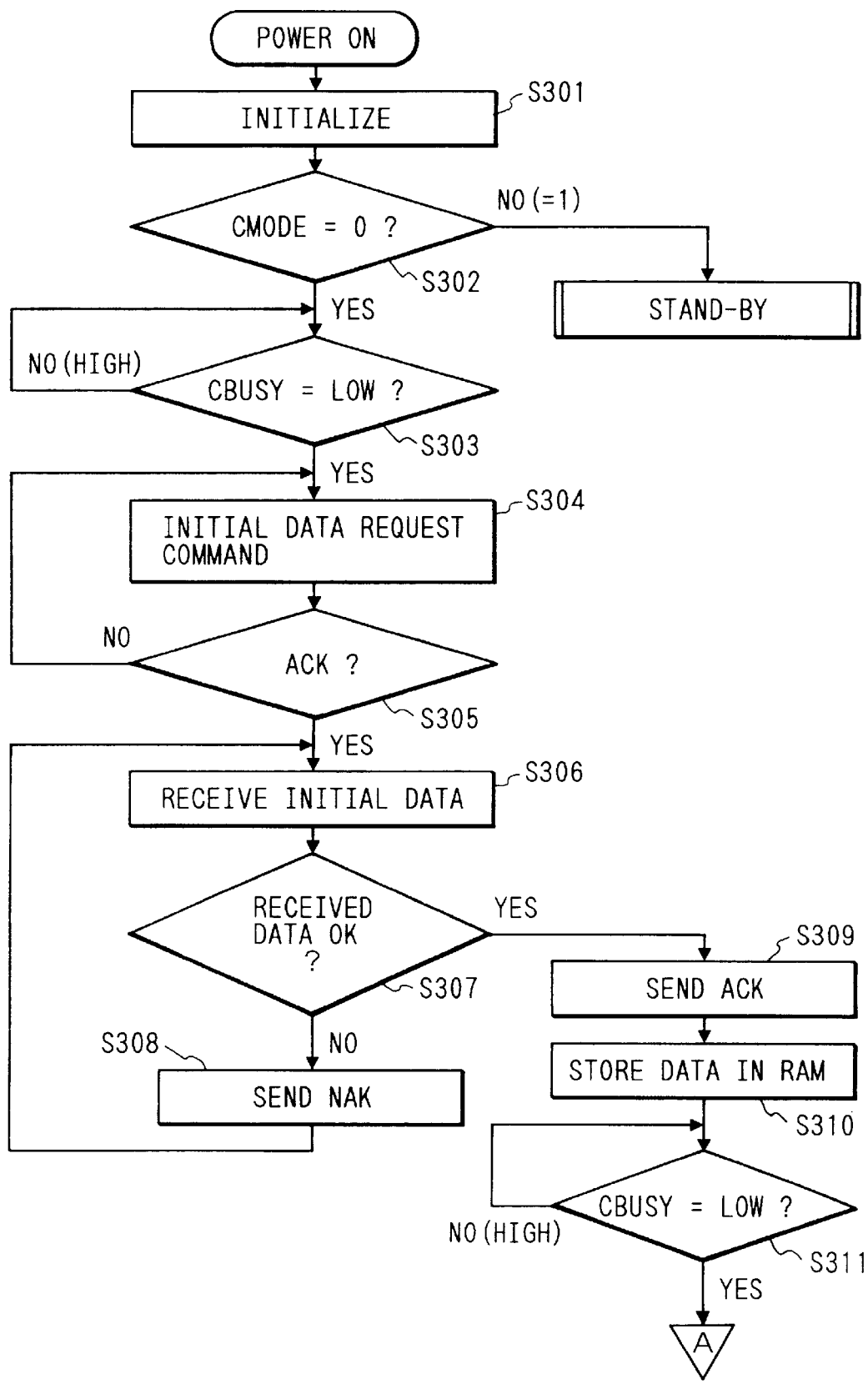
FIG. 13 is a flow chart showing a power-ON operation of the FAX main unit.
Figure 14:
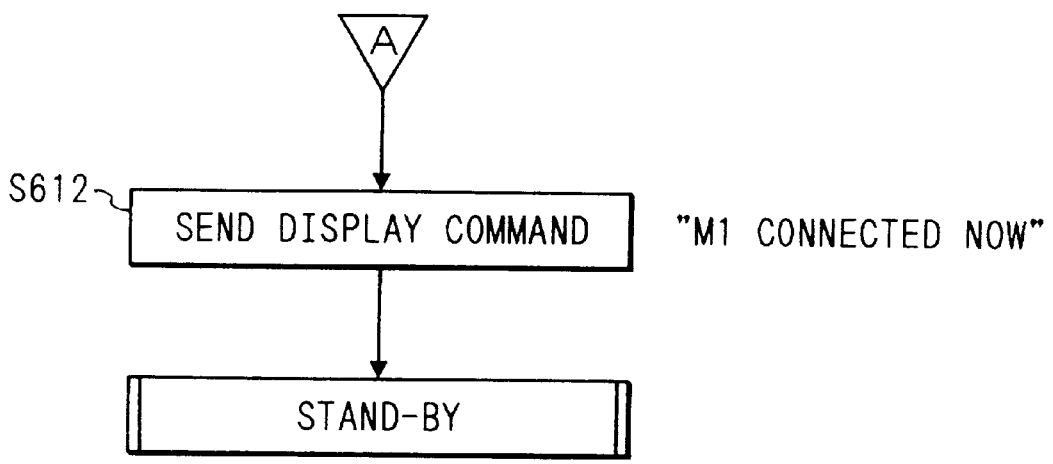
FIG. 14 is a flow chart showing the power-ON operation of the FAX main unit.

The power-ON operation of the FAX main unit will be described in detail with reference to flow charts in FIGS. 13 and 14.

Each I/O, the SRAM 1-3, and the like are initialized in step S301. If CMODE=1 in step S302, the flow is set in the stand-by mode.

If CMODE=0, then the CPU waits until the signal CBUSY of the cellular unit goes low in step S303. If CBUSY=L, then an initial data request command (CC= 010110/FDRQT/CS=XX//) is transmitted to the cellular unit in step S304. This command is retransmitted a maximum of three times until an ACK is received in step S305. When the ACK is received in step S305, initial data is received from the cellular unit in step S306. In step S307, if the sum of received data is zero, the received data is determined to be OK. In step S309, an ACK is sent back. The initial data received in step S310 is stored in the RAM 1-3. The CPU then waits until CBUSY=L is set in step S311. When CBUSY=L is set in step S311, a display command is sent in step S612 of FIG. 14 ("Terminal Is Connected" is displayed on the cellular LCD), and the flow returns to the stand-by mode.

If the sum of the received data is not zero in step S307, an NAK is sent in step S308, and the flow returns to step S306.

The copy operation in step S46 (FIG. 11) will be described in detail with reference to flow charts in FIGS. 15 and 16.

When the copy mode is set, it is determined in step S201 whether the signal CMODE in the contact is set at logic "0". If NO in step S201, the operations from step S207 are performed.

However, if YES in step S201, the flow advances to step S202. If the signal CBUSY is set at high level, this indicates that the cellular unit cannot receive any command. A command is not sent to the cellular unit, and the operations from step S207 are performed.

If the signal CBUSY is set to be low in step S202, a display command (CC=010110/DISP/CS=XX//) is sent to the cellular unit ("On Copying" is displayed on the cellular LCD).

After the display command is sent, a signal BAT/AC in a contact is set at logic "0" in step S2C7.

The signal BAT/AC is a signal for determining whether an AC power source or a battery is connected. The signal BAT/AC will be described in detail with reference to FIGS. 22A to 22C.

Figure 22A:
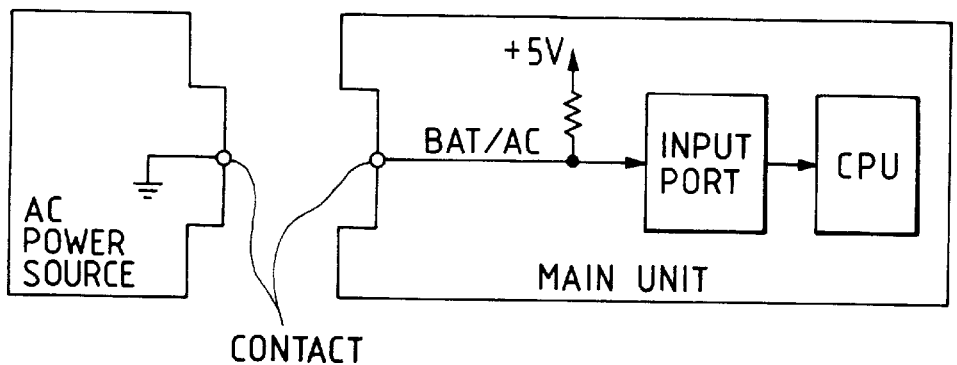
FIGS. 22A to 22C are block diagrams showing a power source determination scheme.
Figure 22B:
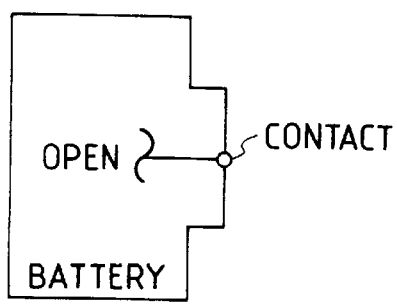
Figure 22C:
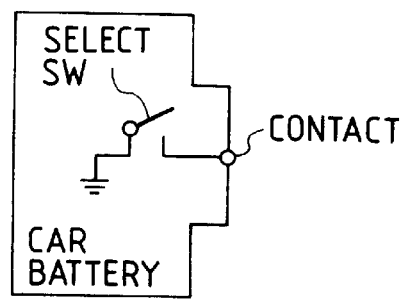

As shown in FIGS. 22A to 22C, the signal BAT/AC is pulled up to +5 V and input to an input port of the CPU. When the AC power source is connected, as shown in FIG. 22A, the signal BAT/AC is grounded through the contacts, the signal BAT/AC=0 is obtained.

When a battery is connected, as shown in FIG. 22B, the signal BAT/AC is open through the contacts and is set to be BAT/AC=1 due to the pull-up resistor in the main unit. When a car battery is connected, as shown in FIG. 22C, a car battery select switch is turned on when the capacity of the car battery is large to set the signal BAT/AC=0 through the contacts. When the capacity of the car battery is small, the select switch is turned off to set the signal BAT/AC=1 through the contacts.

Figure 15:
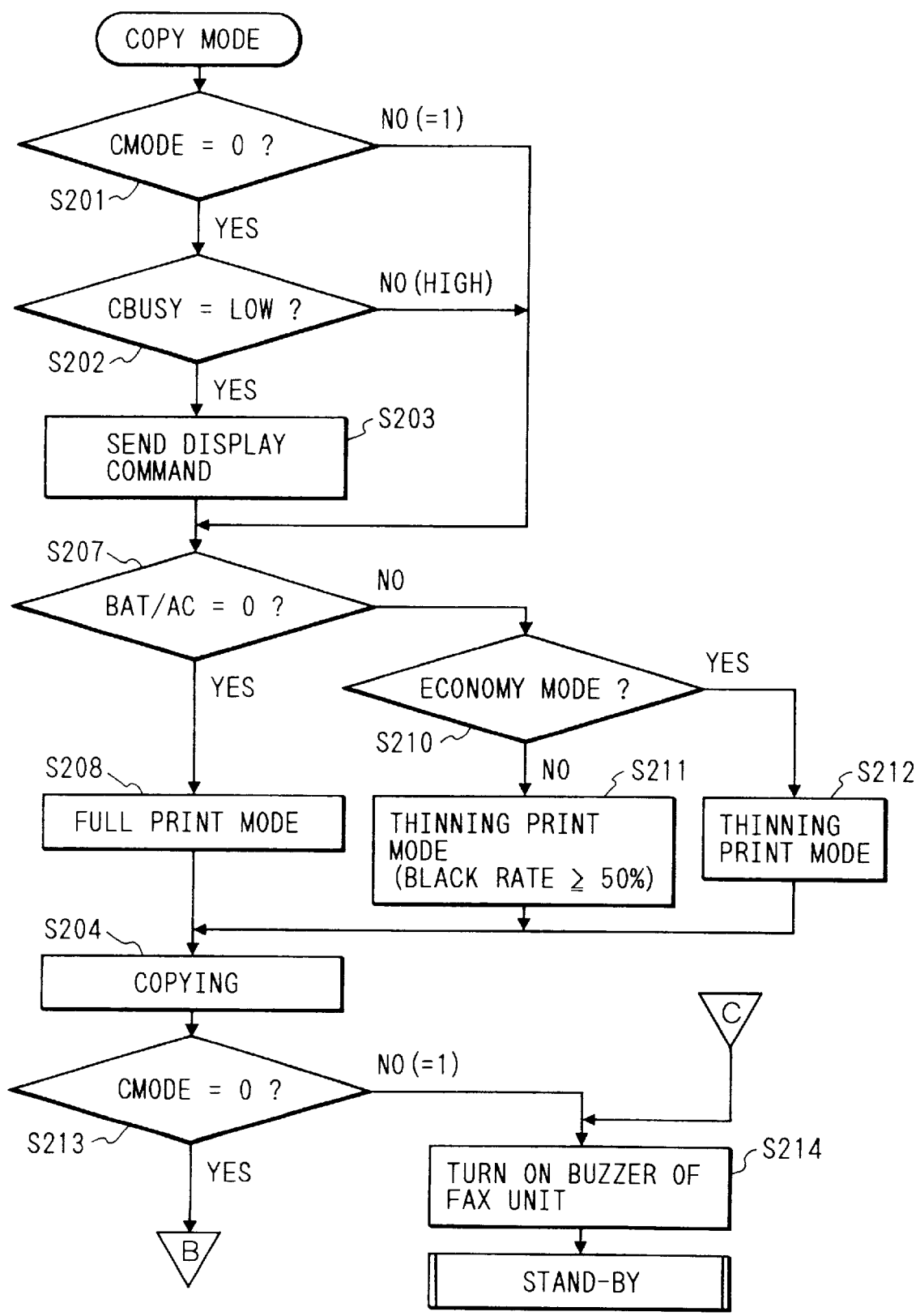
FIG. 15 is a flow chart showing a copy mode of the FAX main unit.

In step S207 of FIG. 15, if the signal BAT/AC=0, then a full print mode is set in step S208. If the signal BAT/AC=1, it is then determined in step S210 whether an economy mode is set. If YES in step S210, a thinning print mode is set in step S212. However, if NO in step S210, a thinning print mode is set in step S211 if a black rate is equal to or higher than 50%. In step S208, S211, or S212, the corresponding mode is set. In step S209, the copy operation is performed. At the end of the copy operation, if the signal CMODE is set at logic "1" in step S213, a sound representing the end of copy operation is generated by a buzzer in the FAX unit or FAX main unit in step S214, and the flow returns to the stand-by mode.

Figure 16:
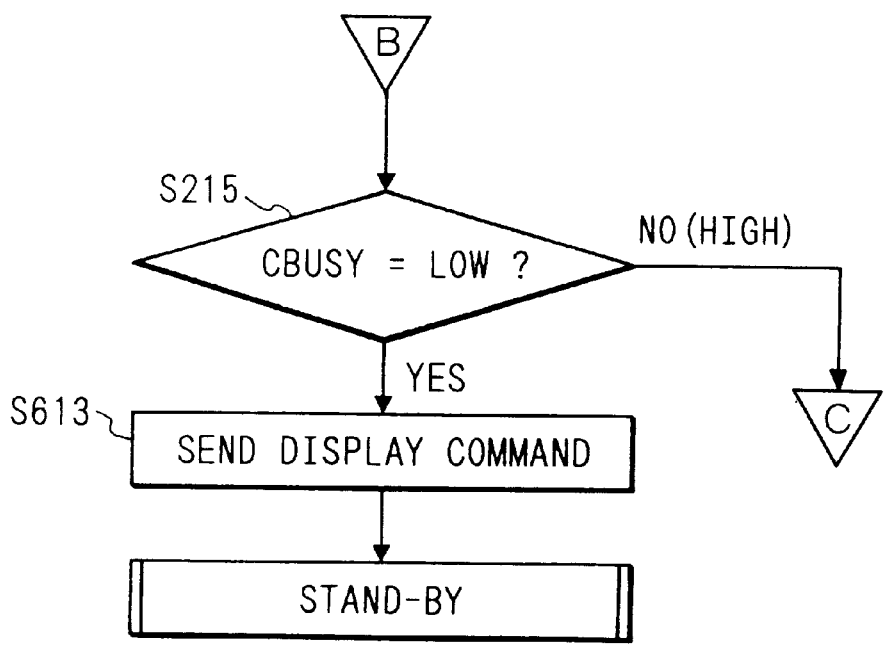
FIG. 16 is a flow chart showing the copy mode of the FAX main unit.

If CMODE=0 in step S213, the logic level of the signal CBUSY is determined in step S215 of FIG. 16. If CBUSY= H, then operations from step S214 ir FIG. 15 are performed. If CBUSY=L in step S215, a display command is sent in step S613 ("End of Copy" is displayed on the cellular LCD). A sound representing the end of copy operation is generated by the buzzer in the FAX unit, and the flow returns to the stand-by mode.

Figure 17:
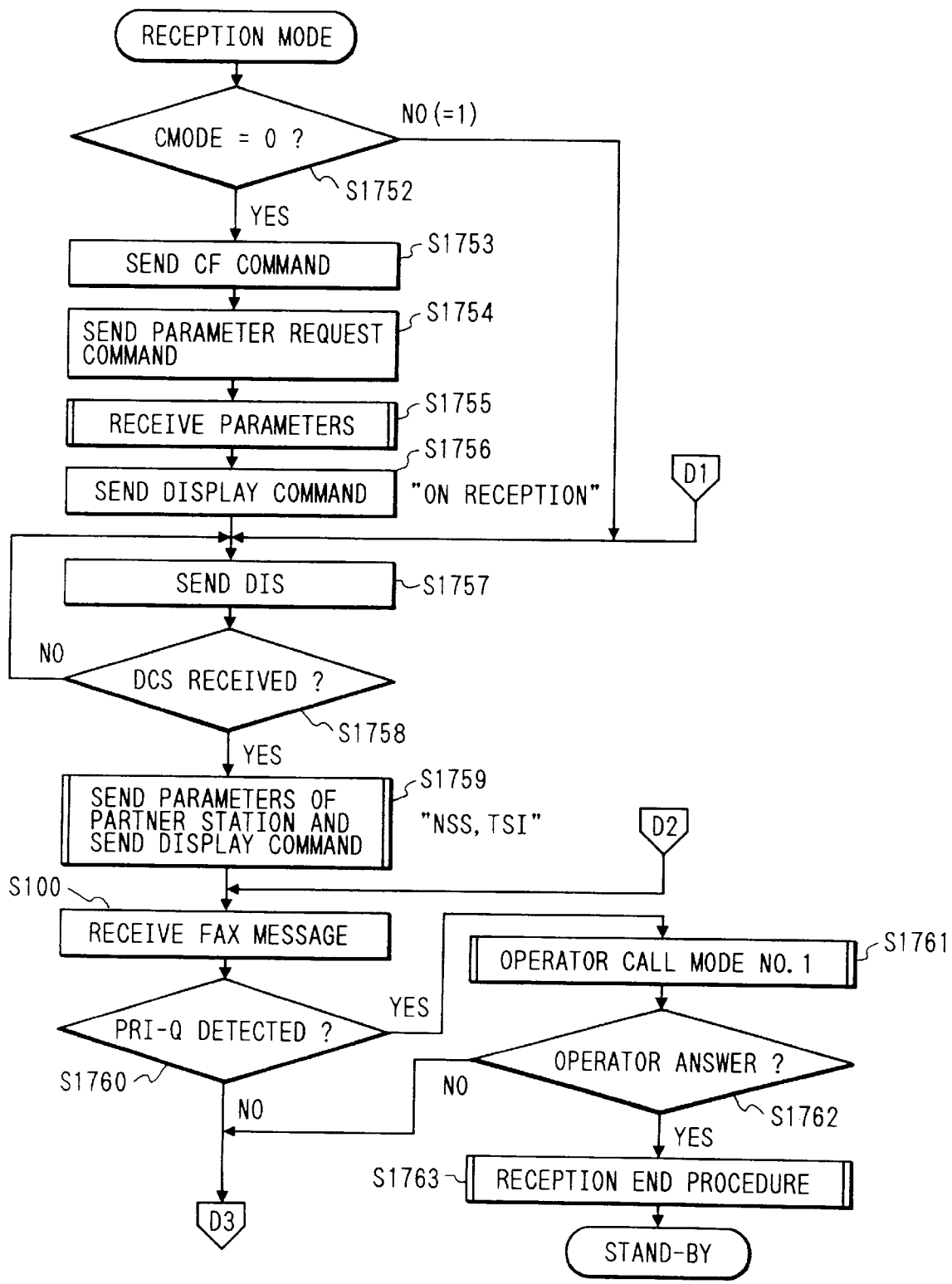
FIG. 17 is a flow chart showing a reception mode of the FAX main unit.
Figure 18B:
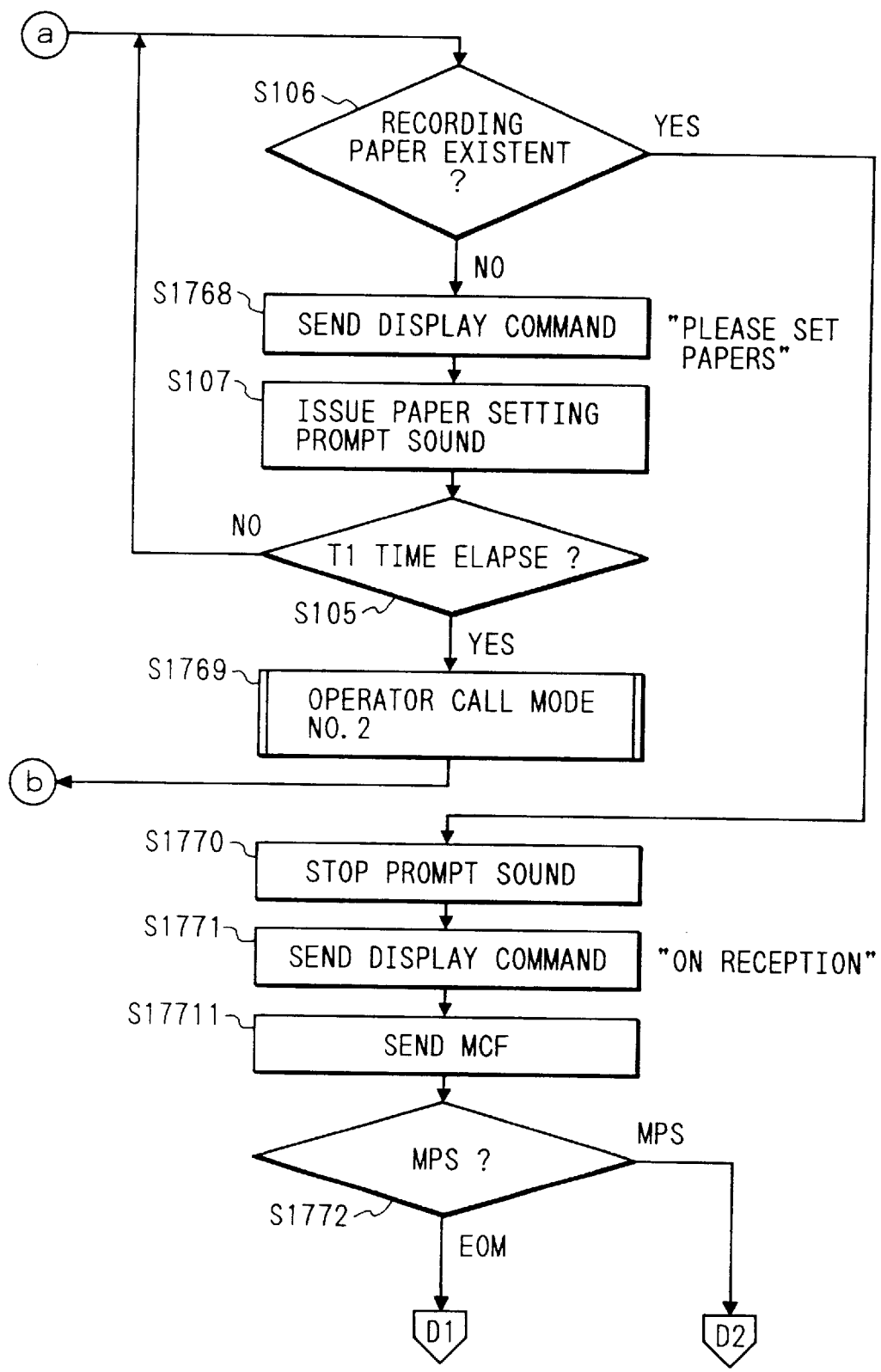
FIG. 18 is comprised of FIGS. 18A and 18B illustrating flow charts showing the reception mode of the FAX main unit.

The reception modes in steps S20, S48, and S1812 in FIGS. 7 to 12 will be described in detail with reference to flow charts in FIGS. 17, 18A and 18B.

When the reception mode is set, a cellular unit connected to the facsimile main unit is checked in step S1752.

If the cellular unit is connected to the facsimile main unit through the serial interface, a CF command is sent in step S1753 to switch the line to the facsimile.

In step S1755, a parameter request command is sent to request parameter data to the cellular unit. In step S1755, the parameters (start date, start time, a line telephone number, the types, characteristics, and states of a line and a cellular unit, the position information and country information of a cellular unit currently used, an operator name, the telephone number of a dialed partner, a registered message, a polling ID, a closed net ID, a communication enable IC list, automatic/manual setup, a reception start rate, an ECM ON/OFF state, a communication report format, a serviceman SW, a user SW, and the like) are transmitted with an CSI or NSF using these parameters to the partner; or these parameters are used to prepare a communication report; a communication enable ID is checked using these parameters; an optimal communication mode for each partner or each use position (country) is set using the parameters; a reception format for each use position (country) is prepared using the parameters; or the partner station is remote-controlled using the parameters) are transmitted. The transmitted parameters are received in a memory in the facsimile main unit, thereby performing facsimile reception.

In step S1756, a display command is sent to display a message as "on facsimile reception" on the display of the cellular unit ("On Reception" is displayed on the LCD).

In step S1757, a DIS is sent to receive a DSC from the facsimile partner station in step S1758.

In step S1759, partner information (e.g., a telephone number, an ID, and a name) from the received TSI and NSS is displayed on the display of the cellular unit (e.g., "03 1111 XXXX" and "Ichiro Suzuki" are displayed on the LCD).

In step S100, conventional facsimile message reception is performed.

If it is determined in step S1752 whether the facsimile main unit is connected to the cellular unit having no serial interface therewith, the parameters are data in the memory of the facsimile main unit. A facsimile message is received in an order of steps S757, S758, S759, and S100 in accordance with a conventional facsimile procedure.

After the RTC is received in step S100, it is determined in step S1760 whether an PRI-Q is detected.

If YES in step S1760, an operator call mode No. 1 is executed in step S1761. When the facsimile main unit is connected to the cellular unit through the serial interface, the operator is called.

At the end of the operator call mode No. 1, if it is confirmed in step S1762 that the operator answers the phone, the reception end procedure is executed in step S1763. The flow then returns to the stand-by mode.

If it is determined in step S1760 that the binary procedure which is not the PRI-Q is received, or if it is determined in step S1762 that the facsimile main unit is not connected to the cellular unit through the serial interface, or that the operator does not answer the phone, the flow advances from step S1760 or S1762 to step S101 in FIG. 18A to continue facsimile communication.

In steps S101, S102, and S103, it is determined whether signals MPS, EOM, and EOP are detested, respectively.

Any one of the signals is not detected, a DCN is sent in step S108. The reception end procedure is performed in step S766, and the flow returns to the stand-by mode.

If the signal EOP is detected in step S103, it is determined in step S1764 whether a call reservation command is detected.

If YES in step S1764, an operator call mode No. 2 is executed in step S1765 to request an operator call to the partner station. If the operator of the partner station answers the phone, the operator of the facsimile apparatus is called.

In step S1766, the reception end procedure is executed, and the flow returns to the stand-by mode.

If the call reservation command is not detected in step S1764, an MCF is sent in step S1766 to perform the reception end procedure. The flow then returns to the stand-by mode.

If the signal MPS or EOM is detected in step S101 or S102, it is determined in step S106 whether recording paper is existent.

If the recording paper is set, steps S770 and S771 (to be described later) are executed. An MCF is sent to the line in step S17711. In step S1772, the received binary command is checked to send the DIS in step S757 or receive the facsimile message in step S100, thus continuing facsimile communication.

If the recording paper is not set in step S106, a display command is sent in step S1768 ("Please Set Recording Paper" is displayed on the cellular LCD). In step S107, a recording paper prompt sound for prompting setting of recording paper is generated to prompt the operator to set recording paper. It is determined in step S105 whether a T1 time has elapsed.

The T1 time is a time required to set recording paper for the next facsimile message reception in the manual reception mode of cut sheets. The T1 time is determined to be about nine seconds in consideration of the MCF reception time range on the transmission side.

If the T1 time has not yet elapsed, it is determined in step S106 whether recording paper is set. If YES in step S106, the recording paper prompt sound is stopped in step S1770. In step S1771, a display command is output ("On Reception" is displayed on the cellular LCD). In step S17711, an MCF is sent to the line. The received binary command is checked in step S1772. If a signal EOM is detected, a DIS is sent in step S1757 of FIG. 17. When the signal MPS is detected in step S1772, the flow returns to the facsimile message reception operation in step S100 of FIG. 17, thereby continuing communication.

If the T1 time has elapsed in step S105, the operator call mode No. 2 is executed in step S1769 to inform that an error requires the operator of the partner station. If the operator of the partner station answers, the operator of the facsimile apparatus is called.

The reception end procedure in step S1766 is executed, and the flow returns to the stand-by mode.

Figure 19:
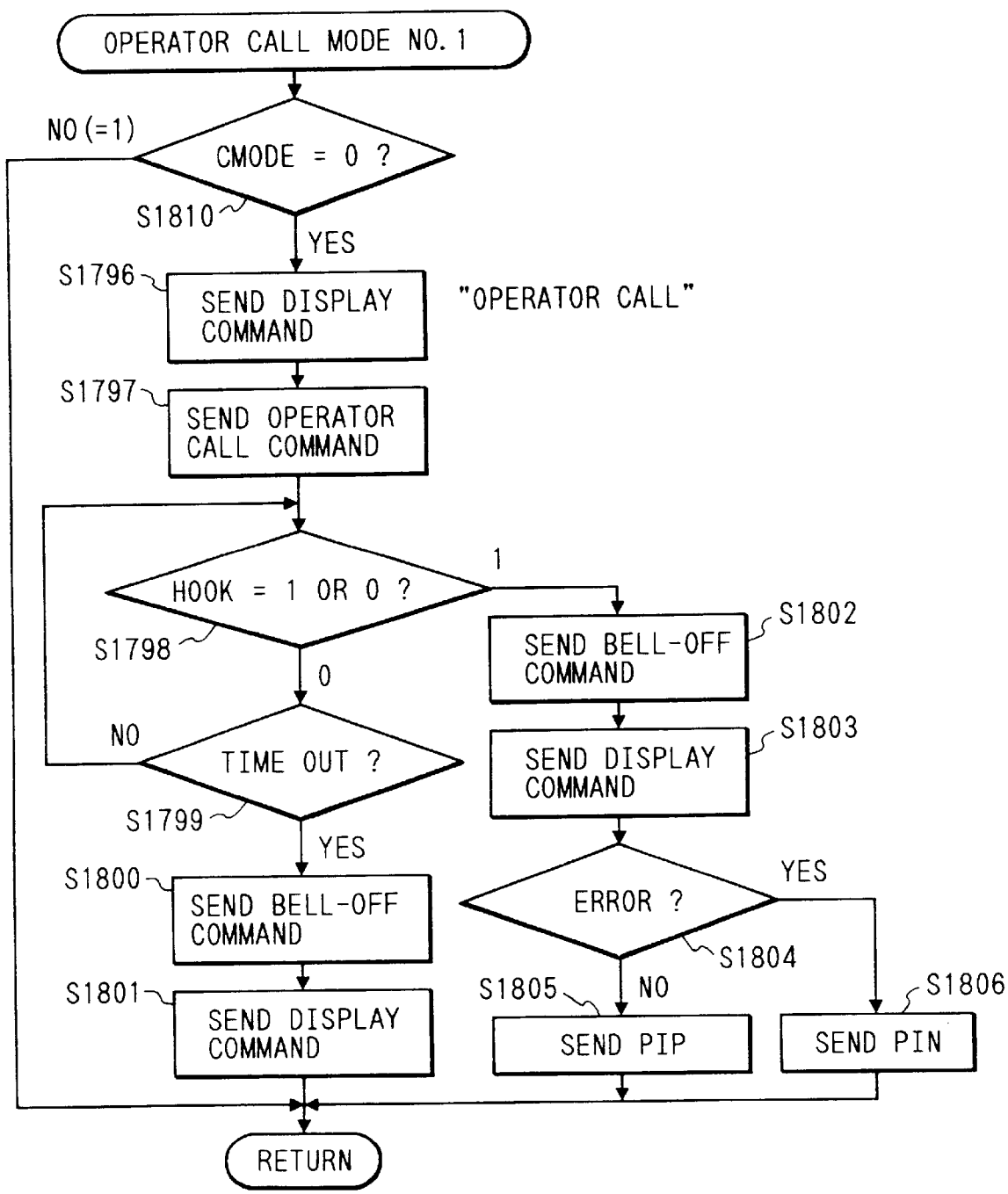
FIG. 19 is a flow chart showing the reception mode of the FAX main unit.

The operator call mode No. 1 in step S1761 of FIG. 17 will be described with reference to FIG. 19. The flow in FIG. 19 is a processing flow of a request for the operator from the partner station.

If it is determined (CMODE=1) in step S1810 that the facsimile main unit is not connected through the serial interface, this flow is not executed and ended.

If it is determined (CMODE=0) in step S1810 that the facsimile main unit is connected through the serial interface, this flow is executed.

If it is determined in step S1810 that this flow is executed, a display command is sent in step S1796 ("Please OFF-Hook" is displayed on the cellular LCD).

After the display command is sent, an operator call command is sent to the cellular unit in step S1797 to inform the cellular unit of an operator call (the cellular unit rings a bell or the like to call the operator. If the operator performs an OFF-hook operation, HOOK information is sent to the facsimile main unit, i.e., HOOK=1).

It is determined in step S1798 whether HOOK is 1 or 0 to determine whether the operator answers the phone.

If it is determined in step S1798 that HOOK is set at "1", this indicates that the operator answers the phone. In step S1802, a bell-OFF command is sent to the cellular unit to stop the bell. In step S1803, a display command is sent ("Please Speak" is displayed on the cellular LCD).

It is then determined in step S1804 whether an error has occurred in facsimile message reception.

If NO in step S1804, a PIP is sent to the partner station in step S1805, and the flow returns to the main flow.

If YES in step S1804, a PIN is sent to the partner station in step S1806, and the flow returns to the main flow.

If it is determined in step S1798 that HOOK is set at "0", this indicates that the operator does not answer the phone. A time from the operator call is checked in step S1799.

If it is determined in step S1799 that the time has not elapsed (not time out), the flow returns to step S1798 to check if the operator answers the phone.

If YES in step S1799, a bell-OFF command is sent in step S1800. In step S1801, a display command is sent ("On Reception" is displayed on the cellular LCD), and the flow returns to the main flow.

Figures 20, 20A:
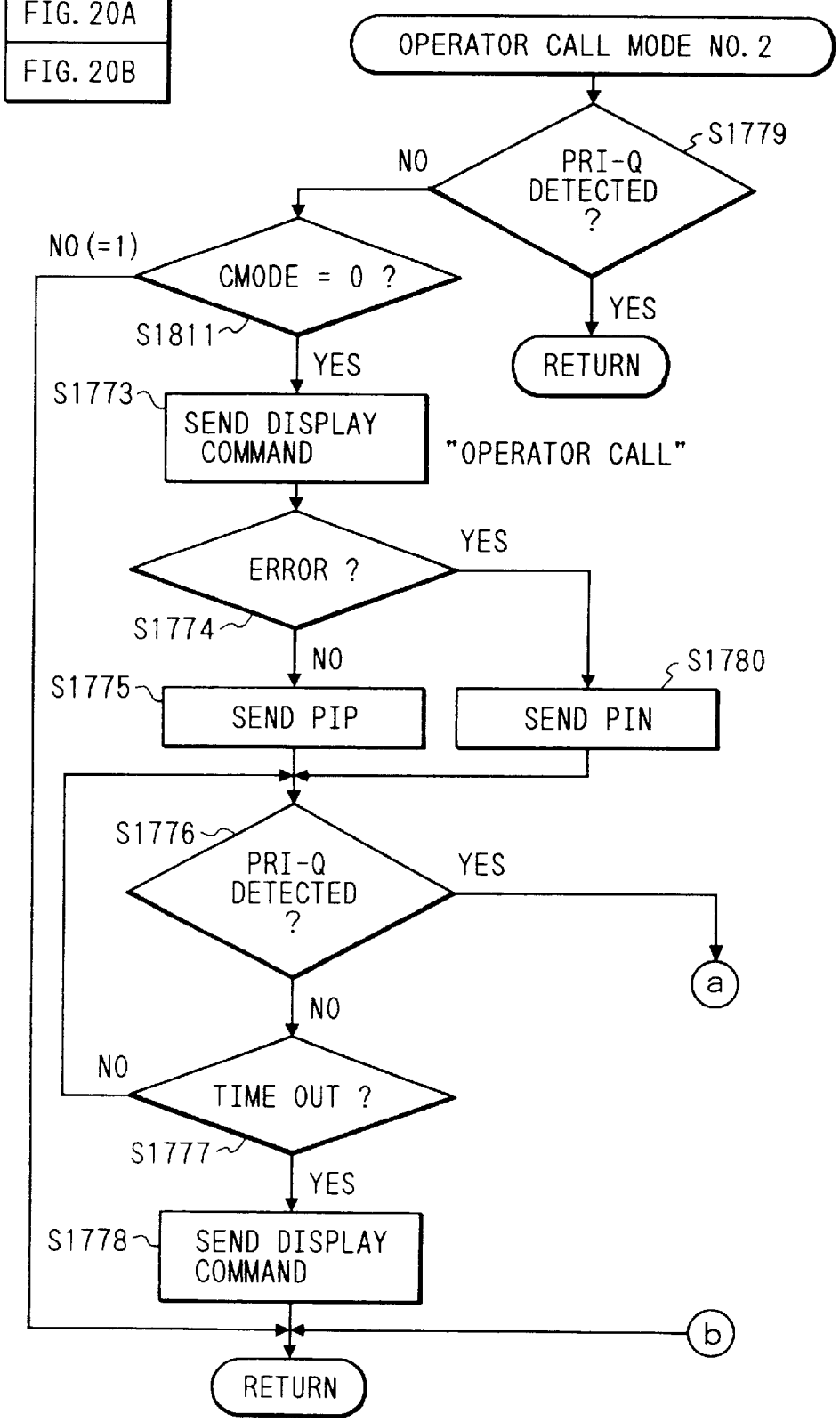
FIG. 20 is comprised of FIGS. 20A and 20B illustrating flow charts showing the reception mode of the FAX main unit.
Figure 20B:
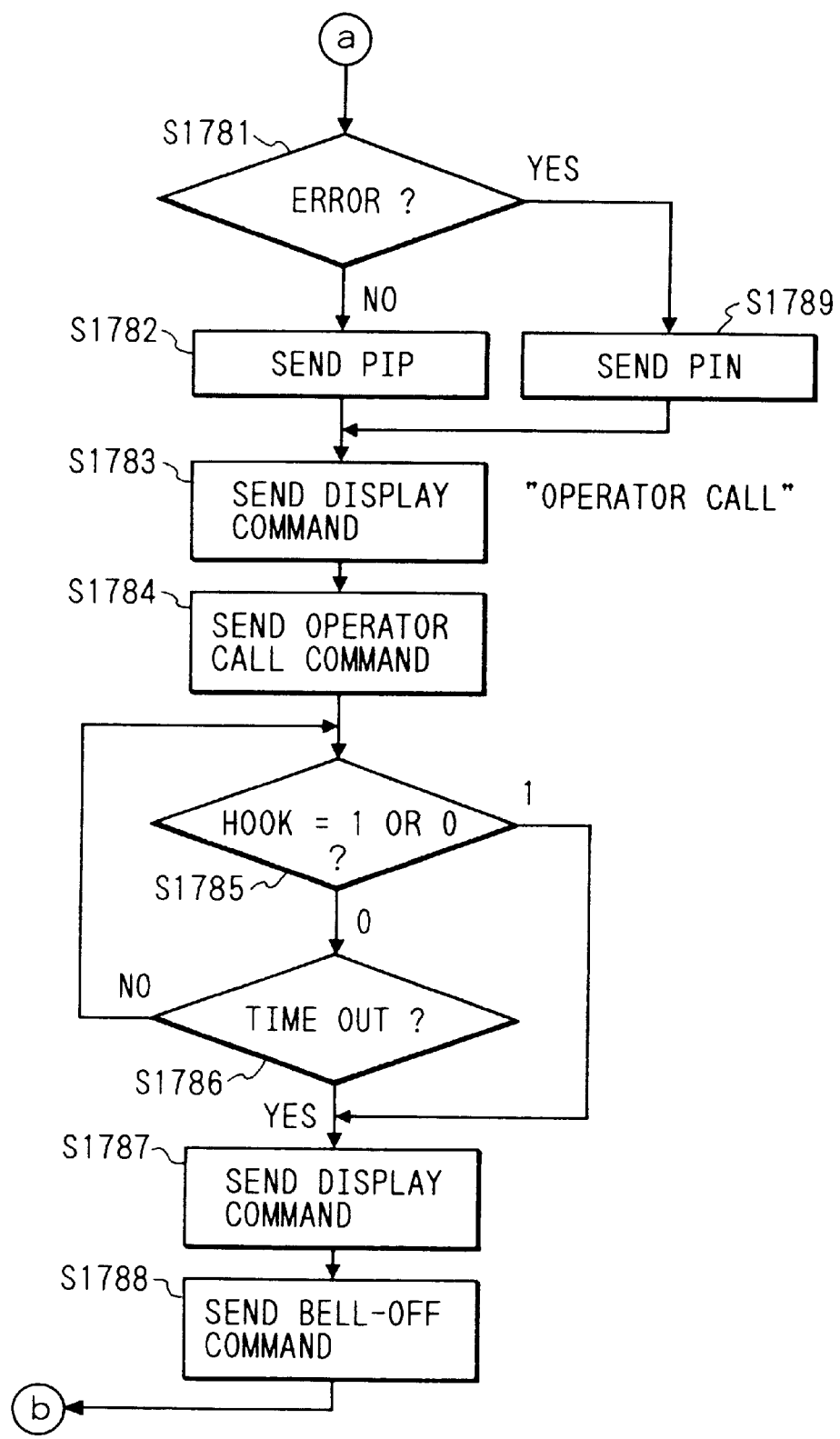

The operator call mode No. 2 in steps S1765 and S1769 in FIG. 18B will be described with a flow chart in FIGS. 20A an d 20B. The flow in FIGS. 20A and 20B is a processing flow of an operator request from the facsimile main unit.

It is determined in step S1779 whether the binary command received last is a PRI-Q.

If YES in step S1779, a call has been made in the operator call mode No. 2, and this flow will not be executed. In this case, the flow returns the main flow.

If YES in step S1779, this flow is executed.

If NO in step S1779, a partner station is checked in step S1811. If it is determined in step S1811 that the facsimile main unit is not connected to the cellular unit having the serial interface therewith (i.e., CMODE=1), this flow is not executed and is ended. The flow returns to the main flow.

If it is determined in step S1811 that the facsimile main unit is connected to the cellular unit having the serial interface therewith (i.e., CMODE=0), this flow is executed.

When it is determined in step S1811 that this flow is to be executed, a display command is sent in step S1773 ("On Calling Partner Station" is displayed on the cellular unit).

It is then determined in step S1774 whether an error has occurred in facsimile message reception.

If NO in step S1774, a PIP is sent to the partner station in step S1775.

If YES in step S1774, a PIN is sent to the partner station in step S1780.

After binary codes are sent back to the partner station in steps S1775 and S1780, it is determined in step S1776 whether a PRI-Q from the partner station is detected.

If YES in step S1776, step S1781 is executed.

If it is determined in step S1781 that no error has occurred in facsimile message reception and in step S1782 that an error is detected upon transmission of the signal PIP, a PIN is sent to the partner station in step S1789.

After the binary commands are sent in steps S1782 and S1789, a display command is sent in step S1783 ("Please OFF-Hook" is displayed on the cellular LCD). An operator call command is sent in step S1784 to inform the cellular unit of an operator call (the cellular unit turns on the bell or the like to call the operator. If the operator performs an OFF-hook operation, HOOK information is signaled to the facsimile main unit, i.e., "HOOK=1").

The HOOK information is then checked in step S1785 to determine whether the operator answers the phone.

If the signal HOOK is set at "1" in step S1785, this indicates that the operator answers the phone. A display command is sent in step S1787, a bell-OFF command is sent to the cellular unit to stop the bell in step S1788 ("Please Speak" is displayed on the cellular unit), and the flow returns to the main flow.

If the signal HOOK is set at "0" in step S1785, this indicates that the operator does not answer the phone. A time from the operator call is checked in step S1786.

If it is determined in step S1786 that the time has not yet elapsed, the flow returns to step S1785 to check whether the operator answers the phone.

If YES in step S1786, a display command is sent in step S1787 (the cellular LCD is cleared), and a bell-OFF command is sent in step S1788. The flow then returns to the main flow.

If the PRI-Q is not detected in step S1776, the time out is monitored in step S1777. If NO in step S1777, the flow returns to step S1776. If YES in step S1777, a display command is sent in step S1178 (the cellular LCD is cleared).

Figure 21:
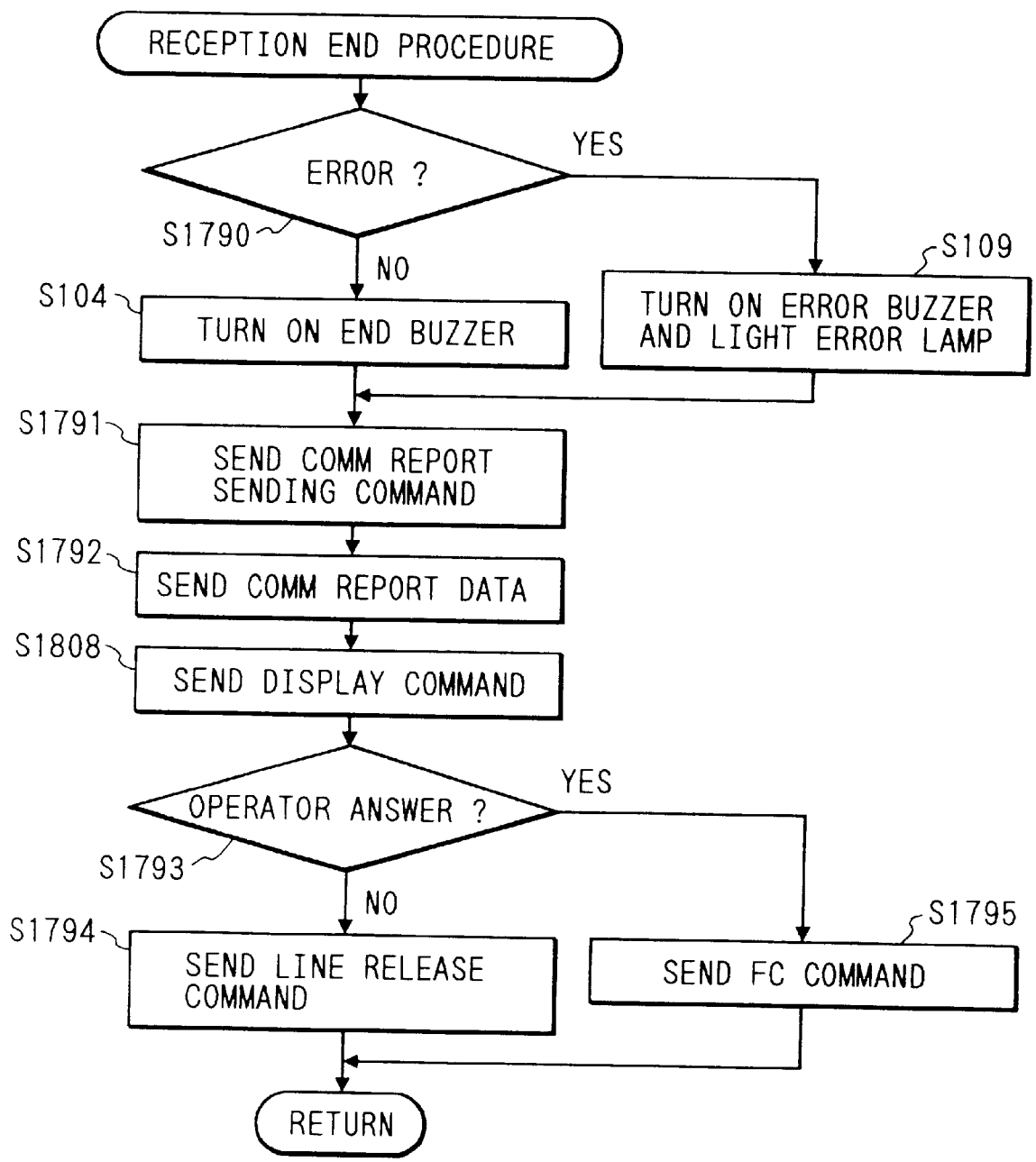
FIG. 21 is a flow chart showing the reception mode of the FAX main unit.

FIG. 21 is a flow chart showing the reception and procedure.

This flow performs the end procedure in the reception mode in steps S2, S48, and S1812 in FIGS. 7 to 12.

It is determined in step S1790 whether an error has occurred in facsimile message reception.

If an error is detected in step S1790, an error buzzer and an error lamp are turned on in step S109 (the signal DCN or the like is sent as needed).

If NO in step S1790, an end buzzer is turned on in step S104 (the signal MCF is sent as needed.

After the buzzers are turned on in steps S104 and S109, a communication report sending command is sent in step S1791. In step S1792, communication report data is sent. Therefore, the communication data (i.e., communication data for checking reception date, reception time, a communication time, a partner ID, a reception report, an error code, a reception mode, a reception page count, a user, and a serviceman) are sent to the cellular unit.

After the data are sent in step S1792, a display command is displayed in step S1808 (a communication report such as "OK" or "Error" is displayed on the cellular LCD).

It is then determined in step S1793 whether the operator answers the phone during the communication (i.e., it is determined whether the operator performs an OFF-hook operation).

If YES in step S1793, an FC command is sent in step S1795 to switch the line of the cellular unit to a speech communication side for the operator, thereby allowing the operator to speak to the partner. The flow then returns to the main routine.

If NO in step S1793, or no operator call is made, a line release command is sent in step S1794 to release the line. The flow then returns to the main routine.

An operation upon reception of a transmission command will be described with reference to flow charts in FIGS. 24 to 32.

After the transmission command is received, the signal CMODE is checked in step S700.

If CMODE=0 in step S700, the CPU determines that the facsimile main unit is connected to the cellular unit having the serial interface therewith. A CF command is sent in step S701 to switch the line to the facsimile side.

After the line is switched in step S701, a parameter request command is sent in step S702. In step S703, the parameters (start date, start time, a line telephone number, the types, characteristics, and states of a line and a cellular unit, the position information and country information of a cellular unit currently used, an operator name, the telephone number of a dialed partner, a registered message, a polling ID, a closed net ID, a communication allowing ID list, automatic/manual setup, a reception start rate, an ECM ON/OFF state, a communication report format, a serviceman SW, a user SW, and the like) are transmitted with an TSI or NSS using these parameters to the partner; or these parameters are used to prepare a communication report; a communication allowing ID is checked using these parameters; an optimal communication mode for each partner or each use position (country) is set using the parameters; a reception format for each use position (country) is prepared using the parameters; or the partner station is remote-controlled using the parameters) are received from a backup memory or the like of the cellular unit. Facsimile message transmission is executed rising these parameters.

A display command is sent in step S704 ("On Transmission" is displayed on the cellular unit).

Upon reception of the parameters, a lapse of 35 seconds is monitored in step S501 (T1 time out). During this period, it is determined in step S502 whether a DIS is received. If YES in step S502, normal FAX transmission defined by CCITT T.30 is performed in steps from step S705.

If CMODE=1 in step S700, the CPU determines that the facsimile main unit is connected through the serial interface, the parameters of the facsimile main unit are used to monitor the lapse of 35 seconds in step S501. During this period, it is determined in step S502 whether the DIS is received. If YES in step S502, normal FAX transmission defined by CCITT T.30 is performed in steps from step S705.

If the partner station cannot recognize that this transmission is facsimile transmission for 35 seconds in step S501, a redial command (CC=010110/REDIAL/CS=XX//) is sent in step S505. If an ACK is received in step S506, a communication report sending command is sent in step S712. Communication report data is sent in step S713, thereby sending the communication report data (e.g., a transmission report, transmission date, transmission time, and a transmission time interval) to the cellular unit.

A display command is then sent in step S714 ("No Answer" is displayed on the cellular LCD). A line release command is sent in step S715 to release the line.

After the line is released, the flow returns to the stand-by state.

If it is determined in step S502 that the DIS is received, a display command is sent to cause the display of the cellular unit to display partner station information (e.g., a telephone number, an ID, and a name) from the NSS and CSI previously received in step S705 ("03 3000 XXXX", "Ichiro Suzuki", and the like are displayed).

The partner station information is displayed in step S705, the DCS is sent in step S503. A facsimile message is transmitted complying with the CCITT T.30 in step S706.

When message transmission is terminated in step S706, the logic level of the signal CMODE is determined in step S812. It is then determined in step S707 whether a call reservation command has been received.

If CMODE=1 in step S812, then an EOP is sent in step S716.

If NO in step S707, the EOP is sent in step S716.

If YES in step S707, operations from step S708 are executed to request the partner station to call the operator.

A display command is sent in step S708 ("On Calling" is displayed on the cellular LCD). A PRI-EOP is transmitted to the partner station in step S709 to request the partner station to call the operator.

It is determined in step S710 whether signals PIP and PIN are detected.

If NO in step S710, the lapse of a waiting time of a reply from the partner station is checked in step S711.

If NO in step S711, the flow returns to step S710 to check the reply (i.e., PIP and PIN) from the partner station.

Figure 25:
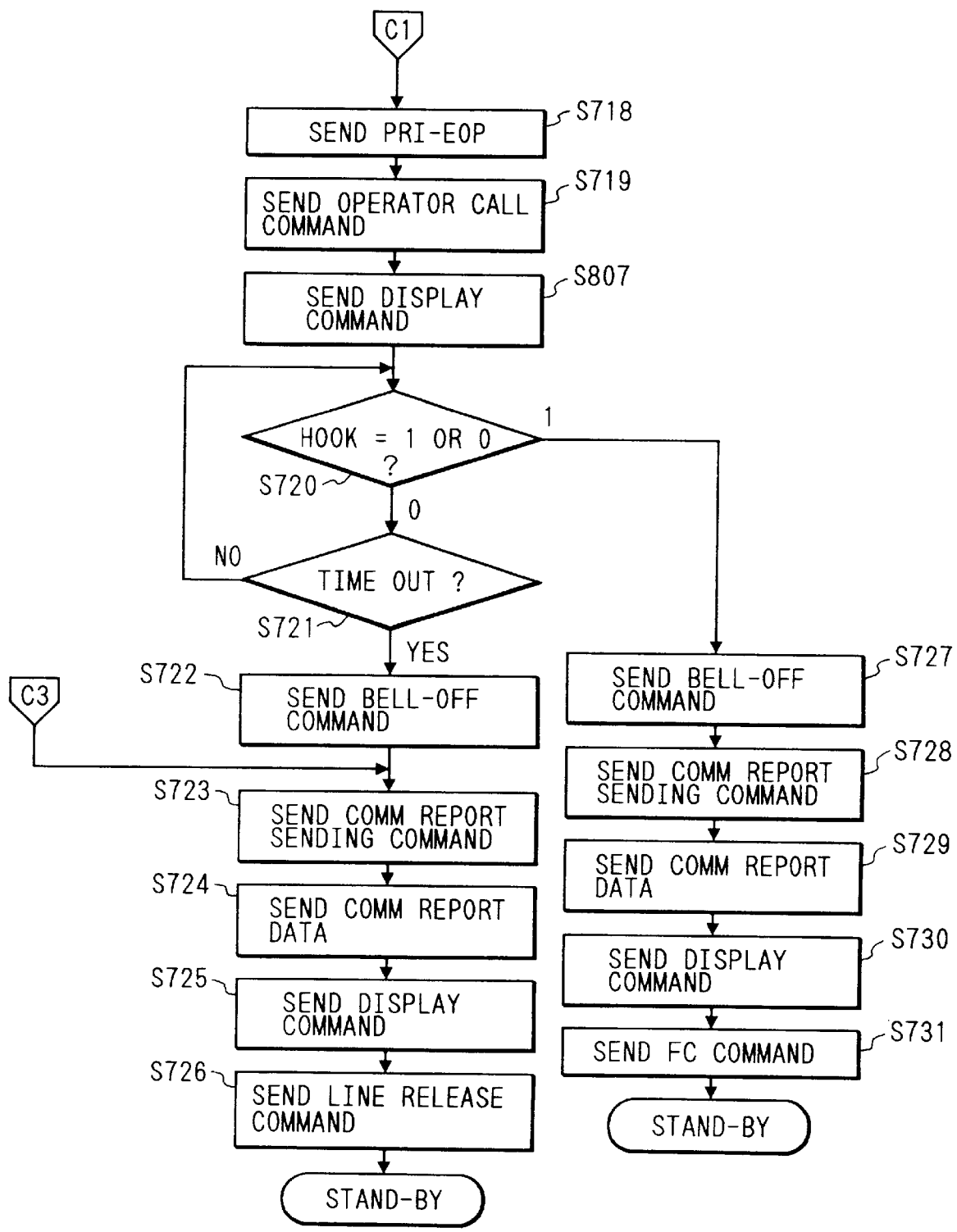
FIG. 25 is a simple flow chart showing the operation for receiving the transmission command in the FAX main unit.
Figure 26B:
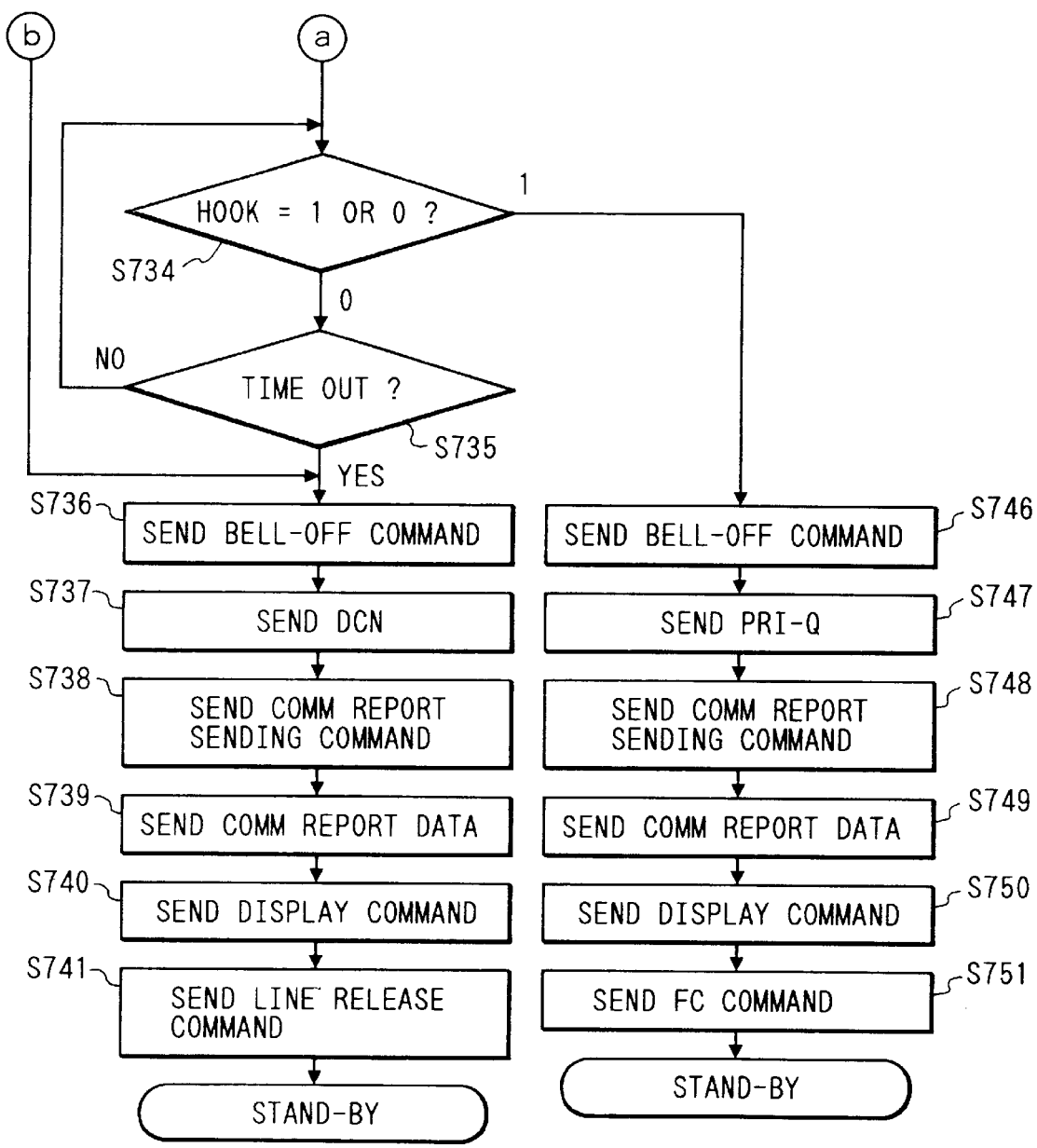
FIG. 26 is comprised of FIG. 26A and FIG. 26B illustrating simple flow charts showing the operation for receiving the transmission command in the FAX main unit.

If YES in step S711, an end procedure from step S723 in FIG. 25 is executed, and the flow returns to the stand-by mode.

If YES in step s710, an PRI-EOP is transmitted to the partner station in step S718 of FIG. 25.

An operator call command is sent in step S719 to send, to the partner station, a signal representing that the operation of the partner station is called through the cellular unit (the cellular unit turns on a bell or the like to call the operator. If the operator performs an OFF-hook operation, HOOK information is signaled to the facsimile main unit, i.e., "HOOK=1"). A display command is sent in step S807 ("Please OFF-Hook" is displayed on the cellular LCD).

The HOOK information is then checked in step S720 to determine whether the operator answers the phone.

If the signal HOOK is set at "1" in step S720, this indicates that the operator answers the phone. A bell-OFF command is sent to the cellular unit to stop the bell in step S727, and the end procedure from step S728 is executed.

A communication report sending command is sent in step S728, and communication report data are sent in step S729, thereby sending communication data (e.g., communication data for checking a partner ID, a transmission mode, a transmission report, an error code, transmission date, transmission time, a transmission page count, a user, and a serviceman) to the cellular unit. In step S730, a display command is sent ("Please Speak" is displayed on the cellular LCD). An FC command is sent in step S731 to switch the line from the facsimile side to the operator side. The flow then returns to the stand-by state.

If the signal HOOK is set at "0" in step S720, this indicates that the operator does not answer the phone. A time from the operator call is checked in step S721.

If it is determined in step S721 that the time has not yet elapsed, the flow returns to step S720 to check whether the operator answers the phone.

If YES in step S721, a bell-OFF command is sent in step S722, and the end procedure from step S723 is executed.

A communication report sending command is sent in step S723, and communication report data are sent in step S724, thereby sending the exchange data (e.g., a transmission report, transmission date, transmission time, a transmission time interval, and a transmission page count) to the cellular unit. In step S725, a display command is sent. In stp S726, a line release command is sent to release the line. The flow then returns to the stand-by mode.

Figure 24B:
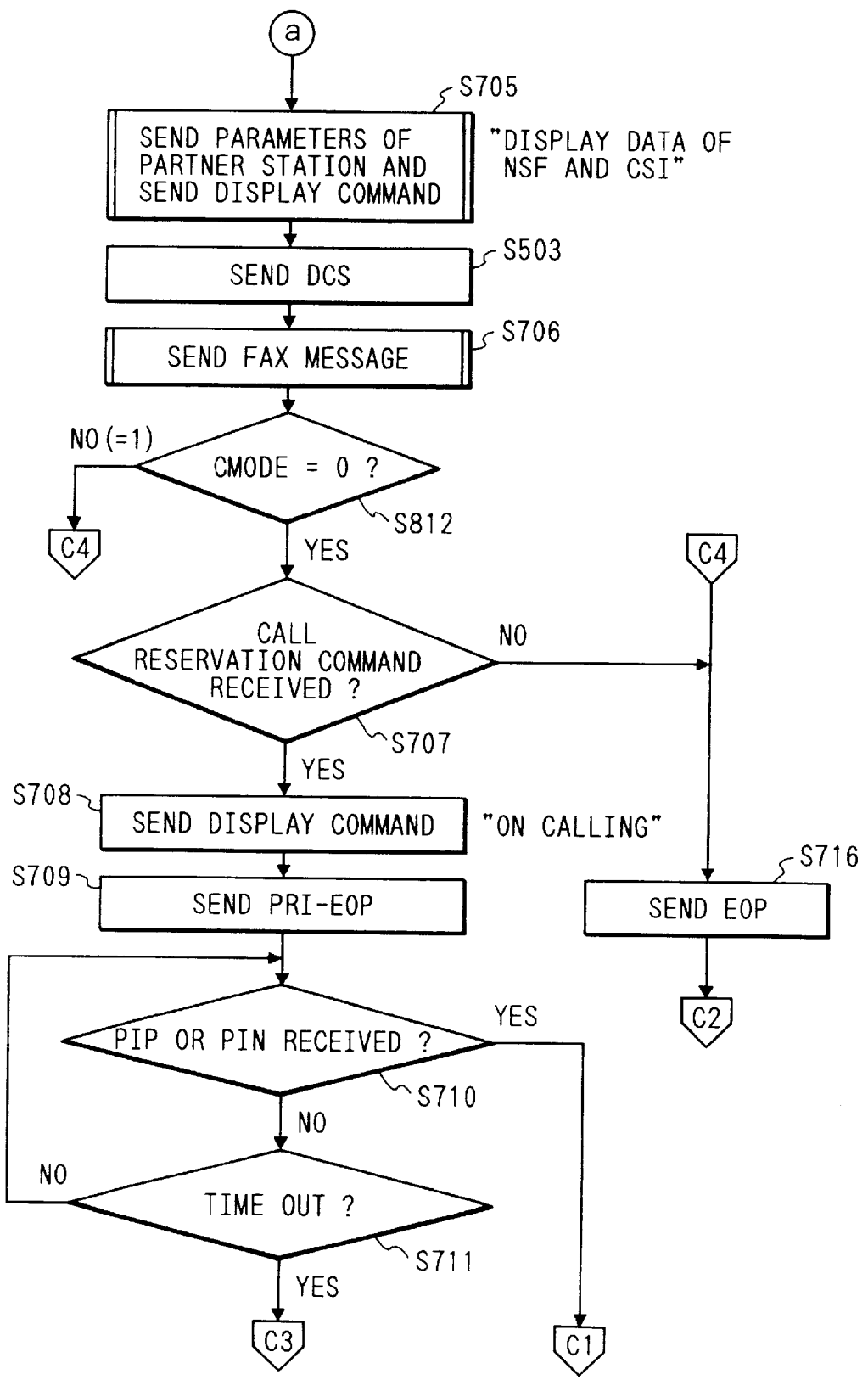
FIG. 24 is comprised of FIG. 24A and FIG. 24B illustrating simple flow charts showing an operation for receiving a transmission command in the FAX main unit.

If the reply signals from the partner station are not the signals PIP and PIN in step S732 of FIG. 26A after an EOP is transmitted in step S716 of FIG. 24B, a DCN is transmitted in step S7321, and an end procedure from step S742 is executed.

A communication report sending command is sent in step S742, and communication report data are sent in step S743, thereby sending the exchange data (e.g., a transmission report, transmission date, transmission time, a transmission time interval, and a transmission page count) to the cellular unit. In step S744, a display command is sent ("OK" or "Error" is displayed on the cellular LCD). In step S745, a line release command is sent to release the line. The flow then returns to the stand-by mode.

If the reply signals from the partner station are the signals PIP and PIN in step S732, an operator call from step S809 is executed.

The logic level of the signal CMODE is checked in step S809. If CMODE=1, then a DCN is sent, and the end procedure from step S736 is executed. The flow returns to the stand-by mode.

If CMODE=0 in step S809, then an operator call command is sent in step S733 to inform the cellular unit of an operator call (the cellular unit turns on a bell or the like to call the operator. If the operator performs the OFF-hook operation, HOOK information is signaled to the facsimile main unit, i.e., "HOOK=1").

A display command is sent in step S8081 ("Please OFF-Hook" is displayed on the cellular LCD).

The signal HOOK is checked in step S734 to determine whether the operator answers the phone.

If the signal HOOK is set at "1" in step S734, this indicates that the operator answers the phone. A bell-OFF command is sent to the cellular unit in step S746 to stop the bell. A PRI-EOP is sent to the partner station in step S747 to inform that the operator has answered the phone. An end procedure from step S748 is executed.

A communication report sending command is sent in step S748, and communication report data are sent in step S749, thereby sending the exchange data (e.g., a transmission report, transmission date, transmission time, a transmission time interval, and a transmission page count) to the cellular unit. In step S750, a display command is sent ("Please Speak" is displayed on the cellular LCD). In step S751, an FC command is sent in step S751 to switch the line from the facsimile side to the cellular unit side so as to set the speech communication state. The flow then returns to the stand-by mode.

If the signal HOOK is set at "0" in step S734, this indicates that the operator does not answer the phone. A time from the operator call is checked in step S735.

If NO in step S735, the flow returns to step S734 to check whether the operator answers the phone.

If YES in step S735, a bell-OFF command is sent in step S736, a DCN is sent in step S737, and the end procedure from step S738 is executed.

A communication report sending command is sent in step S738, and communication report data are sent in step S739, thereby sending the exchange data (e.g., a transmission report, transmission date, transmission time, a transmission time interval, and a transmission page count) to the cellular unit. In step S740, a display command is sent. In step S741, a line release command is sent to release the line. The flow then returns to the stand-by mode.

Figure 41:
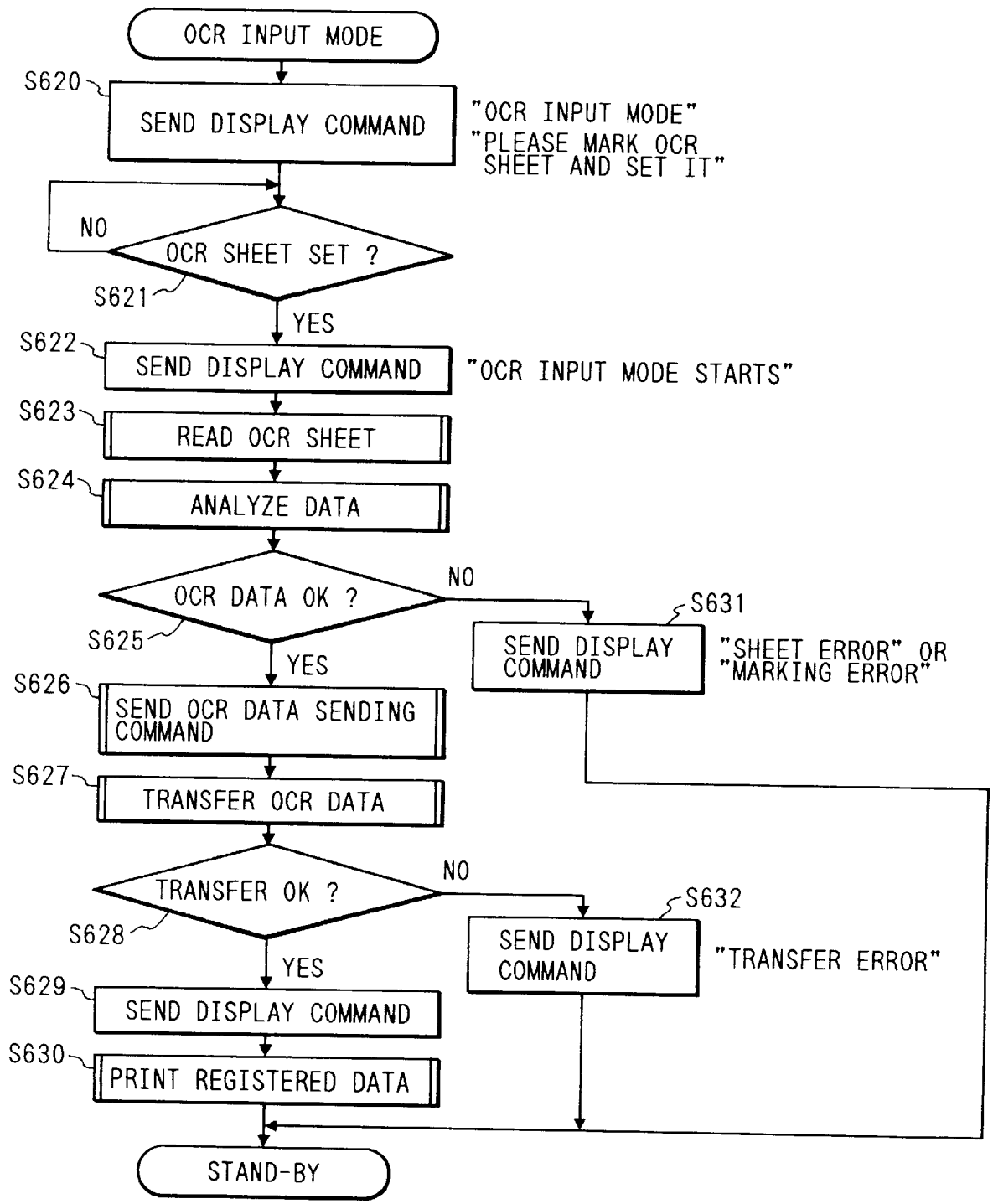
FIG. 41 is a flow chart showing data registration in an OCR input mode.

The OCR input operation in step S1814 of FIG. 9 will be described with reference to a flow chart in FIG. 41.

A display command is sent in step S620 ("OCR Input Mode" "Please Mark OCR Sheet and Set It" is displayed on the cellular LCD). The CPU waits until an OCR sheet is set in step S621.

If YES in step S621, a display command is sent in step S622 ("OCR Input Mode Starts" is displayed on the cellular LCD). In step S623, reading of the OCR sheet is started. When this reading operation is completed, data is analyzed in step S624.

Upon completion of data analysis, it is determined in step S625 whether the data is OK. If YES in step S625, an OCR data sending command is sent to the cellular unit in step S626. In step S627, OCR data (the facsimile main unit data [e.g., TTI, CSI, and a modem rate at the start of communication] and cellular unit data [e.g., a one-touch dial number and a redial wait time]) are sent to the cellular unit.

If it is confirmed in step S628 that an ACK is sent back after the OCR data are sent in step S627, it is determined that transfer is OK. In step S629, a display command is sent in step S629 ("OK" is displayed on the cellular LCD). In step S630, the registered data is printed, and it is confirmed by the operator.

When printing is ended, the flow returns to the stand-by mode.

If NO in step S625, an error display command is sent in step S631 ("Sheet Error" or "Marking Error" is displayed on the cellular LCD). The flow then returns to the stand-by mode.

If any error (e.g., nondetection of the signal ACK) is confirmed in step S628, an error display command is sent in step S632 ("Transfer Error" is displayed on the cellular LCD), and the flow returns to the stand-by mode.

Figure 42:
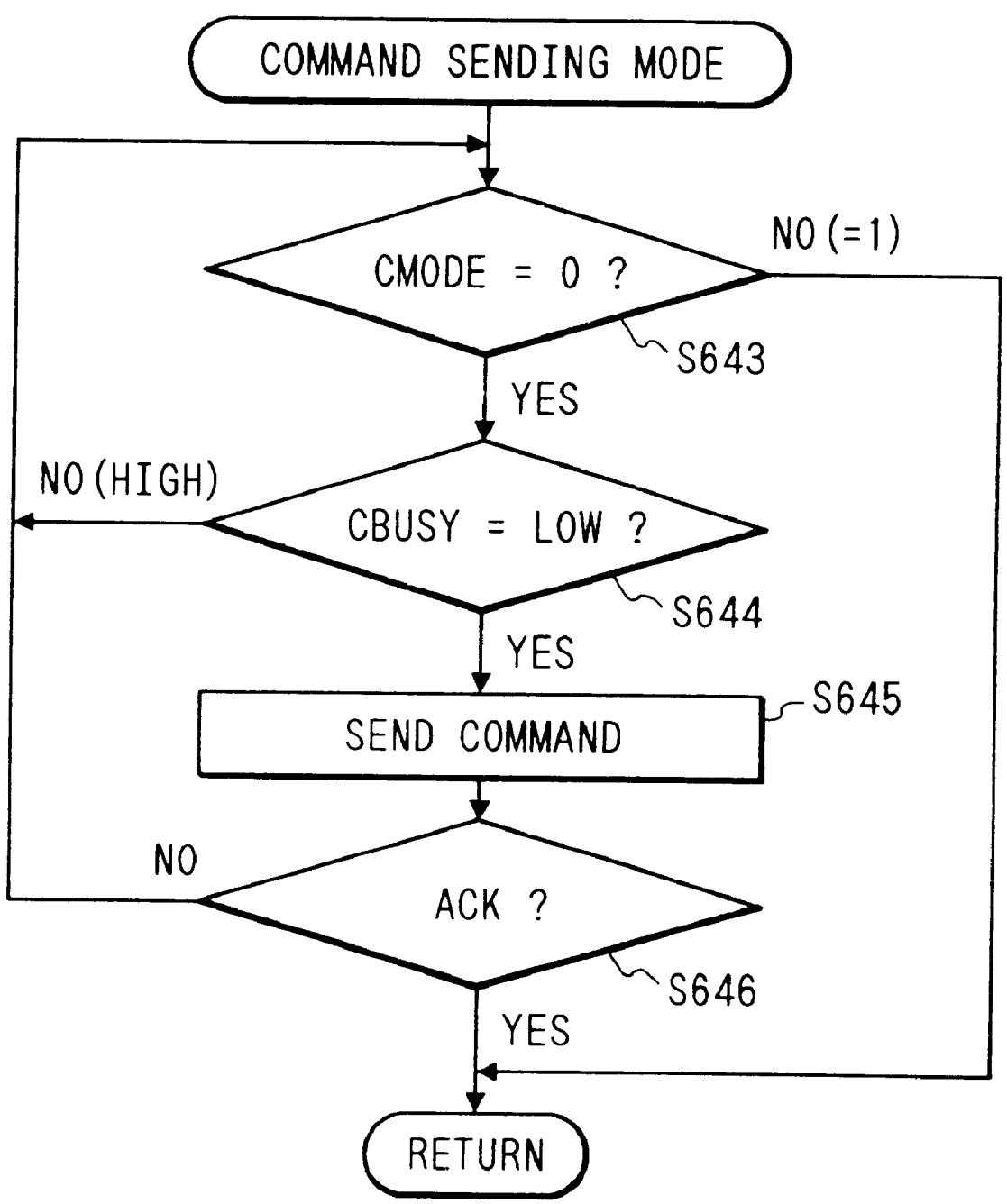
FIG. 42 is a flow chart showing a command sending mode for sending a command and data to the cellular unit with the serial interface.
Figure 43:
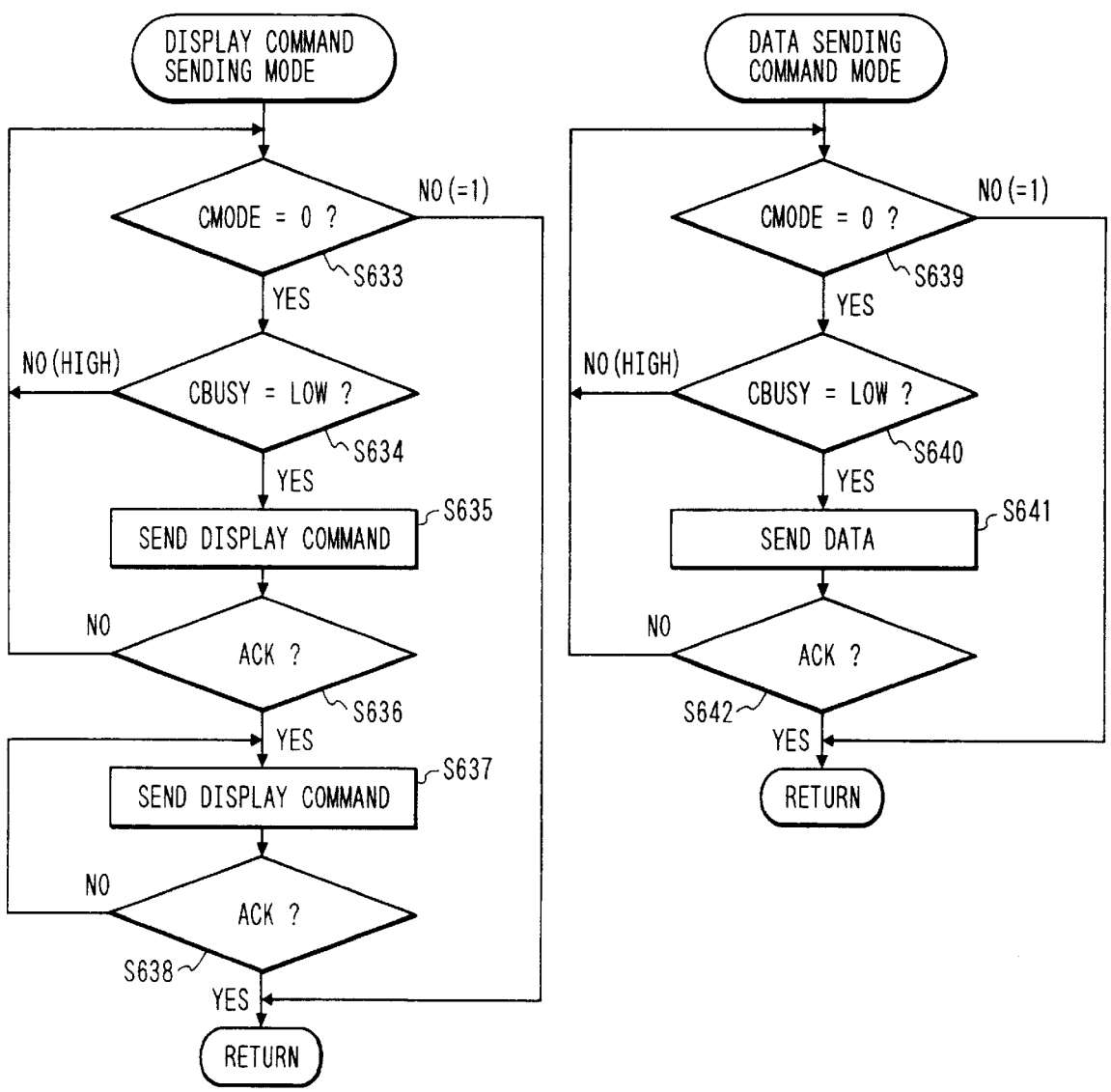
FIG. 43 is a flow chart showing a command sending mode for sending a command and data to the cellular unit with the serial interface.

An operation for sending commands and data from the facsimile main unit to the cellular unit having the serial interface will be described with reference to flow charts in FIGS. 42 and 43.

A: Command Sending Mode

The logic level of the signal CMODE is checked in step S643.

If CMODE=1 in step S643, this indicates that the facsimile main unit is not connected to the cellular unit having the serial interface. In this case, a command is not sent to the cellular unit, and the flow is ended.

If CMODE=0 in step S643, this indicates that the facsimile main unit is connected to the cellular unit having the serial interface. The logic level of the signal CBUSY is checked in step S644.

If CBUSY=H (high level), i.e., NO in step S644, this indicates that the partner station cannot receive a command, and the flow returns to step SE643.

If CBUSY=L (low level), i.e., YES in step S644, this indicates that the partner station can receive a command. A command is sent in step S645.

If an ACK cannot be confirmed in step S646 after the command is sent, the flow returns to step S643 to resend the command.

Each command can be sent a maximum of three times. If an error still occurs, it becomes a system error.

If the signal ACK is confirmed in step S646, it is determined that command sending is OK, and the flow returns to the main flow.

B: Display Command Sending Mode

The logic level of the signal CMODE is checked in step S633.

If CMODE=1 in step S633, this indicates that the facsimile main unit is not connected to the cellular unit having the serial interface. In this case, a display command is not sent to the cellular unit, and the flow is ended.

If CMODE=0 in step S633, this indicates that the facsimile main unit is connected to the cellular unit having the serial interface. The logic level of the signal CBUSY is checked in step S634.

If CBUSY=H (high level), i.e., NO in step S634, this indicates that the partner station cannot receive a display command, and the flow returns to step S633.

If CBUSY=L (low level), i.e., YES in step S634, this indicates that the partner station can receive a command. A display command is sent in step S635.

If an ACK cannot be confirmed in step S636 after the display command is sent in step S635, the flow returns to step S633 to resend the command.

Each command can be sent a maximum of three times. If an error still occurs, it becomes a system error.

If the signal ACK is confirmed in step S636, it is determined that command sending is OK, and the display data is sent in step S637.

If an ACK cannot be confirmed in step S638 after the display command is sent in step S637, the flow returns to step S637 to resend the command.

Each command can be sent a maximum of three times. If an error still occurs, it becomes a system error.

If the signal ACK is confirmed in step S638, it is determined that command sending is OK, and the flow returns to the main flow.

C: Data Sending Mode The logic level of the signal CMODE is checked in step S639.

If CMODE=1 in step S639, this indicates that the facsimile main unit is not connected to the cellular unit having the serial interface. In this case, data is not sent to the cellular unit, and the flow is ended.

If CMODE=0 in step S639, this indicates that the facsimile main unit is connected to the cellular unit having the serial interface. The logic level of the signal CBUSY is checked in step S640.

If CBUSY=H (high level), i.e., NO in step S640, this indicates that the partner station cannot receive data, and the flow returns to step S639.

If CBUSY=L (low level), i.e., YES in step S640, this indicates that the partner station can receive data. Data is sent in step S641.

If an ACK cannot be confirmed in step S642 after the data is sent in step S641, the flow returns to step S639 to resend the data.

Each data can be sent a maximum of three times. If an error still occurs, it becomes a system error.

If the signal ACK is confirmed in step S642, it is determined that data sending is OK, and the flow returns to the main flow.

An operation of the cellular unit or phone shown in FIG. 2 in the stand-by mode will be described in detail with reference to flow charts in FIGS. 27 to 37.

When the power switch is turned on, the I/O 2-6, the SRAM 2-4, the backup memory 2-25, and the like are initialized in step S1501. At this time, a flag FAXONF representing that the FAX main unit is connected to the cellular phone is reset. When the flag FAXONF is set at "1", it indicates that the FAX main unit is connected to the cellular phone. When initialization of all the components is completed, the stand-by mode is set.

Figure 28:
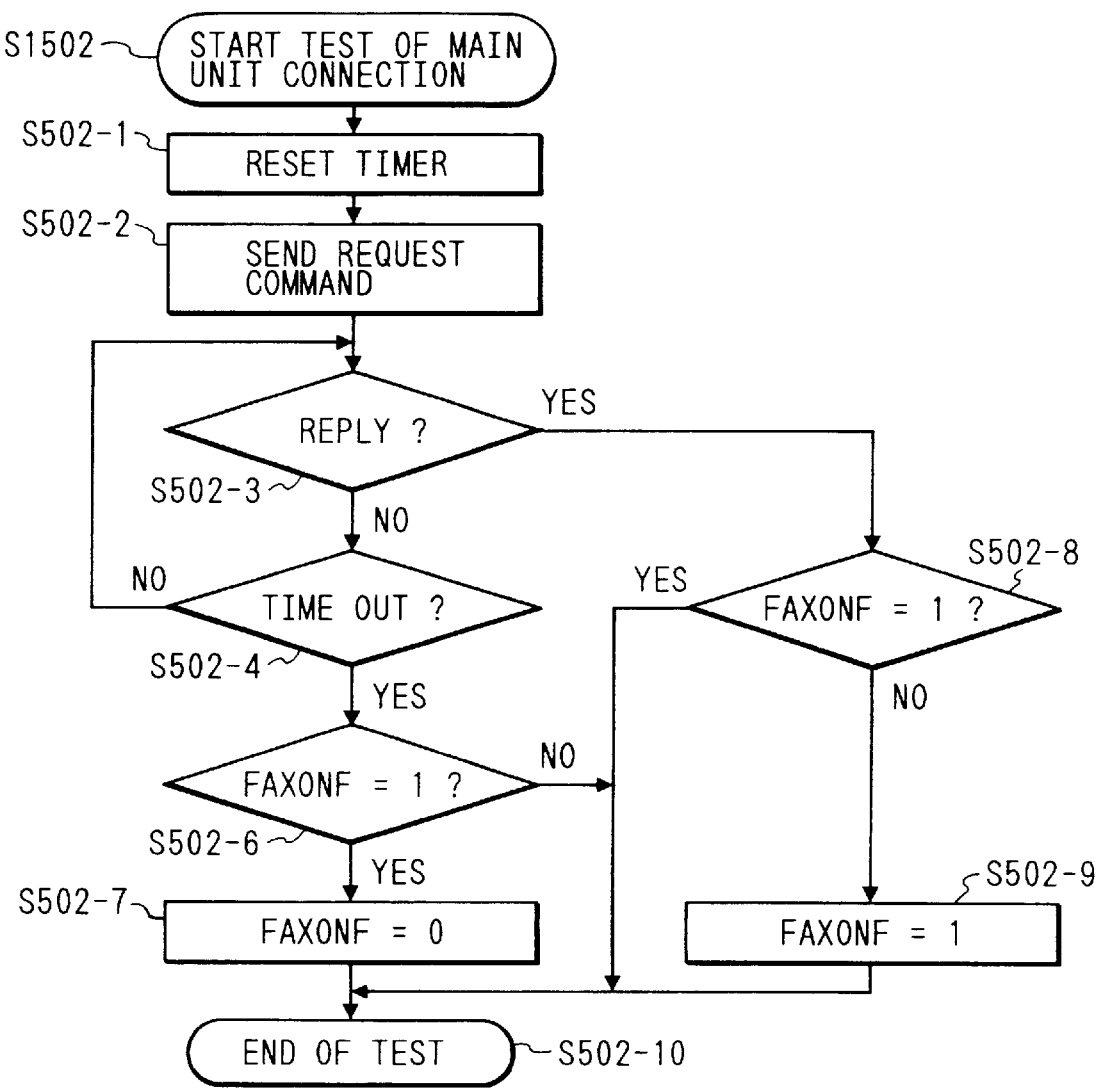
FIG. 28 is a flow chart showing the stand-by operation of the cellular unit with the serial interface.

Step S1502 in FIG. 28 represents the start test of main unit connection. This subroutine is executed as needed. In step S502-1, a timer is reset. In step S502-2, a request command is sent to the FAX main unit. This request command is a command for detecting that the FAX main unit is connected to the cellular phone. If a reply is detected from the FAX main unit within a predetermined period of time after the request command is sent, this indicates that the FAX main unit is connected to the cellular phone.

If the reply to the request command is detected in step S502-3, it is determined in step S502-8 whether FAXONF=1. If NO in step S502-8, the flow advances to step S502-9 to set FAXONF=1.

A reply is waited in step S502-3 while time out is being monitored in step S502-4.

If YES in step S502-4, it is determined in step S502-6 that the cellular phone is not connected to the FAX main unit. The flow advances to step S502-6 to determine whether FAXONF=1. If YES in step S502-6, FAXONF=0 is set in step S502-7, and the flow advances to step S502-10. The end of test is determined in step S502-10, and the flow returns to the main routine.

If it is determined in step S1503 that a key in the console unit 2-8 is depressed, the flow advances to step S1504. An operation corresponding to a key depressed in each of steps S1504, S1505, S1506, S1507, and S1508 is performed.

Figure 32:
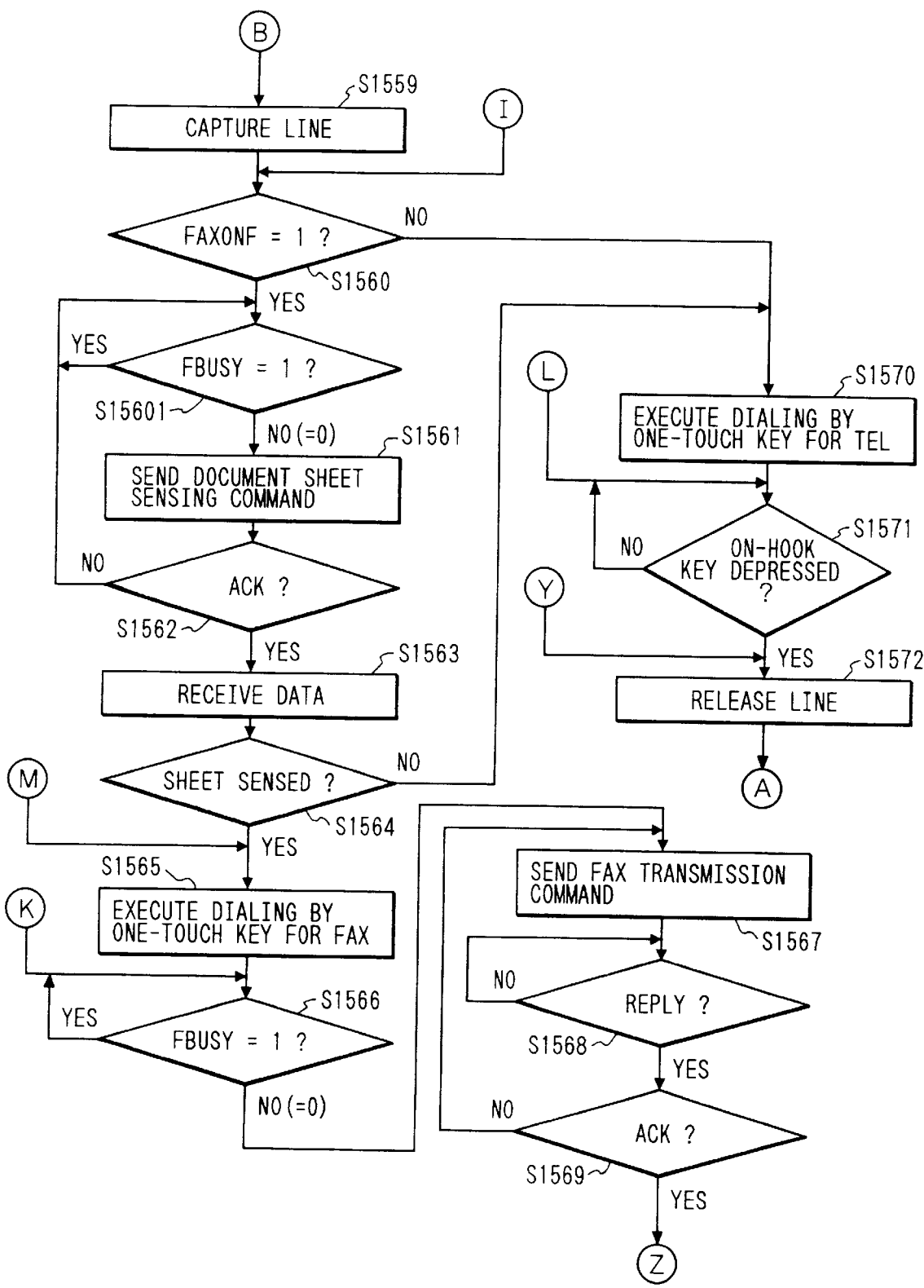
FIG. 32 is a flow chart showing the stand-by operation of the cellular unit with the serial interface.

If it is determined in step S1504 that a one-touch key or abbreviated key is depressed, the line of the cellular phone is captured in step S1559 in FIG. 32. If FAXONF=0 in step S1560, operations from step S1570 are performed. However, if FAXONF=1 in step S1560 and FBUSY=0 in step S1561, the document sheet sensing command (CC=011001/RDS/CS=XX//) is sent from the SRX of the contacts 2-22 to the main unit at a rate of 9,600 bps in step S1561.

If a reply signal is received from the FAX main unit in step S1562 and represents a signal ACK, the flow advances to step S1563. Otherwise, the flow returns to step S1561 to send the document sheet sensing command again. This command can be sent a maximum of three times.

If the data from the FAX main unit is received in step S1563 and the data received in step S1564 is RDS=1//, the data represents a document. In this case, the flow advances to step S1565. However, if RDS=0//, then no document sheet is existent on the FAX main unit. The flow then advances to step S1573.

A select signal sending unit makes a call to the FAX one-touch dial partner stored in the backup memory 2-25 in step S1565. The CPU waits in step S1566 until a signal FBUSY goes to low level in step S1566. When the signal FBUSY goes to low level, the FAK transmission command (CC=011001/AUTOTX/CS=XX//) is sent to the FAX main unit in step S1567. The FAX transmission command is sent again a maximum of three times until the signal ACK is received in steps S1568 and S1569. Upon reception of the signal ACK, the flow advances to step S1515 in FIG. 29 (to be described later).

In step S1570, a select signal sending unit makes a call to the TEL one-touch dial destination stored in the backup memory 2-25 as in step S1565. Thereafter, the speech on the line is monitored with the speaker. During the monitoring period, when an ON-hook key in the console unit 2-8 is depressed in step S1571, the radio line is released in step S1572.

A call using the OFF-hook key in step S1505 of FIG. 27 will be described below.

Figure 27:
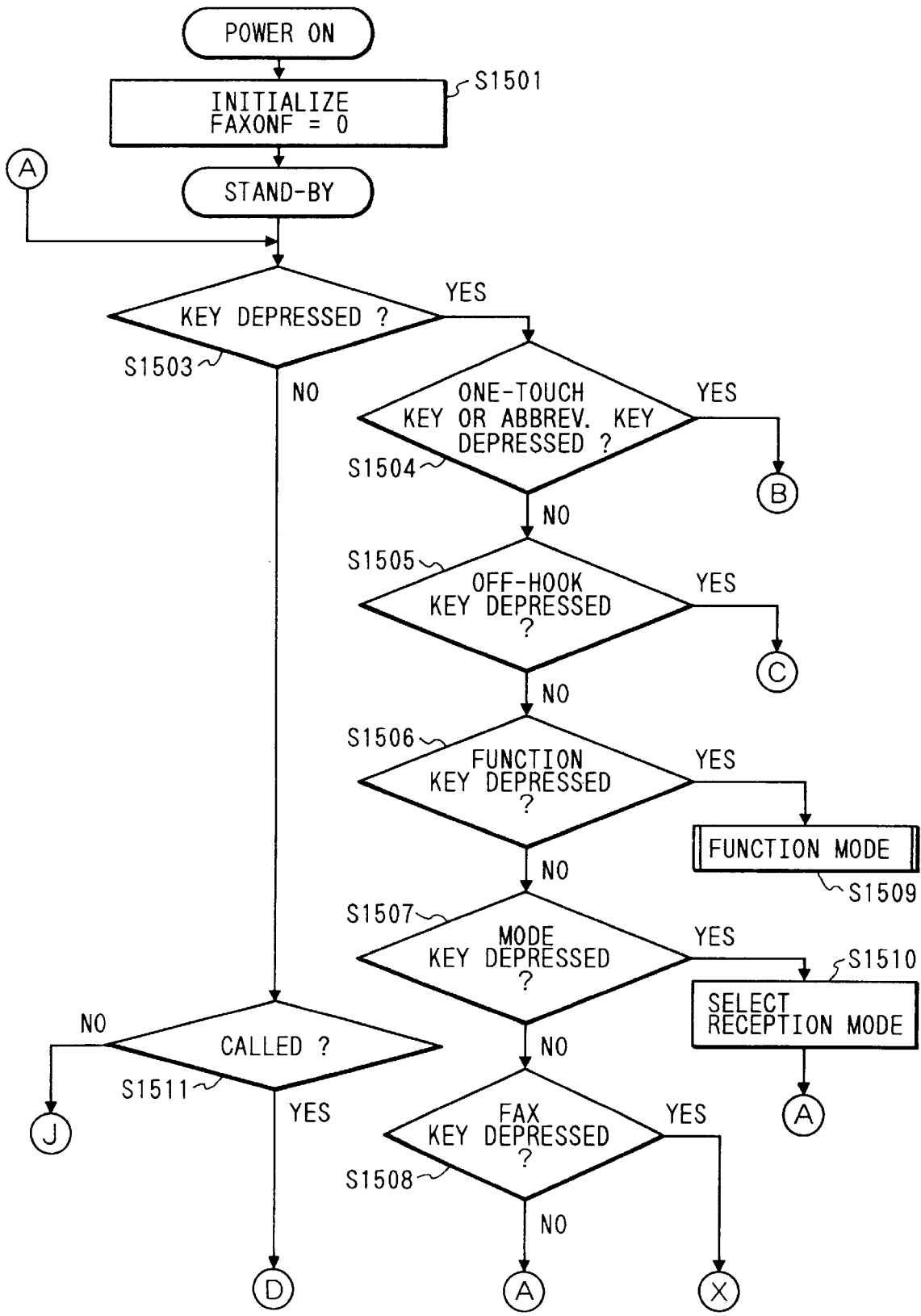
FIG. 27 is a flow chart showing a stand-by operation of a cellular unit with a serial interface.

When the OFF-hook key is depressed in step S1505 of FIG. 27, the radio line is captured in step S1573. Depression of the dial keys is detected in steps S1574, S1581, and S1582. If the one-touch key is depressed in step S1581, operations from step S1560 in FIG. 32 are performed. If a key of the ten-key pad is depressed in step S1582, a signal DTMF corresponding to the depressed key is sent out from the radio line select signal sending unit in step S1583. If the FAX key is depressed in step S1574, a call operation is stopped, and the flow advances to step S1575. The operations in steps S1575, S1576, S1577, S1578, S1579, and S1580 are the same as those in steps S1560, S15601, S1561, S1562, S1563, and S1564 of FIG. 32. If a document sheet is existent in the FAX main body in step S1580, operations from step S1566 in FIG. 32 are performed. Otherwise, operations from step S1571 in FIG. 32 are performed.

Figure 33:
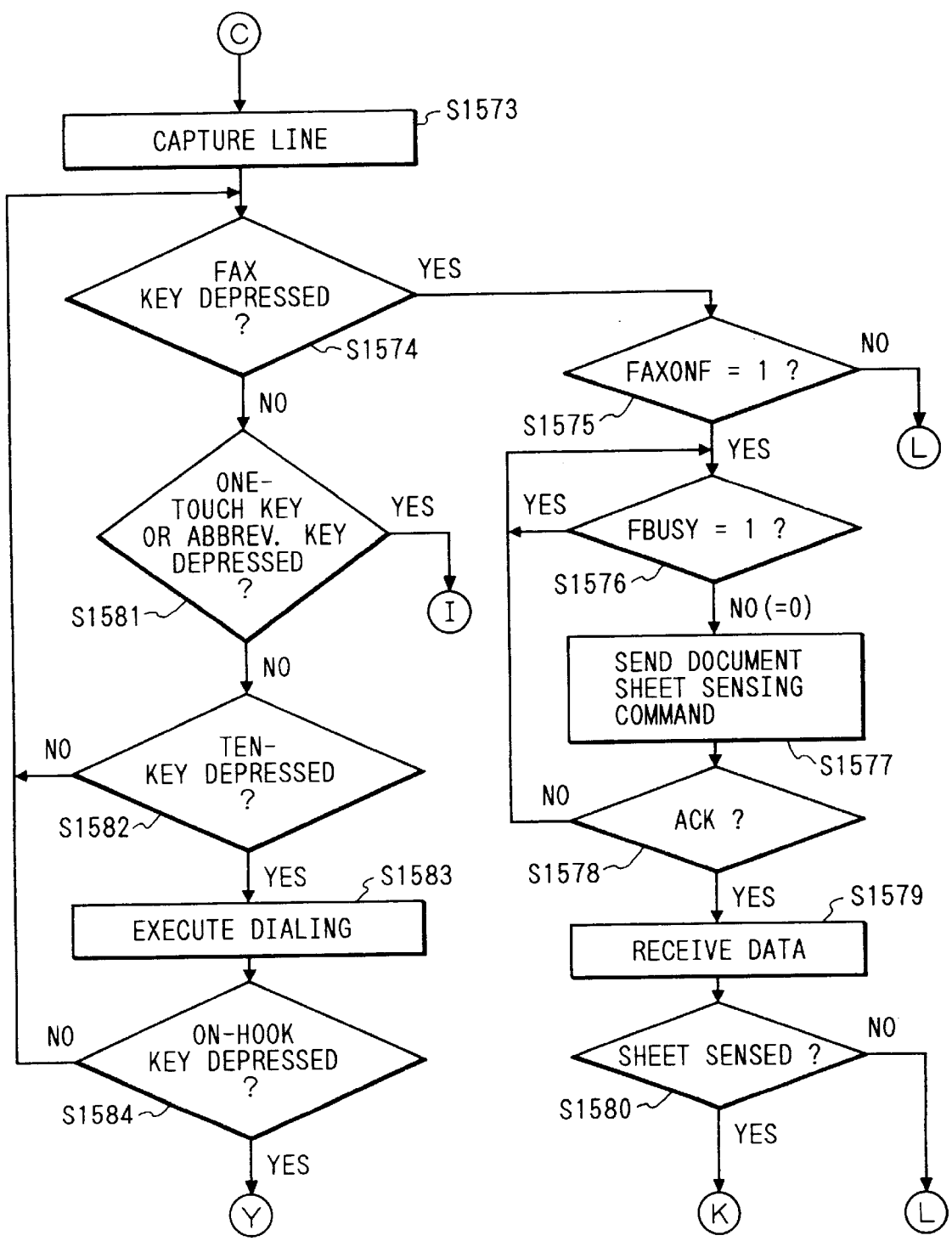
FIG. 33 is a flow chart showing the stand-by operation of the cellular unit with the serial interface.

If the ON-hook key is depressed in step S1584 in FIG. 33, the flow advances to step S1572 in FIG. 32.

If a function key is depressed in step S1506 of FIG. 27, a function mode in step S1509 is set. The operation of this function mode will be described below.

If a mode key is depressed in step S1507 of FIG. 27, the reception mode is selected in an order of manual reception mode in step S1510, TEL/FAX select mode, and automatic reception mode every time the mode key is depressed. The flow then returns to the stand-by mode. At this time, the reception mode is displayed on the display 2-7.

Figure 29:
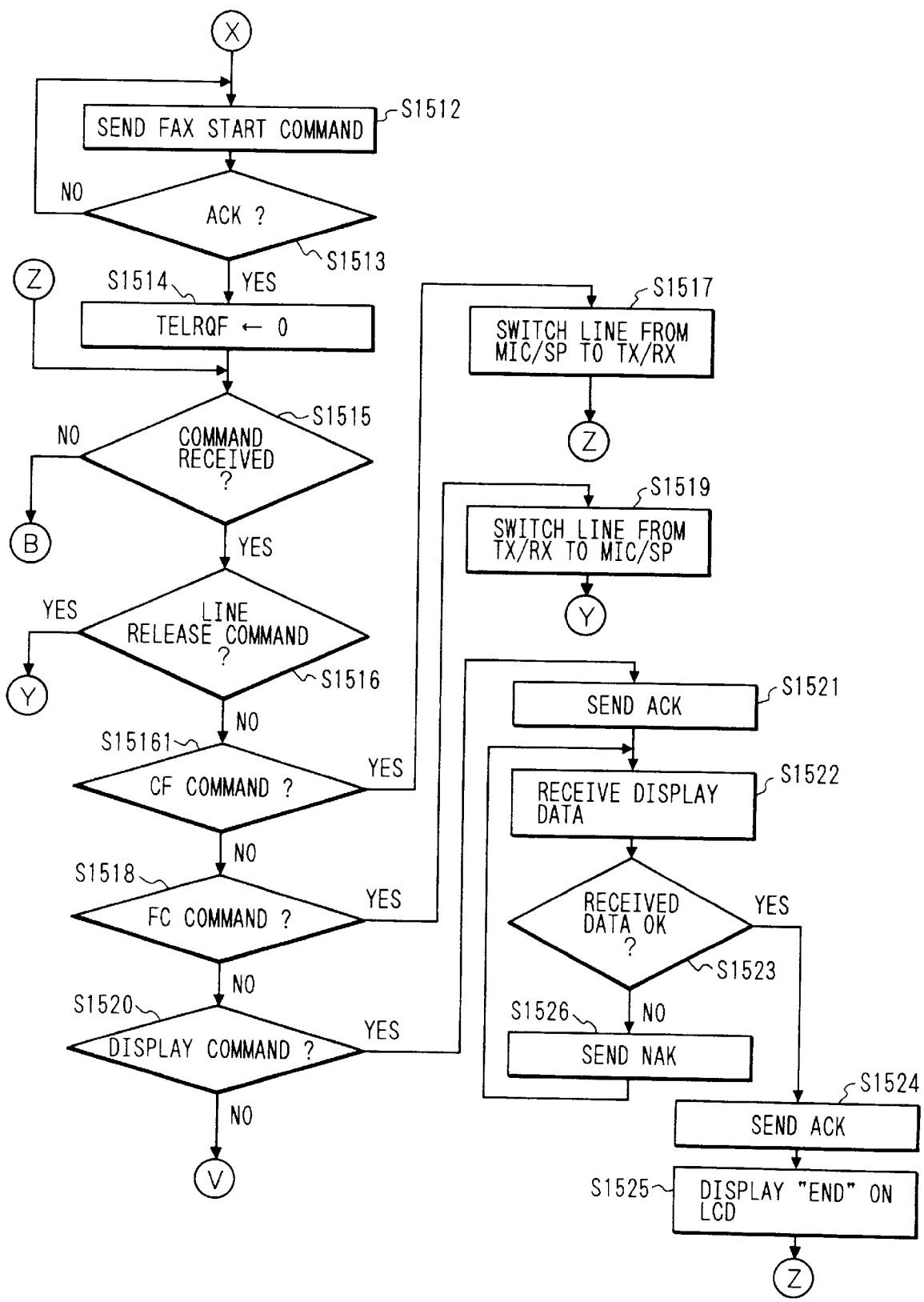
FIG. 29 is a flow chart showing the stand-by operation of the cellular unit with the serial interface.

If the FAX key is depressed in step S1508, the radio line is captured, and the FAX start command (CC=011001/START/CS=XX//) is sent to the FAX main unit in step S1512 in FIG. 29. The FAX start command is sent a maximum of three times until a signal ACK is received in step S1513. When the signal ACK is received in step S1513, a flag TELRQF (i.e., a flag for call reservation at the end of FAX) is cleared in step S1514. When a command from the FAX main unit is received in step S1515, processing according to the type of command in step S1516, S15161, S1518, S1520, S1527 (FIG. 30), S1537 (FIG. 30), S1542 (FIG. 31A), or S1547 (FIG. 31A) is performed. If a line release command is received in step S1516 of FIG. 29, the radio line is released in step S1572 (FIG. 32), and the flow returns to the stand-by mode.

If a CF command is received in step S1516 of FIG. 29, the radio line is switched from the microphone/speaker to the TX/RX of the cellular contacts by the selector 2-21 in step S1517. The flow then returns to step S1515.

If an FC command is received in step S1518, the radio line is switched from the TX/RX of the cellular contacts to the microphone/speaker by the selector 2-21, and operations from step S1572 in FIG. 32 are performed.

If a display command (cc=010110/DISP/CS=XX//) is received in step S1520 of FIG. 29, the subsequent operations are the same as those of the communication report reception command except for steps S1522 and S1525. Therefore, operations in steps S1522 and S1525 will be described below.

Display data (e.g., DT=END/CS=XX//) is received in step S1522.

If the above data is received, "END" is displayed on the LCD in step S1525.

Figure 30:
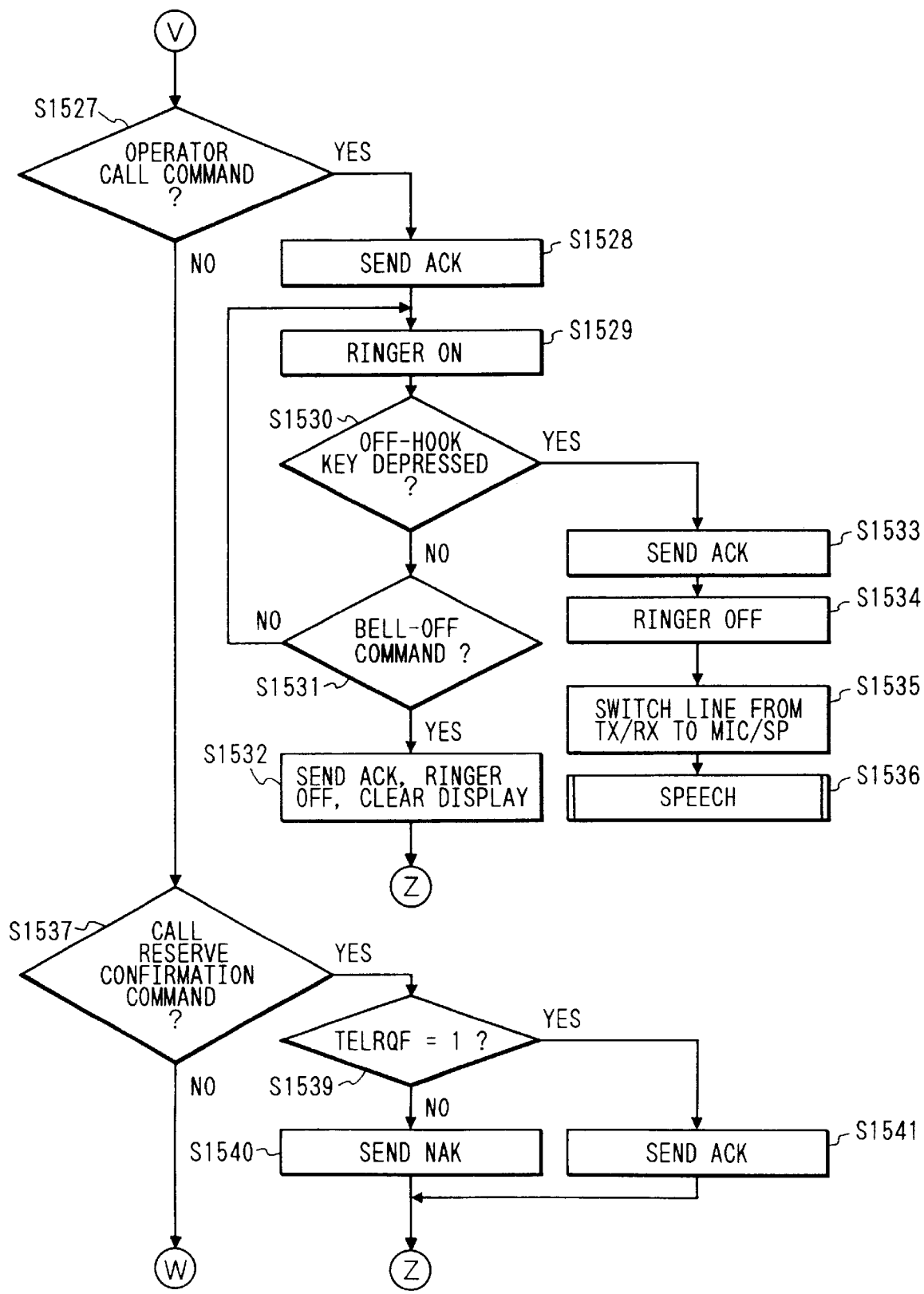
FIG. 30 is a flow chart showing the stand-by operation of the cellular unit with the serial interface.

If an operator call command is received in step S1527 of FIG. 30, a signal ACK is sent in step S1528. In step S1529, a ringer in the I/O 2-6 is turned on (or enabled), and at the same time, "Please Depress OFF-Hook Key" is displayed on the LCD. If NO in step S1530, the flow advances to step S1531. In step S1531, when a bell-OFF command is received from the FAX main unit, a signal ACK is sent in step S1532 to turn off (or disenabled) the ringer and clear the display. The flow advances to processing in step S515 (FIG. 29) for receiving any other command.

If the OFF-hook key is depressed in step S1530 of FIG. 30, signals ACK are transmitted in steps S1533 and S1534, respectively, to stop the ringer. In step S535, the selector 2-21 is controlled to switch the radio line from the TX/RX to the microphone/speaker in step S535 to set the speech communication state.

If a call reserve confirmation command is received in step S1537 of FIG. 30 and if TELROF=1 in step S1539, then a signal ACK is sent back to the FAX main unit in step S1541. However, if TELRQF=0, then a signal NAK is sent back to the FAX main unit in step S1540 to wait for a reply command.

Figure 31B:
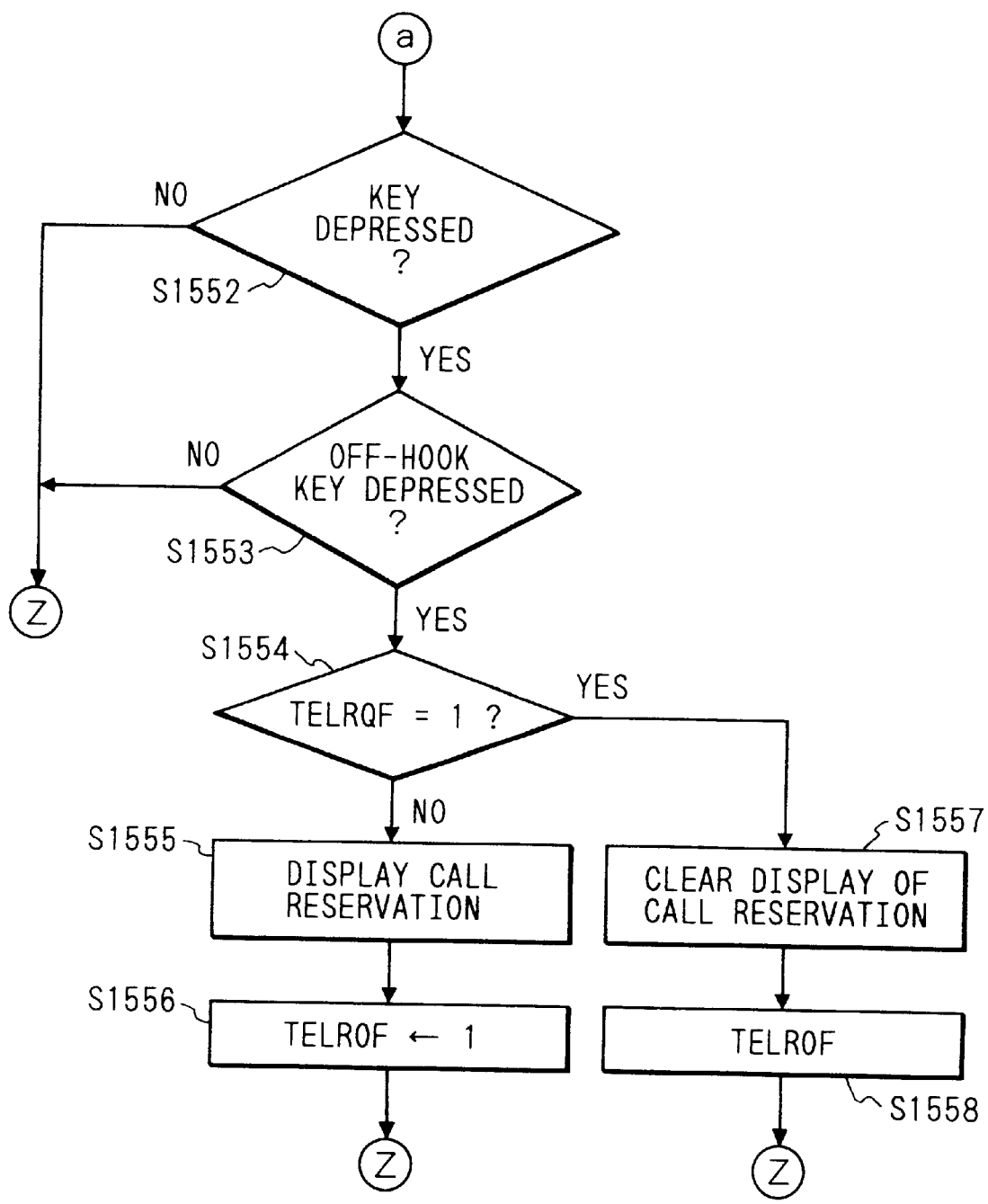
FIG. 31 is comprised FIG. 31A and FIG. 31B illustrating flow charts showing the stand-by operation of the cellular unit with the serial interface.

If a transmission parameter request command is received in step S1542 of FIG. 31A, a signal ACK is sent back in step S1543. The data such as a telephone number and a user abbreviation stored in the backup memory 2-25 are transmitted as transmission parameters to the FAX main unit in step S1544, and a reply is awaited in step S1545. The transmission parameters are transmitted a maximum of three times until the signal ACK is received. If the signal ACK is not received in step S1545, the flow advances to step S515 in FIG. 29.

If a reception parameter request command is received in step S1547 of FIG. 31A, the receive parameters are sent in step S1549 in place of the transmission parameters in step S1544 and the flow returns to the routine to wait for the next command (see steps S1548 to S1551).

Figure 48:
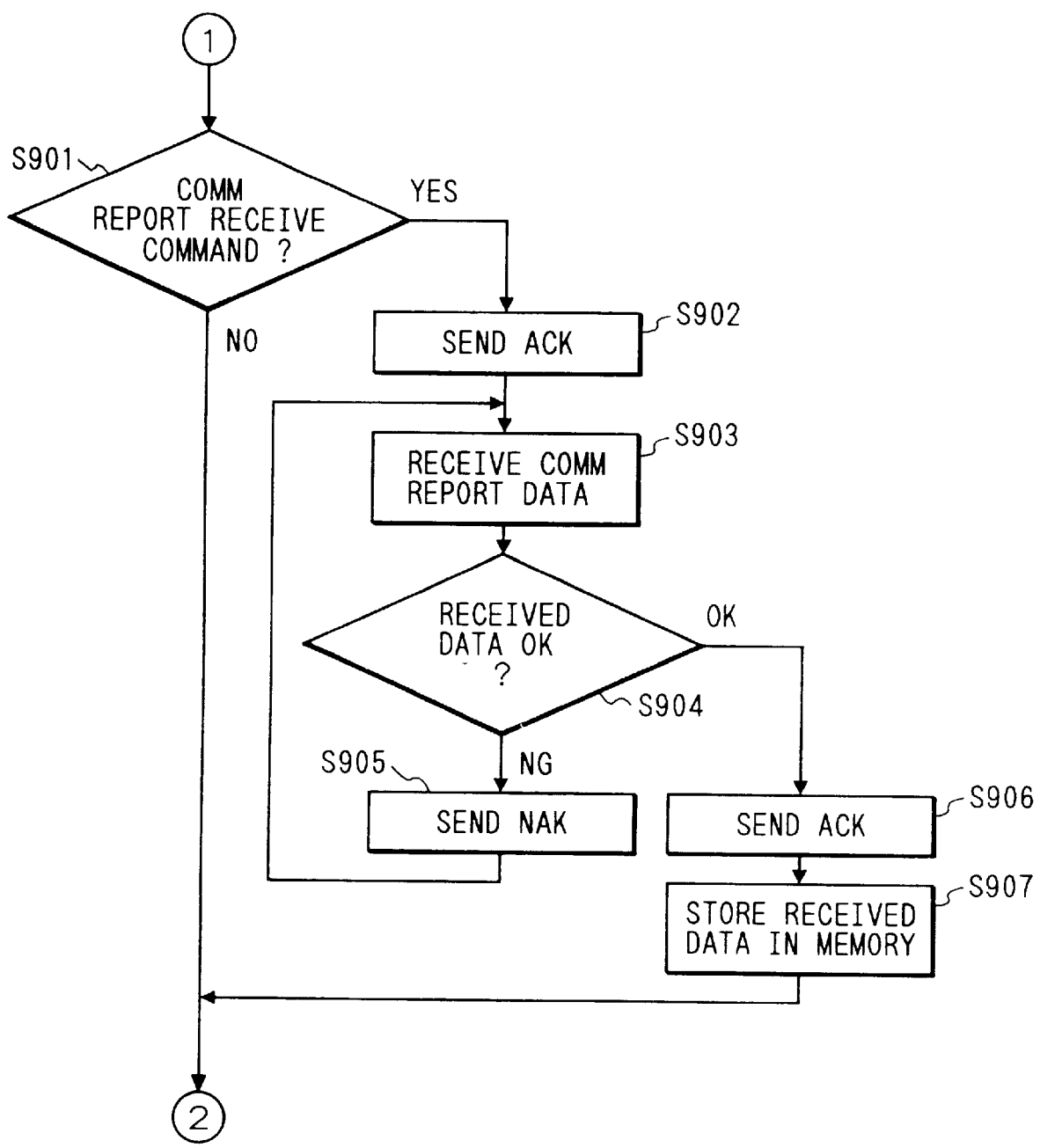
FIG. 48 is a flow chart showing a stand-by operation of a cellular unit having a serial interface.

If a communication report receive command is received in step S901 in FIG. 48, a signal ACK is sent back in step S902. Communication report data (e.g., DT=OK/PG=03/TM=TX/CN=CANON/TN=03 3758 2111/CS=XX//) is received. If the check sum of the received data is OK in step S904, a signal ACK is sent in step S905. The received data is stored in the backup memory 2-25 in a predetermined format. The flow then returns to the main routine. If data reception is not OK in step S904, an NAK is sent in step S905, and the flow returns to step S903. The signal NAK is sent a maximum of three times.

If the OFF-hook key is depressed during line capture in steps S1552 and S1553, and TELRQF=0 in step S1554, a message saying "Call Reservation" is displayed on the display in step S1555. TELRQF=1 is set in step S1556. If TELRQF=1 in step S1554, the display of the call reservation is cleared. TELRQF=0 is set to return to the routine for waiting the next command.

The cellular operations upon depression of the FAX key in step S1508 of FIG. 27 have been described above.

The stand-by cellular operations except for depression of a key will be described with reference to FIG. 27.

If any one of the keys is not depressed in step S1503 of FIG. 27, the flow advances to step S1511.

Figure 34:
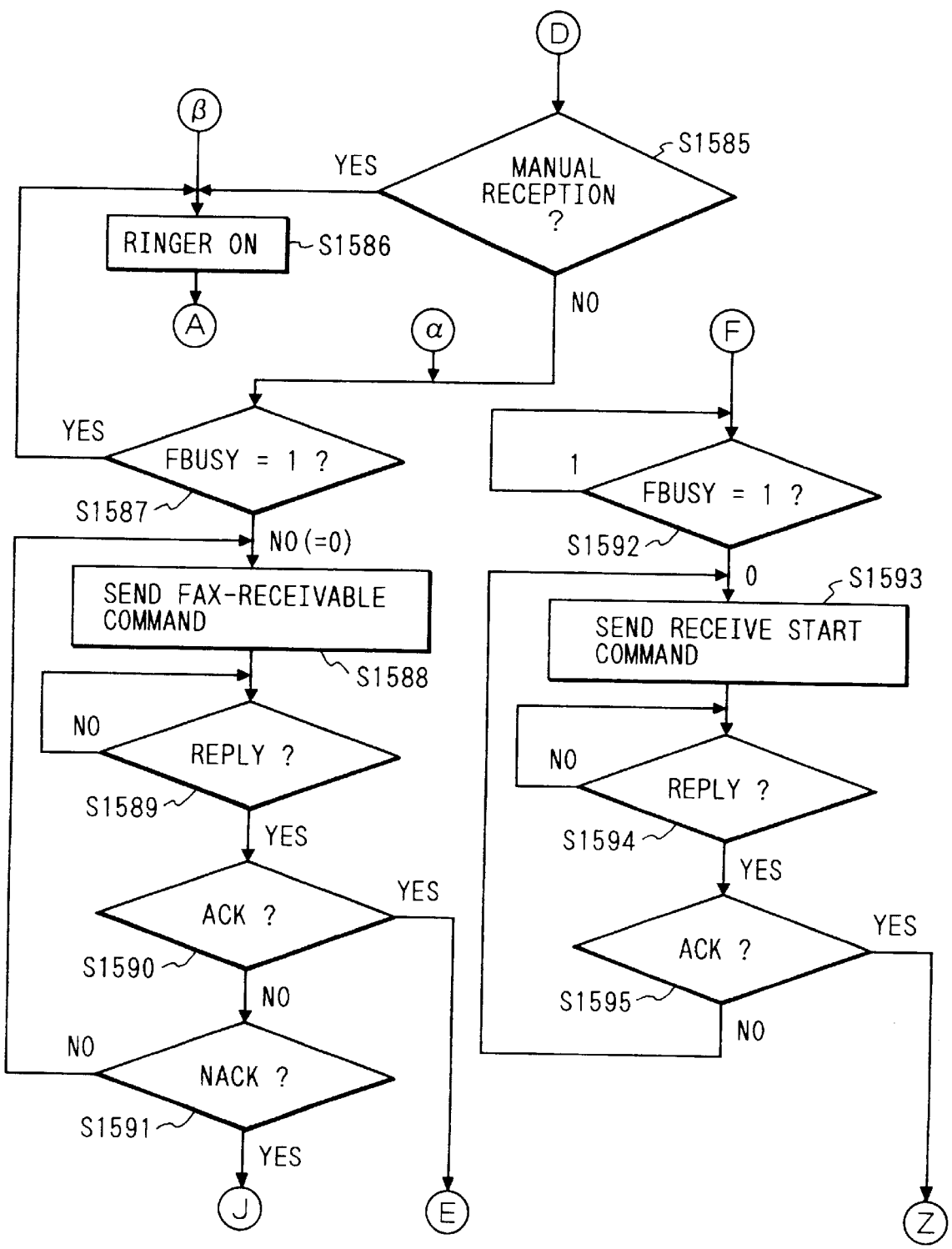
FIG. 34 is a flow chart showing the stand-by operation of the cellular unit with the serial interface.

If the cellular phone is called in step S1511, the flow advances to step S1585 in FIG. 34. Otherwise, the flow advances to step S1608 (FIG. 36) for receiving a command.

If it is determined in step S1585 (FIG. 34) that the reception mode is a manual reception mode, the ringer is turned on in step S1586, and the flow returns to the stand-by mode.

If NO in step S1585, and FBUSY=1 which indicates that the FAX main unit cannot receive the command is set in step S1587, an operation in step S586 is performed.

If FBUSY=0, then a FAX-receivable command (CC= 011001/RXOK/CS=XX//) which serves as a command for confirming whether the FAX main unit can receive data is transmitted to the FAX main unit in step S1588. If the replies detected in steps S1589, S1590, and S1591 are the signals NAK, reception is impossible. The flow advances to step S1608 (FIG. 36) to wait for the next command. If an ACK is received in each step described above, the flow also advances to step S1596 in FIG. 35.

Figure 35:
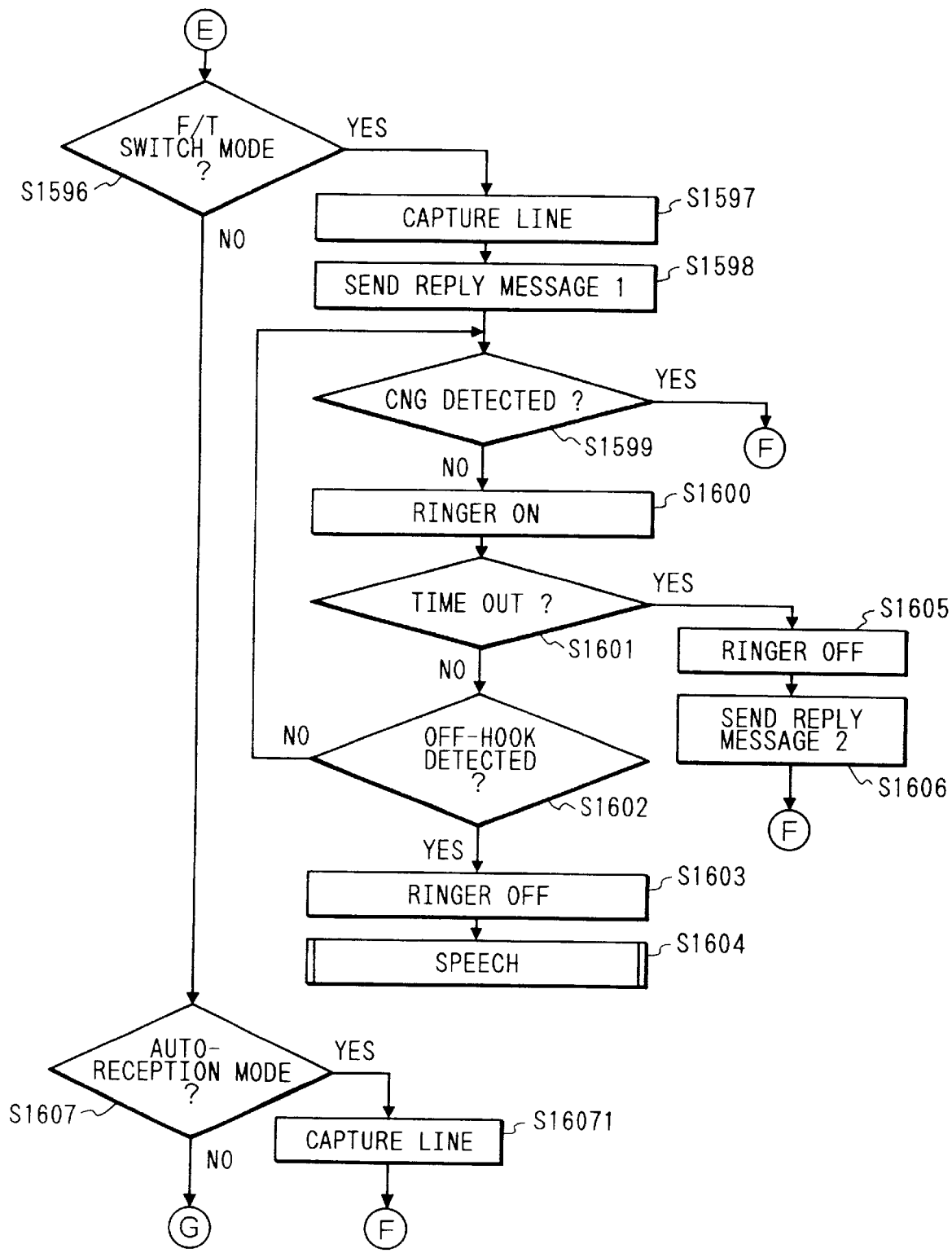
FIG. 35 is a flow chart showing the stand-by operation of the cellular unit with the serial interface.
Figure 36:
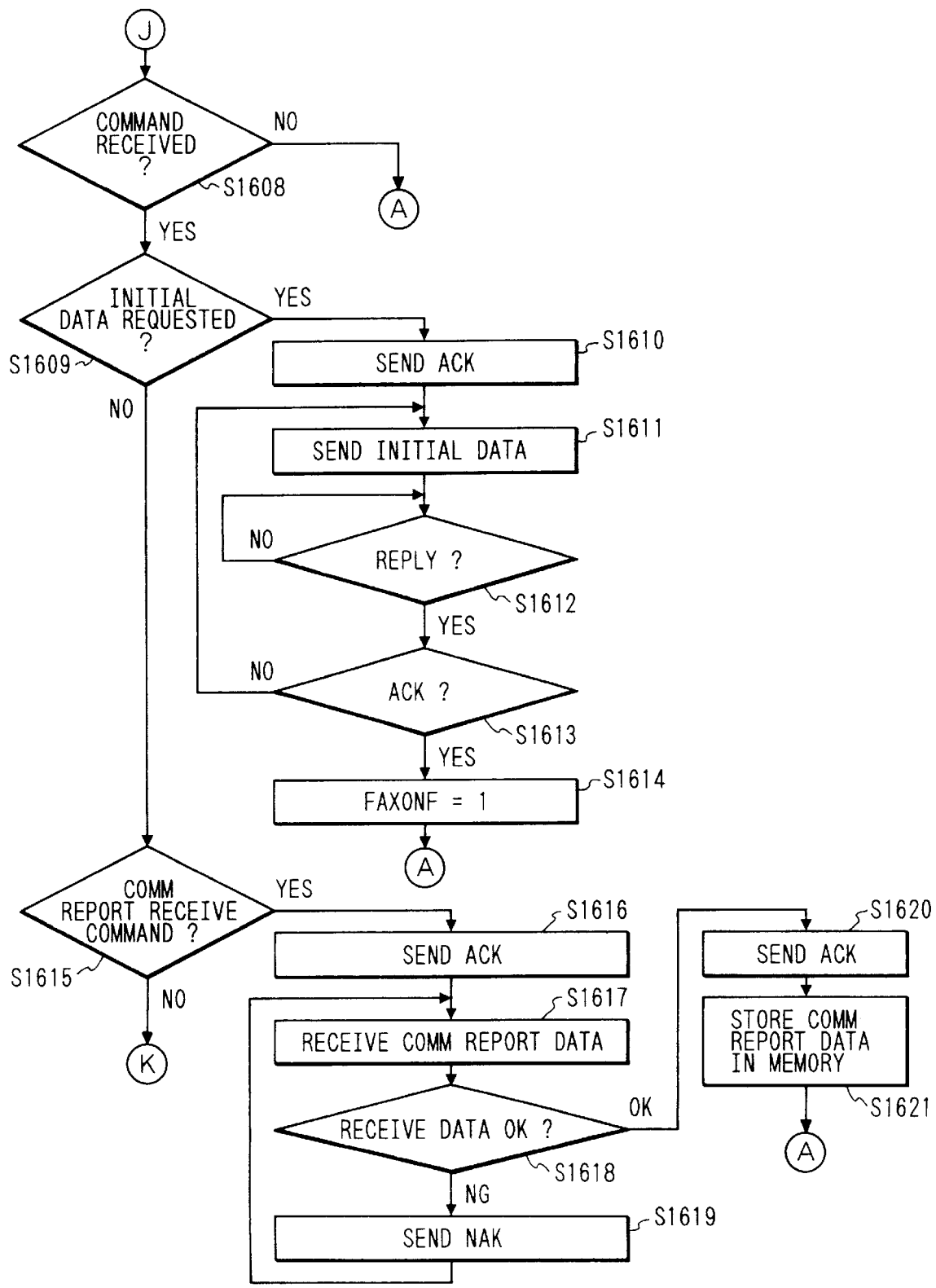
FIG. 36 is a flow chart showing the stand-by operation of the cellular unit with the serial interface.

If the reply in step S1590 of FIG. 34 is a signal ACK, the flow advances to F/T selection in step S1596 of FIG. 35. If the reception mode is set in the FT select mode in step S1596, the radio line is captured to send a speech message 1 ("On Calling. Please Wait.") to the radio line (channel) in step S1597. Thereafter, if a signal CNG is detected in step S1599, and FBUSY=0 in step S1592 of FIG. 34, a reception start command (CC=011001/RXSTART/CS=XX//) is sent to the FAX main unit in step S1593. When signals ACK are received in steps S1594 and S1595, operations from step S1515 in FIG. 29 are performed.

If the signal CNG is not detected in step S1599 of FIG. 35, the ringer is turned on in step S1600, and "Please Depress OFF-Hook Key" is displayed. The signal CNG, the lapse of the sending time of the pseudo CI settable by the user, and depression of the OFF-hook key are detected in steps S1599, S1601, and S1602, respectively. An operation corresponding to a key depressed in step S1592 (FIG. 34), S1605 (FIG. 35), or S1603 (FIG. 35) is performed.

The ringer is turned off in step S1603, and speech communication is allowed in step S1604.

The ringer is turned off in step S1605, and a reply message ("No Answer. Please Fax If You Want.") is sent to the radio line, and the operations from step S1592 are performed.

If it is determined in step S1607 of FIG. 35 that the reception mode is the automatic reception mode, the radio line is captured in step S16071, and operations from step S1592 in FIG. 34 are performed.

An operation for receiving a command as serial data from the FAX main unit through the contacts 2-22 in step S1608 will be described below. If a command is received in step S1608 and the received command is detected as an initial data request command (CC=010110/FDRQT/CS=XX//) in step S1609, a signal ACK is sent back to the FAX main unit in step S1610. In step S1611, initial data (DT=VN=XX/PI= XXXXXXXX/NI=XXXXXXXX/YN=X . . . X/TN=X . . . X/CS=XX//) is sent following the signal ACK. VN is a version No. of the cellular phone, PI is a polling ID stored in the backup memory 2-25, NI is a closed net ID stored in the backup memory 2-25, YN is a user name, and TN is a radio line telephone number of the cellular telephone.

A reply is received from the FAX main unit in steps S1612 and S1613 in response to the initial data. If no reply is received for a predetermined period of time, or a signal except for the signal ACK is received, the initial data is transmitted a maximum of three times. If the signal ACK is received, the flag FAXONF which represents that the cellular phone is connected to the FAX main unit is set to "1" in step S1614. The flow then returns to the stand-by mode.

If it is determined in step S1615 that the communication report receiving command (CC=010110/TXRXRESOLT/ CS=XX//) is received, a signal ACK is sent back in step S1616, and the communication report data (e.g., DT=OK/ PG=03/TM=TX/CN=CANON/TN=03 3758 2111/CS= XX//) is received in step S1617. If the check sum of the received data is OK in step S1618, a signal ACK is sent in step S1620. The received data is stored in the backup memory 2-25 in a predetermined format in step S1621, and the flow returns to the stand-by mode.

If the received data is not OK in step S1618, a signal NAK is sent back to the FAX main unit in step S1619. The communication report data is received again in step S1617. Note that the signal NAK is sent a maximum of three times.

Figure 37:
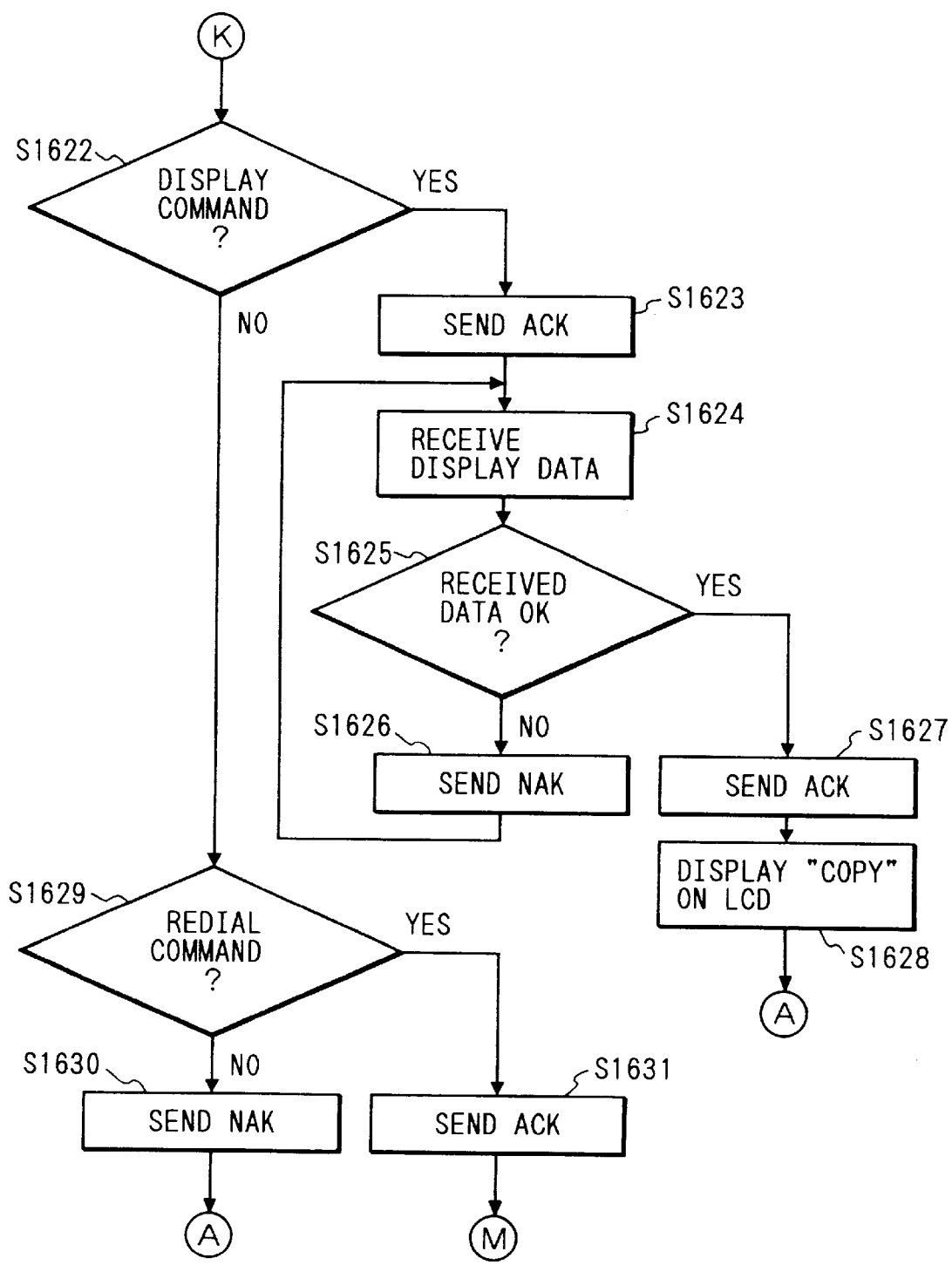
FIG. 37 is a flow chart showing the stand-by operation of the cellular unit with the serial interface.

If a display command (CC=010110/DISP/CS=XX//) is received in step S1622 of FIG. 37, the subsequent operations are the same as those of the communication report receiving command except for steps S1624 and S1628. Only operations in steps S1624 and S1628 will be described below.

In step S1624, display data (e.g., DT=COPY/CS=XX//) is received.

When the above display data is received, it is displayed as "copy" on the LCD in step S1628.

If a redial command (CC=010110/REDIAL/CS=XX//) is received in step S1629, a signal ACK is sent in step S1631. In two minutes, operations from step S1565 in FIG. 32 are performed.

If the command received in step S1629 is a command recognized by the cellular phone or a command by which the cellular phone cannot be operated, a signal NAK is sent back to the FAX main unit in step S1630.

The detailed stand-by operations of the cellular phone of this embodiment have been described above.

Operations of the cellular phone in the function mode will be described in detail.

The function modes are classified into a registration mode, a print mode, and an OCR mode, which can be selected by a key input. If the function mode is set in the registration mode in step S1701, various data such as current time, a user name, a line telephone number, a polling ID, a closed net ID, a one-touch dial partner telephone number, a partner abbreviation, and the partner telephone number and abbreviation of an electronic memo, and the like are sequentially input in step S1702. The various input data are registered in the backup memory 2-25, and the stand-by state in the function mode is set.

If the print mode is selected, the flow advances from step S1703 to step S1704, and operations from step S1704 are performed. If a print mode of the communication report is selected in step S1704, and the signal FBUSY goes to low level in step S1705, a communication report print command (CC=011001/TRNSMITPRINT/CS=XX//) is sent to the FAX main unit in step S1706. When a signal ACK is received in step S1707, the communication report stored in the backup memory 2-25 is sent as serial data to the FAX main unit in step S1708.

If the signal ACK is not received in step S1707, the flow returns to step S1706, and the above operations are repeated. In this case, the communication report print command is repeatedly sent a maximum of three times.

A replay from the FAX main unit is awaited for 3 seconds in step S1709. If no reply is received, an error is prompted. However, if a reply is sent back, the flow advances to step S1710. If a signal ACK is detected in step S1710, the flow returns to the stand-by state in the function mode. Otherwise, the flow returns to step S1708, and the above operations are repeated. In this case, the data is repeatedly sent a maximum of three times.

Figure 39:
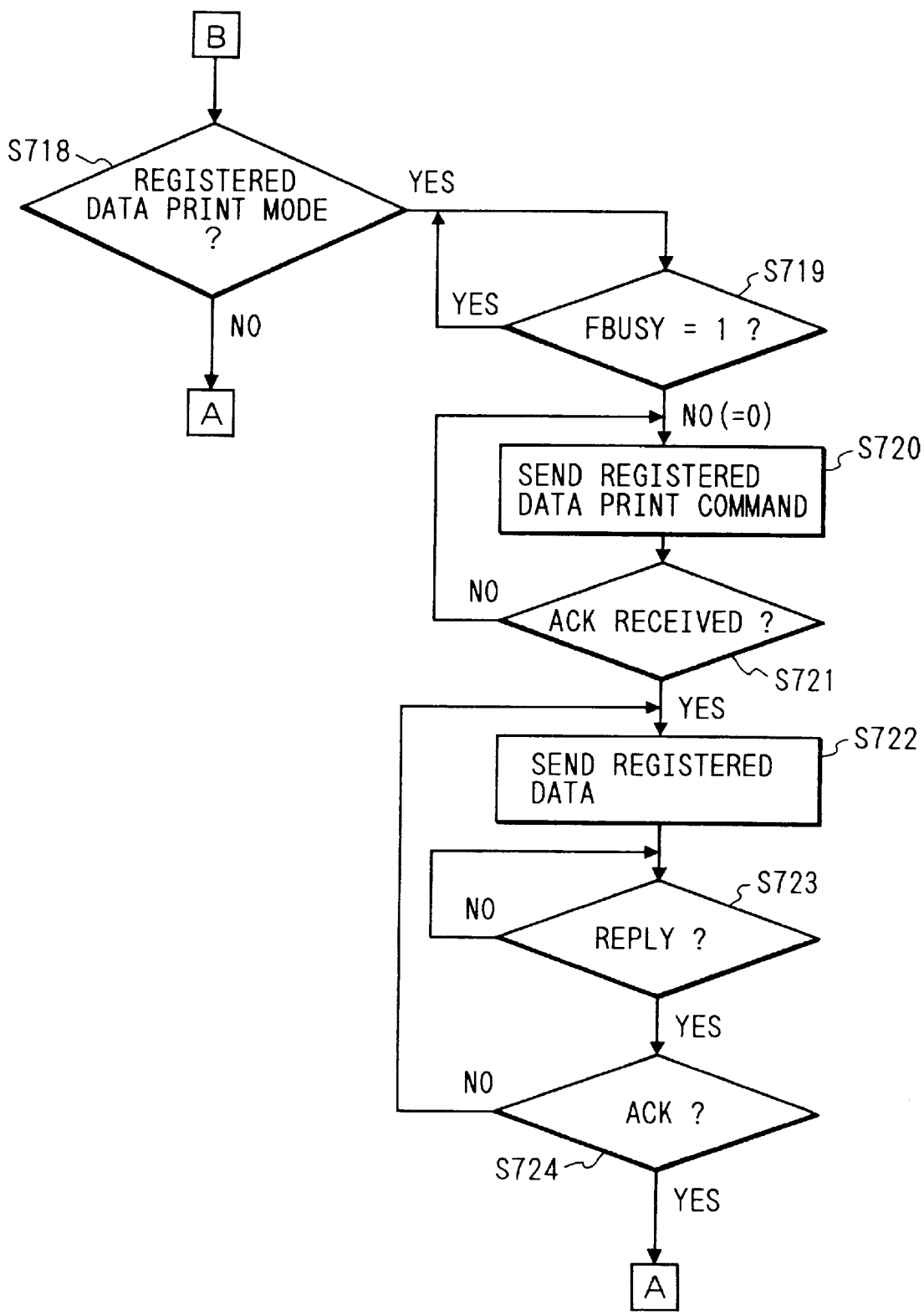
FIG. 39 is a flow chart showing the function-mode operation of the cellular unit with the serial interface.
Figure 40:
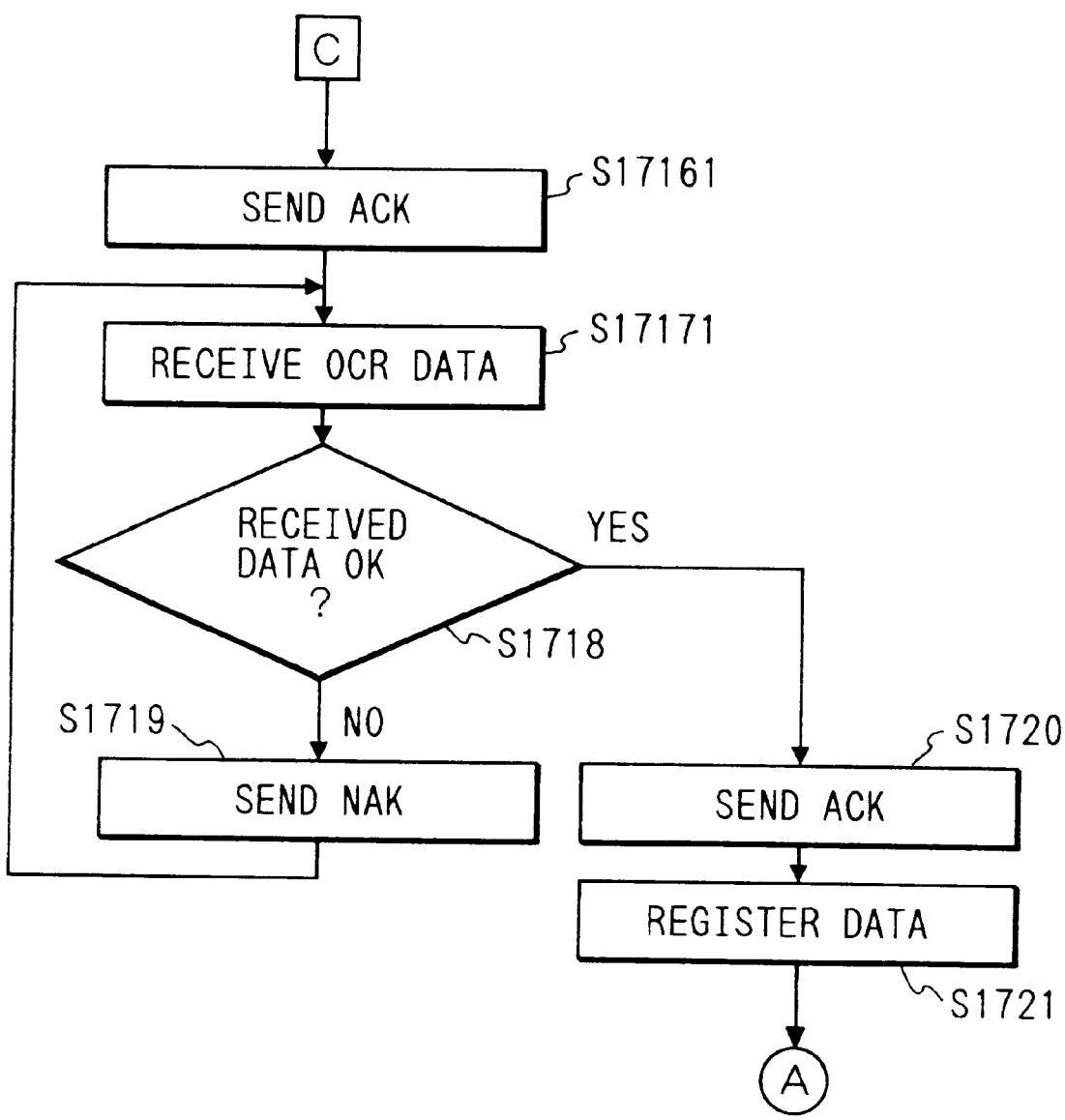
FIG. 40 is a flow chart showing the function-mode operation of the cellular unit with the serial interface.

If a communication report print command is not detected in step S1704, the flow advances to step S1718 in FIG. 39.

If a print mode of the registered data is selected in step S1718, the flow advances to step S1719. The steps of the registered data print operation are substantially the same as steps S1705 to S1710 of the communication report print operation except that the various data registered in the registration mode are sent as serial data in step S1722 in place of the communication report in step S1708.

Figure 38:
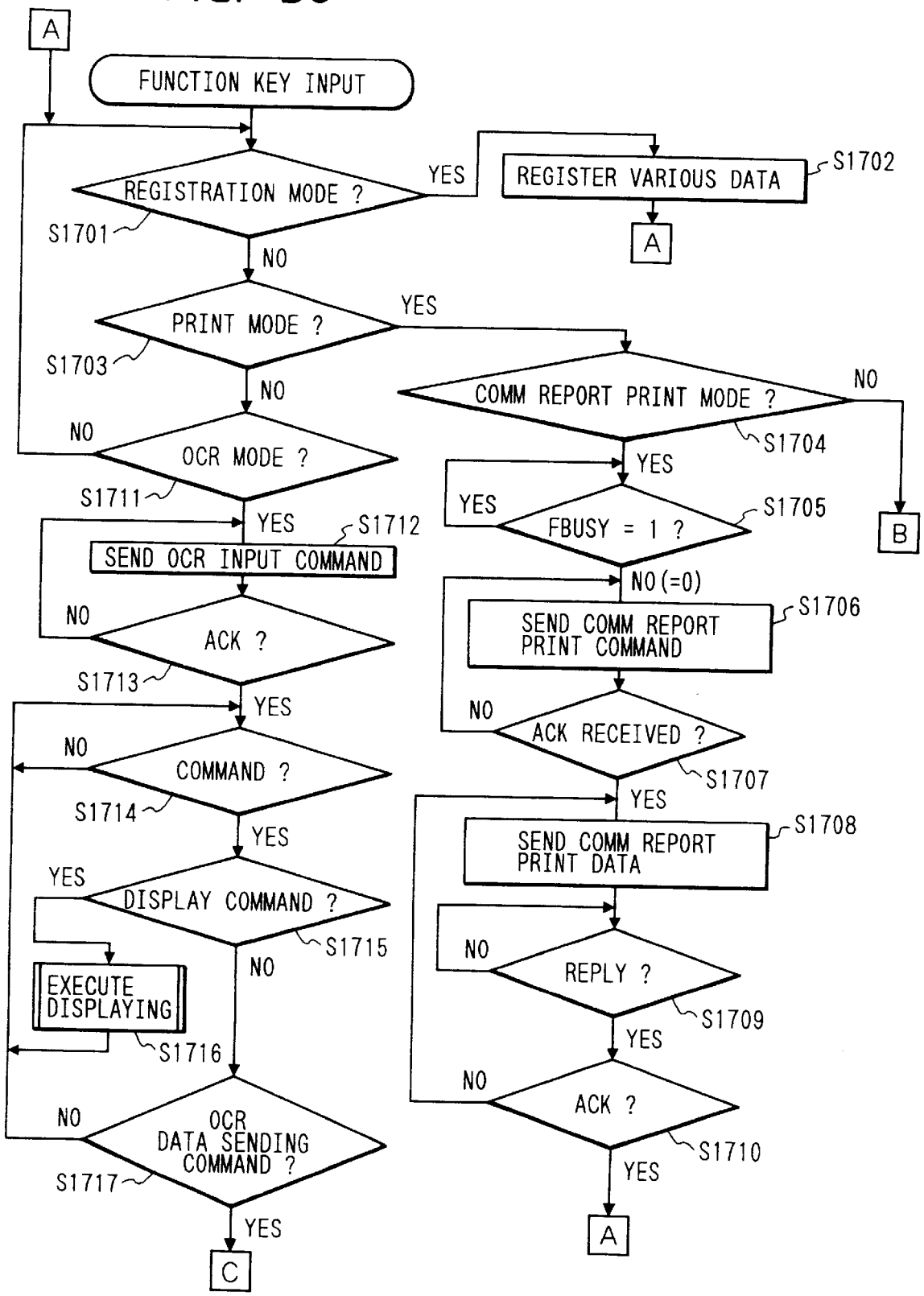
FIG. 38 is a flow chart showing a function-mode operation of the cellular unit with the serial interface.

If the OCR mode is selected in step S1711 of FIG. 38, an OCR input command (CC=011001/OCRIN/CS=XX//) is sent in step S1712. If a replay from the FAX main unit is detected and a signal ACK is detected in step S1713, subsequent operations from Step S1714 are performed. Otherwise, the flow returns to step S1712, and the above operations are repeated. In this case, the OCR input command can be repeatedly sent a maximum of three times.

Reception of a command from the FAX main unit is awaited in step S1714. Upon reception of the command, the command is checked in steps S1715 and S1717. If this command is a display command, the same operation as in step S1520 of FIG. 29 is performed in step S1716. The flow then returns to step S1714 to receive a command again. If it is determined in step S1717 that the command is the OCR data output command, a signal ACK is sent to the FAX main unit in step S1716 of FIG. 40. OCR data is received in step S17171. If it is determined in step S1718 that the received data is OK, a signal ACK is sent back in step S1720. The received data is stored in the backup memory 2-25 in a predetermined format, and the flow returns to the stand-by mode. However, if NO in step S1718, a signal NAK is sent to the FAX main unit in step S1719 to receive data again in step S1719.

The detailed operations of the cellular phone in the function mode have been described in detail.

(Second Embodiment)

In the above embodiment, the portable facsimile main unit is separated from the radio telephone set as the cellular unit or phone. However, the facsimile main unit may be formed integrally with the cellular phone, as will be described as the second embodiment.

Figure 44:
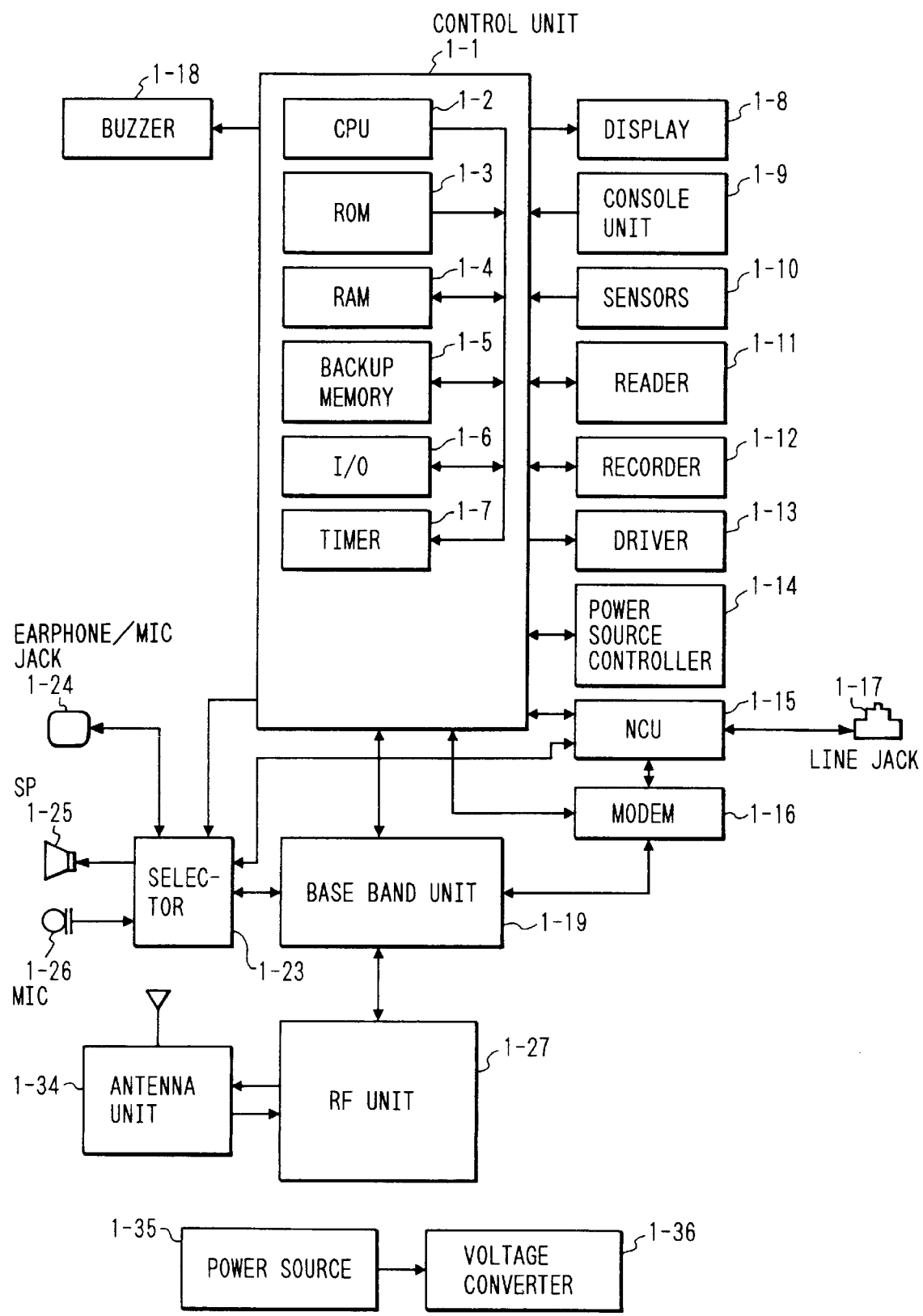
FIG. 44 is a block diagram showing the arrangement of a radio facsimile apparatus which embodies the present invention according to another embodiment.
Figure 45:
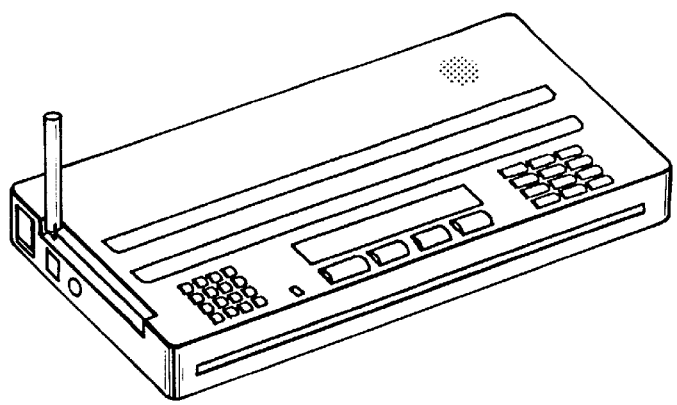
FIG. 45 is a perspective view of a radio facsimile system according to the embodiment shown in FIG. 44.
Figure 46:
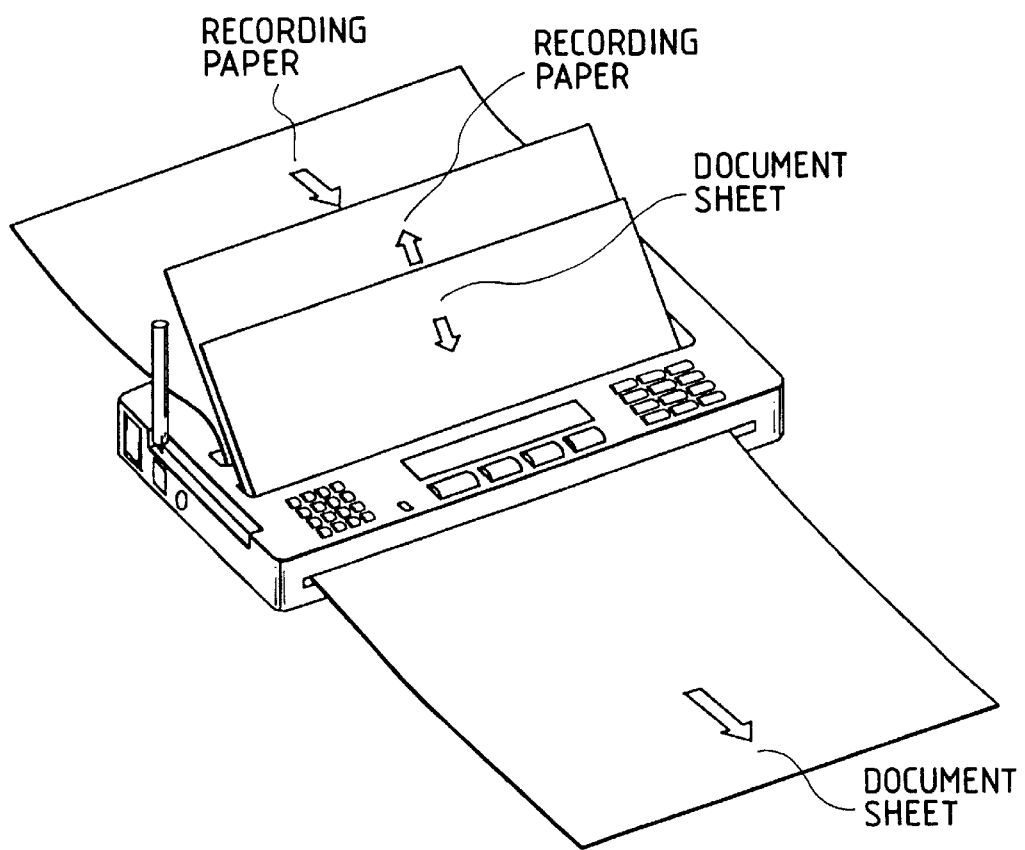
FIG. 46 is a perspective view of the radio facsimile system according to the embodiment shown in FIG. 44.
Figure 47A:
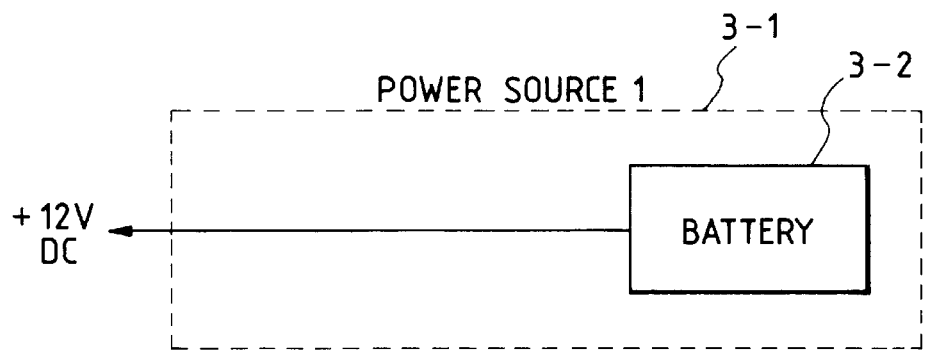
FIGS. 47A to 47C are block diagrams showing the arrangements of power sources in the main unit.
Figure 47B:
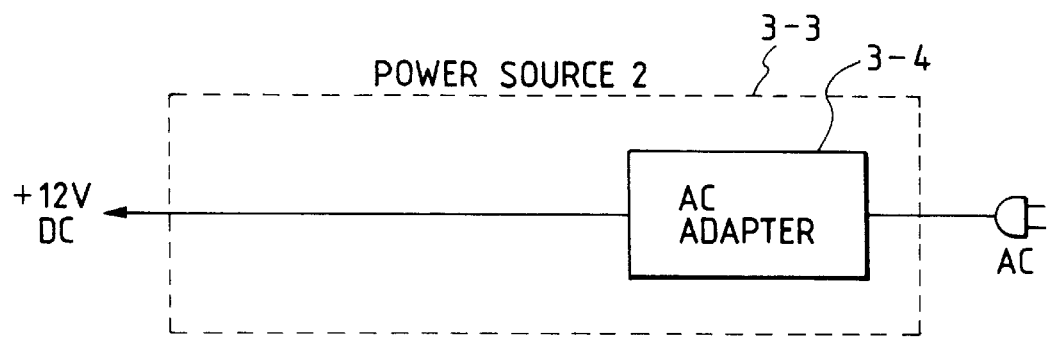
Figure 47C:
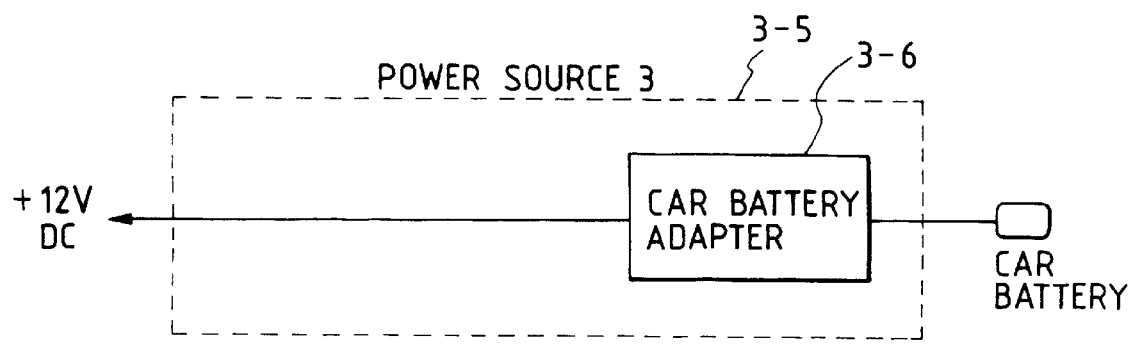

FIG. 44 shows the second embodiment of the present invention. A radio communication, speech communication system is arranged in a portable facsimile. The outer appearance of the apparatus of this embodiment is shown in FIGS. 45 and 46. FIGS. 47A to 47C show power sources.

FIG. 44 is a block diagram of a main unit of this embodiment. A CPU 1-2 in a control unit 1-1 controls the facsimile apparatus as a whole in accordance with programs stored in a ROM 1-3, i.e., a RAM 1-4, a backup memory 1-5, an I/O 1-6, a timer 1-7, a display 1-8, a console unit 1-9, sensors 1-10, a reader 1-11, a recorder 1-12, a driver 1-13, a power source controller 1-14, an NCU 1-15, a modem 1-16, a buzzer 1-18, a baseband unit 1-19, a selector 1-23, and an RF unit 1-27.

The respective components described above will be described below.

The control unit 1-1 comprises the CPU 1-2, the ROM 1-3, the RAM 1-4, the backup memory 1-5, the I/O 1-6, and the timer 1-7.

The RAM 1-4 stores binary image data read by the reader 1-11 and binary data recorded by the recorder 1-12. The RAM 1-4 also stores binary data which is modulated by the modem 1-16 and output from a line jack 1-17 to a subscriber line (channel).

In radio communication, the binary image data read by the reader 1-11 or binary data recorded by the recorder 1-12 is error-corrected, frame-assembled, and analyzed in channel coding in the baseband unit 1-19, modulated by a modem in the baseband unit 1-19, and then supplied to the RF unit 1-27. Filters comprise a data LPF and other filters. The filtered data are supplied to a PLL and a low-noise amplifier. The low-noise amplifier comprises a mixer amplifier. The data is then power-amplified. A synthesizer includes a voltage-controlled variable frequency oscillator, a phase detector, a frequency divider, and a temperature-compensated quartz oscillator. The data is transmitted from an antenna unit 1-34 through a wave multiplexer/demultiplexer. The wave multiplexer/demultiplexer comprises a transmission filter and a reception filter to separate a transmission wave from a reception wave.

The RAM 1-4 also stores binary data obtained such that an analog waveform input from a subscriber line is demodulated through the NCU 1-15 and the modem 1-16.

In radio communication, the data input to the antenna unit 1-34 is switched by the wave multiplexer/demultiplexer, and is demodulated by the modem in the baseband unit 1-19 through the mixer and the filters. Error correction, frame assembly, and frame disassembly of the data are performed in channel coding, thereby storing the resultant binary data in the RAM 1-4.

The backup memory 1-5 stores various data such as its own telephone number, one-touch data, and a user abbreviation.

The I/O 1-6 is an interface for capturing a telephone line and a radio line (channel) and controlling the respective components.

The timer 1-7 includes a real-time clock.

The display 1-8 includes an LCD and an LCD driver and displays a telephone number, a one-touch key, a facsimile communication state, and a speech communication state.

The console unit 1-9 includes a transmission or reception start key, mode keys for designating operation modes such as fine and standard transmission image resolutions, a copy key used in copying, an economy key for designating an energy-saving mode in recording/printing using a battery, a stop key for stopping the operation, a ten-key pad for sending a telephone number, and one-touch keys in which partner telephone numbers are registered.

The CPU 1-2 detects the depressed states of these keys and controls the respective components in accordance with the detected states.

The sensors 1-10 includes a recording paper width sensor, a recording paper sensing sensor, a document sheet width sensor, and a document sheet sensing sensor and detects states of the document sheet and the recording paper under the control of the CPU 1-2.

The reader 1-11 includes a DMA controller, a CCD or contact image sensor (CS), a TTL IC, a binarizing circuit, and the like. The CCD or CS is used to binarize the read data under the control of the CPU 1-2, thereby sequentially sending the binary data to the RAM 1-4.

The recorder 1-12 includes a DMA controller, a B4-/A4-size type thermal head, and a TTL IC. The recorder 1-12 reads out the recorded data from the RAM 1-4 to print out the data as a hard copy under the control of the CPU 1-2.

The driver 1-13 includes stepping motors for driving feed and delivery rollers in the reader 1-1 and the recorder 1-12, gears for transmitting the driving forces of the motors, and drivers for controlling the motors.

The power source controller 1-14 controls power source voltages supplied from a voltage converter 1-30 in accordance with signals from the CPU 1-2.

The NCU 1-15 comprises a DC capture circuit and two-/four-wire converter and connects the subscriber line to the modem 1-16.

The modem 1-16 includes G3, G2, G1, and old FM modems, and a clock generator connected to these modems. The modem 1-16 modulates transmission data stored in the RAM 1-4 and outputs the modulated data to the subscriber line through the NCU 1-15 under the control of the CPU 1-2.

The modem 1-16 receives an analog signal from the subscriber line through the NCU 1-15 and demodulates the analog signal into binary data. The binary data is stored in the RAM 1-4.

The line jack 1-17 connects the subscriber line to the NCU 1-15.

The buzzer 1-18 comprises a buzzer and a buzzer driver and generates an alarm sound or a key-touch sound under the control of the CPU 1-2.

The baseband unit 1-19 comprises a codec, channel coding, and a modem and communicates with the I/O 1-6 under the control of the CPU 1-2.

The codec performs A-D/D-A conversion, and speech compression/expansion.

Channel coding performs error correction, and frame assembly/disassembly.

The modem performs signal modulation/demodulation and waveform equalization.

The selector 1-23 connects the speech signal from the telephone or radio line to the speaker 1-25 and the microphone 1-26 as hand-free speech or connects the earphone/microphone set to the microphone jack 1-24 to allow speech communication in accordance with a control signal from the CPU 1-2. The speaker generates a sound even if the earphone/microphone set is inserted.

The earphone jack 1-24 is used as a terminal for connecting earphone/microphone set or connecting an analog signal therefrom to another equipment. The speaker 1-25 is used to monitor speech or facsimile communication.

The microphone 1-26 comprises a speech input microphone. The RF unit 1-27 comprises high-frequency circuits such as the filters, the PLL, the power amplifier, the low-noise amplifier, the synthesizer, the mixer, and the wave multiplexer/demultiplexer.

The antenna unit 1-34 comprises a transmission antenna and a reception antenna.

The power source 1-35 supplies a voltage to the respective components. As shown in FIGS. 47A to 47C, any one of the three arrangements is used to output a DC power source voltage of +12 V.

A power source 3-1 in FIG. 47A comprises a battery 3-2 having a DC output voltage of +12 V. This DC voltage of +12 V is applied to the respective components of the apparatus.

A power source 3-3 in FIG. 47B comprises an AC adapter 3-4 for receiving an AC power source voltage and converting it into a DC voltage of +12 V. This voltage of +12 V is applied to the respective components of the apparatus.

A power source 3-5 in FIG. 47C comprises a car battery adapter 3-6 for converting a DC power source voltage of the car battery into a stable DC voltage of +12 V. This voltage of +12 V is applied to the respective components of the apparatus.

The voltage converter 1-36 comprises a series regulator, a switching regulator, and a DC/DC converter and converts a voltage input from the power source 1-35 into a voltage supposed to be applied to the respective components of the apparatus.

FIG. 45 shows a radio facsimile main unit which is constituted by the block diagram shown in FIG. 44.

FIG. 46 is a flow chart of a document sheet and recording paper in this radio facsimile main unit, and a description thereof will be omitted.

As has been described above, various data can be exchanged between a FAX terminal and a radio terminal to improve operability because the operation of the FAX terminal can be started from the radio terminal. In addition, the release of the line at the end of FAX communication can be designated from the FAX terminal to the radio terminal. Therefore, the radio terminal can automatically release the radio line or channel to prevent unnecessary capture of the line, and the operator need not operate the radio terminal.

When a radio processing system is incorporated in a facsimile main unit, the portable telephone set need not be connected to the facsimile main unit through a cable. The radio facsimile apparatus is excellent in portability and is easy to handle. In addition, the radio facsimile apparatus can singly perform facsimile communication and speech communication.

Various data can be exchanged between a FAX terminal and a radio terminal to improve operability because the operation of the portable telephone set is controlled from the FAX main unit and retransmission can be automatically performed without causing the operator to restart redial operations from the beginning. The ringer of the portable telephone set can be controlled from the FAX main unit. A FAX call reservation and a FAX call can be performed with only operations at the portable telephone set without operating the FAX main unit.

Various data can be exchanged between a FAX terminal and a radio terminal to accept a call reservation at the radio terminal. To reserve a facsimile call, the operator need not walk to the location of the facsimile main unit and can reserve a call at the portable telephone set, thereby improving operability and eliminating a call reservation key from the facsimile main unit. A transmission document sheet can be sensed and confirmed from the radio terminal to the FAX main unit to register and dial two telephone numbers for the FAX main unit and the telephone set to one partner name/one-touch key.

Various data stored in the memory of a radio terminal are transmitted to a FAX terminal, and the telephone number of the portable telephone set and a user abbreviation can be utilized as TSI, CSI, NSS, and NSF data. The telephone number of the portable telephone set, the user abbreviation, the partner telephone number, and the like can be used as part of a transmission image. A communication report is stored in the memory of the radio terminal. For this reason, the communication report for each portable telephone set can be output, a storage means need not be arranged in the facsimile main unit, cost can be reduced, and the various data stored in the portable telephone can be printed out at the facsimile main unit.

Various data can be exchanged between a FAX terminal and a radio terminal, and a call mode select switch and a means for detecting a partner station as a facsimile station are arranged to allow F/T switching. When the facsimile apparatus is called, the operator need not operate the FAX main unit, resulting in convenience.

If the partner station is known as a facsimile station, automatic reception is set to receive a message without ringing the phone, thereby reducing the load of the operator.

A speech message is sent to allow the partner to know the source situation, thereby preventing confusion of the partner.

The present invention is not limited to the particular embodiments described above. Various changes and modifications may be made without departing the scope of the appended claims.

What is claimed is:

1. A communication apparatus comprising:
a radio terminal having display means;
a data communication terminal lacking a display function for displaying control commands operative therein; and
an intercommunicating means for exchanging various data between said data communication terminal and said radio terminal, said intercommunicating means connecting said data communication terminal and said radio terminal to allow said data communication terminal and said radio terminal to exchange necessary data therebetween, said intercommunicating device comprising means for transferring display data indicative of the control commands from said data communication terminal to said radio terminal for display of the control commands on said display means of said radio terminal,
wherein said radio terminal and said data communication terminal are physically separable from each other and said data communication terminal is independently fully functional in its data communication functions.

2. An apparatus according to claim 1, wherein said radio terminal is a radiophone terminal.

3. An apparatus according to claim 1, wherein said data communication terminal is a facsimile terminal.

4. A communication apparatus comprising:
a radio terminal having display means;
a data communication terminal lacking a display function for displaying a control command operative therein; and
an intercommunicating means for exchanging various data between said data communication terminal and said radio terminal, said intercommunicating means connecting said data communication terminal and said radio terminal to allow said data communication terminal and said radio terminal to exchange necessary data therebetween, said intercommunicating means comprising means for transferring the control command from said data communication terminal to said radio terminal for display on said display means of said radio terminal,
wherein said radio terminal and said data communication terminal are physically separable from each other and said data communication terminal is independently fully functional in its data communication functions.

5. An apparatus according to claim 4, wherein said radio terminal is a radiophone terminal.

6. An apparatus according to claim 4, wherein said data communication terminal is a facsimile terminal.

7. A communication apparatus comprising:
a radio terminal including at least one standard facsimile operation element;
a data communication terminal lacking said at least one element; and
interface contacts including intercommunicating means for exchanging various data between said data communication terminal and said radio terminal, said intercommunicating means connecting said data communication terminal and said radio terminal to allow said data communication terminal and said radio terminal to exchange facsimile data therebetween, wherein said data communication terminal controls said at least one element in said radio terminal by exchanging data through said intercommunicating means,
wherein said radio terminal and said data communication terminal are physically separable from each other and said data communication terminal is independently fully functional in its data communication functions except for said at least one element but must be connected with said radio terminal in order to communicate facsimile data.

8. An apparatus according to claim 7, wherein a ringer in said radio terminal is turned on in accordance with control data from said data communication terminal.

9. An apparatus according to claim 7, wherein said radio terminal dials a designated telephone number in accordance with a control command from said data communication terminal.

10. An apparatus according to claim 7, wherein said radio terminal is a radiophone terminal.

11. An apparatus according to claim 7, wherein said data communication terminal is a facsimile terminal.

12. A communication apparatus comprising:
a radio terminal having storage means;
a data communication terminal; and
intercommunicating means for exchanging various data between said data communication terminal and said radio terminal, said intercommunicating means connecting said data communication terminal and said radio terminal to allow said data communication terminal and said radio terminal to exchange necessary data therebetween,
said storage means, having a call function, storing telephone numbers of call partners, wherein when "DC" and "TEL" telephone numbers are stored for one partner in said storage means, a document sheet sensing signal is sent by said intercommunicating means from said data communication terminal to said radio terminal, and the "DC" telephone number is discriminated from the "TEL" telephone number in accordance with a document sheet sensing result indicative of a presence or absence of a document sheet in said data communication terminal, thereby making a call, and
wherein said data communication terminal lacks storage means for storing the telephone numbers,
wherein said radio terminal and said data communication terminal are physically separable from each other and said data communication terminal is independently fully functional in its data communication functions.

13. An apparatus according to claim 12, wherein data stored in said storage means is transferred from said radio terminal to said data communication terminal.

14. An apparatus according to claim 13, wherein said radio terminal is a radio terminal for transmitting, to said data communication terminal, storage data designated by serial facsimile communication from said data communication terminal.

15. An apparatus according to claim 13, wherein said data communication terminal receives a telephone number and a user name which are assigned to said radio terminal and are stored in said radio terminal, and said data communication terminal uses received data as TSI, CSI, NSF, and NSS data of CCITT T.30.

16. An apparatus according to claim 13, wherein said data communication terminal receives a telephone number, a user name, and a partner telephone number which are assigned to said radio terminal and are stored in said radio terminal, and said data communication terminal uses received data as part of an image.

17. An apparatus according to claim 13, wherein said data communication terminal receives a telephone number, a user name, and a partner telephone number which are assigned to said radio terminal and are stored in said radio terminal, and said data communication terminal generates an image corresponding to received data.

18. An apparatus according to claim 13, wherein the received data is printed out at said data communication terminal.

19. An apparatus according to claim 12, wherein said radio terminal is a radiophone terminal.

20. An apparatus according to claim 12, wherein said data communication terminal is a facsimile terminal.

21. A communication apparatus comprising:
a radio terminal having data storage means;
a data communication terminal; and
intercommunicating means for exchanging various data between said data communication terminal and said radio terminal, said intercommunicating means connecting said data communication terminal and said radio terminal to allow said data communication terminal and said radio terminal to exchange necessary data therebetween, wherein communication report data is transferred by said intercommunicating means from said data communication terminal to said radio terminal and is stored in said data storage means in said radio terminal, and wherein said data communication terminal lacks a data storage function for storing the communication report data,
wherein said radio terminal and said data communication terminal are physically separable from each other and said data communication terminal is independently fully functional in its data communication functions.

22. An apparatus according to claim 21, wherein said radio terminal comprises:
data input means for receiving data from said data communication terminal so as to input storage data to be stored in said data storage means in said radio terminal; and
key input means for inputting data from each key in said radio terminal.

23. An apparatus according to claim 21, wherein data associated with facsimile communication is transmitted from said data communication terminal to said radio terminal at the end of facsimile communication and is stored in said radio terminal.

24. An apparatus according to claim 21, wherein said radio terminal is a radiophone terminal.

25. An apparatus according to claim 21, wherein said data communication terminal is a facsimile terminal.

26. A method of controlling a communication apparatus comprising a radio terminal having display means and a data communication terminal lacking a display function for displaying control commands operative therein, wherein the radio terminal and the data communication terminal are physically separable from each other and the data communication terminal is independently fully functional in its data communication functions, said method comprising the steps of:

connecting the data communication terminal and the radio terminal to allow the data communication terminal and the radio terminal to exchange necessary data therebetween;
exchanging various data between the data communication terminal and the radio terminal; and
transferring display data indicative of the control commands from the data communication terminal to the radio terminal for display of the control commands on the display means of the radio terminal.

27. A method according to claim 26, wherein said radio terminal is a radiophone terminal.

28. A method according to claim 26, wherein the data communication terminal is a facsimile terminal.

29. A method of controlling a communication apparatus comprising a radio terminal having display means and a data communication terminal lacking a display function for displaying a control command operative therein, wherein the radio terminal and the data communication terminal are physically separable from each other and the data communication terminal is independently fully functional in its data communication functions, said method comprising the steps of:

connecting the data communication terminal and the radio terminal to allow the data communication terminal and the radio terminal to exchange necessary data therebetween;
exchanging various data between the data communication terminal and the radio terminal; and
transferring display data indicative of the control command from the data communication terminal to the radio terminal for display of the control command on the display means of the radio terminal.

30. A method according to claim 29, wherein the radio terminal is a radiophone terminal.

31. A method according to claim 29, wherein the data communication terminal is a facsimile terminal.

32. A method of controlling a communication apparatus comprising a radio terminal including at least one standard facsimile operation element and a data communication terminal lacking the at least one element, wherein the radio terminal and the data communication terminal are physically separable from each other and the data communication terminal is independently fully functional in its data communication functions except for the at least one element but must be connected with the radio terminal in order to communicate facsimile data, said method comprising the steps of:

connecting the data communication terminal and the radio terminal to allow the data communication terminal and the radio terminal to exchange facsimile data therebetween;
exchanging various data between the data communication terminal and the radio terminal; and
using the data communication terminal to control the at least one element in the radio terminal by exchanging data therewith.

33. A method according to claim 32, wherein the radio terminal dials a designated telephone number in accordance with a control command from the data communication terminal.

34. A method according to claim 32, wherein the radio terminal is a radiophone terminal.

35. A method according to claim 32, wherein the data communication terminal is a facsimile terminal.

36. A method according to claim 32, wherein a ringer in the radio terminal is turned on in accordance with control data from the data communication terminal.

37. A method of controlling a communication apparatus comprising a radio terminal having storage means and a data communication terminal, wherein the radio terminal and the data communication terminal are physically separable from each other and the data communication terminal is independently fully functional in its data communication functions, said method comprising the steps of:

connecting the data communication terminal and the radio terminal to allow the data communication terminal and the radio terminal to exchange necessary data therebetween; and exchanging various data between the data communication terminal and the radio terminal, wherein the storage means, having a call function, stores telephone numbers of call partners, wherein when "DC" and "TEL" telephone numbers are stored for one partner in the storage means, a document sheet sensing signal is sent from the data communication terminal to the radio terminal, and the "DC" telephone number is discriminated from the "TEL" telephone number in accordance with a document sheet sensing result indicative of a presence or absence of a document sheet in the data communication terminal, thereby making a call, and wherein the data communication terminal lacks storage means for storing the telephone numbers.

38. A method according to claim 37, wherein data stored in the storage means is transferred from the radio terminal to the data communication terminal.

39. A method according to claim 38, wherein the radio terminal is a radio terminal for transmitting, to the data communication terminal, storage data designated by serial facsimile communication from the data communication terminal.

40. A method according to claim 38, wherein data communication terminal receives a telephone number and a user name which are assigned to the radio terminal and are stored in the radio terminal, and the data communication terminal uses received data as TSI, CSI, NSF, and NSS data of CCITT T.30.

41. A method according to claim 38, wherein the data communication terminal receives a telephone number, a user name, and a partner telephone number which are assigned to the radio terminal and are stored in the radio terminal, and the data communication terminal uses received data as part of an image.

42. A method according to claim 38, wherein the data communication terminal receives a telephone number, a user name, and a partner telephone number which are assigned to the radio terminal and are stored in the radio terminal, and data communication terminal generates an image corresponding to received data.

43. A method according to claim 38, wherein the received data is printed out at the data communication terminal.

44. A method according to claim 37, wherein the radio terminal is a radiophone terminal.

45. A method according to claim 37, wherein the data communication terminal is a facsimile terminal.

46. A method of controlling a communication apparatus comprising a radio terminal having data storage means and a data communication terminal, wherein the radio terminal and the data communication terminal are physically separable from each other and the data communication terminal is independently fully functional in its data communication functions, said method comprising the steps of:

connecting the data communication terminal and the radio terminal to allow the data communication terminal and the radio terminal to exchange necessary data therebetween; and exchanging various data between the data communication terminal and the radio terminal, wherein communication report data is transferred from the data communication terminal to the radio terminal and is stored in the data storage means in the radio terminal, and wherein the data communication terminal lacks a data storage function for storing the communication report data.

47. A method according to claim 46, wherein the radio terminal comprises:

data input means for receiving data from the data communication terminal so as to input storage data to be stored in the data storage means in the radio terminal; and key input means for inputting data from each key in the radio terminal.

48. A method according to claim 46, wherein data associated with facsimile communication is transmitted from the data communication terminal to the radio terminal at the end of facsimile communication and is stored in the radio terminal.

49. A method according to claim 46, wherein the radio terminal is a radiophone terminal.

50. A method according to claim 46, wherein the data communication terminal is a facsimile terminal.

* * * * *

UNITED STATES PATENT AND TRADEMARK OFFICE
CERTIFICATE OF CORRECTION

PATENT NO. : 5,966,669

DATED : October 12, 1999

INVENTOR(S) : TOSHIO KENMOCHI ET AL.        Page 1 of 5

It is certified that error appears in the above-identified patent and that said Letters Patent is hereby corrected as shown below:

On the title page, item:

[*] NOTICE

Insert: --This patent issued on a continued prosecution application filed under 37 CFR 1.53(d) and is subject to the twenty year patent term provisions of 35 U.S.C. 154(a)(2).--

[56] REFERENCES CITED

U.S. Patent Documents
      Insert: --5,263,078  11/93  Takahashi et al.  455/557--.
      Insert: --5,297,142  3/94  Paggeot et al.  455/557X--.

COLUMN 1

Line 18, "; hem." should read --them.--.

COLUMN 2

Line 33, "is to" should read --to--.

UNITED STATES PATENT AND TRADEMARK OFFICE
CERTIFICATE OF CORRECTION

PATENT NO. : 5,966,669

DATED : October 12, 1999

INVENTOR(S) : TOSHIO KENMOCHI ET AL.

It is certified that error appears in the above-identified patent and that said Letters Patent is hereby corrected as shown below:

COLUMN 4

Line 21, "comprised" should read --comprised of--.

COLUMN 5

Line 50, "signal." should read --signal--.
    Line 63, "Paper" should read --paper--.

COLUMN 9

Line 48, "are." should read --are--.
    Line 59, "initiates." should read --initiated.--.

COLUMN 11

Line 18, "("end" should read --("End--.
    Line 23, "Described" should read --described--.
    Line 41, "node" should read --mode--.

UNITED STATES PATENT AND TRADEMARK OFFICE
CERTIFICATE OF CORRECTION

PATENT NO. : 5,966,669
DATED : October 12, 1999
INVENTOR(S) : TOSHIO KENMOCHI ET AL.　　　　　Page 3 of 5

It is certified that error appears in the above-identified patent and that said Letters Patent is hereby corrected as shown below:

COLUMN 13

```
Line 21, "S214 ir" should read --S214 in--.
Line 35, "S1755" should read --S1754--.
Line 53, "parameters)" should read --parameters.--;
    and "are transmitted" should be deleted.
```

COLUMN 14

```
Line 22, "S1760" should read --S1760--.
Line 26, "detested," should read --detected,--.
Line 27, "Any" should read --If any--.
```

COLUMN 16

```
Line 3, "returns" should read --returns to--.
```

COLUMN 17

```
Line 5, "needed." should read --needed).--.
Line 59, "rising" should read --using--.
```

UNITED STATES PATENT AND TRADEMARK OFFICE
CERTIFICATE OF CORRECTION

PATENT NO. : 5,966,669

DATED : October 12, 1999

INVENTOR(S) : TOSHIO KENMOCHI ET AL.

It is certified that error appears in the above-identified patent and that said Letters Patent is hereby corrected as shown below:

COLUMN 18

Line 55, "s710," should read --S710,--.

COLUMN 19

Line 29, "stp" should read --step--.
   Line 43, "("OK" should read --("OK--.

COLUMN 21

Line 60, "Mode The" should read --Mode. ¶ The--.

COLUMN 23

Line 8, "FAK" should read --FAX--.

COLUMN 24

Line 7, "(cc=" should read --(CC=--.
   Line 24, "disenabled)" should read --disenable)--.

UNITED STATES PATENT AND TRADEMARK OFFICE
CERTIFICATE OF CORRECTION

PATENT NO. : 5,966,669
DATED : October 12, 1999
INVENTOR(S) : TOSHIO KENMOCHI ET AL.

It is certified that error appears in the above-identified patent and that said Letters Patent is hereby corrected as shown below:

COLUMN 24 CONTINUED

Line 34, "TELROF=1" should read --TELRQF=1--.

COLUMN 35

Line 36, "data" should read --the data--.

Signed and Sealed this

Twenty-seventh Day of March, 2001

Attest:

NICHOLAS P. GODICI

Attesting Officer

Acting Director of the United States Patent and Trademark Office